US008150040B2

(12) United States Patent  
Kusakawa et al.

(10) Patent No.: US 8,150,040 B2  
(45) Date of Patent: Apr. 3, 2012

(54) KEY PROVIDING SYSTEM, TERMINAL DEVICE, AND INFORMATION PROCESSING METHOD

(75) Inventors: Masafumi Kusakawa, Tokyo (JP); Tomoyuki Asano, Kanagawa (JP)

(73) Assignee: Sony Corporation, Tokyo (JP)

(*) Notice: Subject to any disclaimer, the term of this patent is extended or adjusted under 35 U.S.C. 154(b) by 200 days.

(21) Appl. No.: 12/532,076

(22) PCT Filed: Feb. 5, 2008

(86) PCT No.: PCT/JP2008/051815  
§ 371 (c)(1),  
(2), (4) Date: Sep. 18, 2009

(87) PCT Pub. No.: WO2008/114542  
PCT Pub. Date: Sep. 25, 2008

(65) Prior Publication Data  
US 2010/0040235 A1    Feb. 18, 2010

(30) Foreign Application Priority Data  
Mar. 20, 2007   (JP) ................................. 2007-073195

(51) Int. Cl.  
*H04L 9/08* (2006.01)
(52) U.S. Cl. ............. 380/278; 380/277; 705/50; 705/71
(58) Field of Classification Search .......... 380/277–278, 380/45; 705/50, 71–72  
See application file for complete search history.

(56) References Cited

U.S. PATENT DOCUMENTS

| | | | |
|---|---|---|---|
| 2002/0085722 A1* | 7/2002 | Asano et al. | 380/278 |
| 2002/0094088 A1* | 7/2002 | Okaue | 380/278 |
| 2002/0136411 A1* | 9/2002 | Ishiguro et al. | 380/278 |
| 2002/0164934 A1* | 11/2002 | Honda | 451/178 |
| 2003/0076958 A1* | 4/2003 | Ishiguro et al. | 380/277 |
| 2008/0152133 A1 | 6/2008 | Suga | |

FOREIGN PATENT DOCUMENTS

| | | |
|---|---|---|
| JP | 2006-74392 | 3/2006 |
| JP | 2006-310182 | 11/2006 |
| JP | 2006-310213 | 11/2006 |

(Continued)

OTHER PUBLICATIONS

T. Asano et al., "Subset Incremental Chain Broadcast Encryption Subset Incremental Chain Based Broadcast Encryption with Small Computational Overhead", 2007 Nen Symposium on Cryptography and Information Security, 2C3-1, pp. 1-6 (2007).

(Continued)

*Primary Examiner* — Nathan Flynn  
*Assistant Examiner* — Phuoc Tran  
(74) *Attorney, Agent, or Firm* — Finnegan, Henderson, Farabow, Garrett & Dunner, L.L.P.

(57) ABSTRACT

A terminal device improved with a digraph generation method in a key distribution method of various types of broadcast encryption systems is provided. The terminal device includes an acquiring unit for acquiring information related to a set, which is selected from a plurality of sets representing a combination of a plurality of terminal devices, and which represents some or all of the plurality of terminal devices; an extracting unit for extracting the set contained in the information and to which it belongs; and a digraph generation unit for generating a directional branch for generating a key corresponding to the extracted set in a predetermined digraph formed by a plurality of directional branches.

12 Claims, 55 Drawing Sheets

FOREIGN PATENT DOCUMENTS

JP     2006-310226     11/2006

OTHER PUBLICATIONS

N. Attrapadung et al., "Subset Incremental Chain Based Broadcast Encryption with Shorter Ciphertext", The 28th Symposium on Information Theory and Its Applications (SITA2005), vol. I of II, pp. 57-60 (2005).

D. Boneh et al., "Hierarchical Identity Based Encryption with Constant Size Cipertext", Lecture Notes in Computer Science, vol. 3493, pp. 440-456 (2005).

* cited by examiner

KEY PROVIDING SYSTEM, TERMINAL DEVICE, AND INFORMATION PROCESSING METHOD

TECHNICAL FIELD

The present invention relates to a key providing system, a terminal device, and an information processing method.

BACKGROUND ART

Information devices such as personal computer (hereinafter referred to as PC), portable telephone, and digital home electrical appliance are recently being widespread used in general. The technique related to such information devices and information communication connecting such devices is greatly advancing, and content distribution service such as music distribution and video distribution using such information device is being widely developed. Pay broadcasting using CATV (Community Antenna TeleVision), satellite broadcast or Internet, and content distribution using physical media such as CD (Compact Disc) or DVD (Digital Versatile Disc) are examples of the content distribution service.

However, in order to provide such content distribution service, a mechanism allowing only the contractant to acquire the content based on the contract made between the provider of the service (hereinafter referred to as system manager) and the viewer is desired. With respect to such issue, a mechanism of providing a predetermined key from the system manager to the contractant, and distributing encrypted content C and also head information h for generating a content key mek used to encrypt the content C with the predetermined key is contrived.

A content distribution system called the broadcast encryption system is known as one specific means for realizing such mechanism. The broadcast encryption system is a system of corresponding each contractant with an element of a set, dividing the contractant set representing the entire contractant into a plurality of subsets, and distributing the header h such that only the contractant belonging to a specific subset can acquire the content key mek. That is, with the application of such system, the distribution of the content C excluding the specific contractant specified by the system manager can be realized. In reality, however, higher efficiency of the broadcast encryption system of the related art is desired in view of the calculation load associated with the generation of the content key mek at the server device (hereinafter referred to as center) on the system manager side and the terminal device on the contractant side, the communication load between the server device and the terminal device, and the like.

Specifically, when distributing the content, how to reduce the amount of communication that increases according to the size of the header h distributed by the center, the amount of memory that increases according to the number of keys to be held by each terminal device, and the amount of calculation for each terminal device to generate the content key mek becomes an issue. Each amount greatly differs depending on the method of dividing the contractant set. Various broadcast encryption systems in which efforts are made in the method of dividing the contractant set have been proposed to realize efficient content distribution. For instance, non-patent document 1 discloses a content distribution system called the Subset Incremental Chain Based Broadcast Encryption system (hereinafter referred to as AI05 system) by Nuttapong Attrapadung and Hideki Imai et al. as one means for reducing each amount.

[Non-patent document 1] Nuttapong Attrapadung and Hideki Imai, "Subset Incremental Chain Based Broadcast Encryption with Shorter Ciphertext", The 28th Symposium on Information Theory and Its Applications (SITA2005)

DISCLOSURE OF INVENTION

The applicant of the present invention has developed a first improved system (hereinafter referred to as A06(A) system) in which the amount of memory for each terminal device to hold the key can be reduced, a second improved system (hereinafter referred to as A06(B) system) in which the amount of calculation for each terminal device to generate the content key can be reduced, and a third improved system (hereinafter referred to as A06(A+B) system) in which the amount of memory and the amount of calculation can be reduced with respect to the content distribution system described in non-patent document 1, and has already filed for patent to Japanese Patent Office (A06(A) system: Japanese Application No. 2006-310182, A06(B) system: Japanese Application No. 2006-310213, A06(A+B) system: Japanese Application No. 2006-310226). The characteristics of each system lie in that, when generating the content key mek using a pseudo-random sequence generator, the pseudo-random sequence generation calculation is executed based on a key generation algorithm represented by a digraph unique to each system.

However, in each system, use of the information of each digraph held by each terminal device in advance when each terminal generates a content key mek is merely suggested, and a specific means is not described. Since the amount of information of the digraph to be held by each terminal device becomes enormous when the number of contracts is large, such information is difficult to store in the terminal device in reality. Furthermore, a method in which each terminal device calculates the digraph similar to the center is also considered, but the amount of calculation of each terminal device becomes enormous, and thus is difficult to realize.

The applicant focused on the aspect that not all digraphs are necessary when each terminal device generates the key, and developed a technique for calculating the desired digraph necessary for every terminal device. According to such technique, each terminal may not calculate the information of all digraphs and thus the calculation load in key generation is reduced, whereby an approach in that each terminal device generates the desired digraphs and derives the key can be realized.

The present invention addresses the above-identified, and other issues associated with conventional methods and apparatuses, and it is desirable to provide a new and improved key providing system capable of reducing the amount of calculation for each terminal device to calculate the desired digraph to use in the key generation, a terminal device, and an information processing method.

In order to solve the above issue, according to an aspect of the invention, there is provided a key providing system configured by a plurality of terminal devices, and an information processing device for providing a key used in encryption or decryption of data to a predetermined terminal device. The information processing device includes an acquiring unit for acquiring a predetermined digraph formed by arranging a directional branch connecting coordinate points on a coordinate axis including a plurality of coordinate points each corresponded with a set representing a combination of the plurality of terminal devices, a selecting unit for selecting the set representing some or all of the plurality of terminal devices, a key generation unit for generating the key corresponding to the selected set based on the predetermined digraph, and a providing unit for providing the generated key and information related to the selected set to the plurality of terminal devices. Further, the terminal device includes an acquiring unit for acquiring the generated key and the information related to the selected set, a digraph generation unit for generating the directional branch for generating the key corresponding to the selected set to which it belongs of the directional branches forming the predetermined digraph, and a key generation unit for generating the key corresponding to the selected set to which it belongs based on a digraph formed by the generated directional branch. The predetermined digraph may include a digraph corresponding to an empty set in which the directional branch does not exist. In this case, the acquiring unit acquires a predetermined digraph formed by arranging zero or more directional branch connecting the coordinate points on the horizontal axis including a plurality of coordinate points each corresponded with a set representing a combination of a plurality of terminal devices.

In order to solve the above issue, according to another aspect of the invention, there is provided a terminal device including: an acquiring unit for acquiring information related to a set, which is selected from a plurality of sets representing a combination of a plurality of terminal devices, and which represents some or all of the plurality of terminal devices; an extracting unit for extracting the set contained in the information and to which it belongs; and a digraph generation unit for generating a directional branch for generating a key corresponding to the extracted set in a predetermined digraph formed by a plurality of directional branches.

Further, the predetermined digraph may be configured to be a second digraph generated by replacing some or all of the plurality of directional branches forming a first digraph with shorter directional branches based on the predetermined first digraph.

Further, the predetermined digraph may be configured to be a third digraph generated by replacing some or all of the plurality of directional branches forming a first digraph with longer directional branches based on the predetermined first digraph.

Further, the predetermined digraph may be configured to be a third digraph generated by replacing some or all of the plurality of directional branches forming a second digraph with shorter directional branches with respect to the second digraph generated by replacing some or all of the plurality of directional branches forming a first digraph with longer directional branches based on the predetermined first digraph.

The terminal device may be configured to further include a key generation unit for generating the key based on the directional branch generated by the digraph generation unit.

Further, the acquiring unit may be configured to acquire content or content key encrypted with the key corresponding to the set along with the information related to the set. In addition, the terminal device may be configured to further include a decryption unit for decrypting the encrypted content or the content key using the key generated by the key generation unit.

Further, the acquiring unit may be configured to receive the information related to the set through a network.

Further, the acquiring unit may be configured to read out the information related to the set recorded on a predetermined recording medium.

Further, the key generation unit may be configured to generate the key $k(S_1)$ corresponding to a coordinate point $S_1$ of a terminating end of the directional branch according to an input of the key $k(S_0)$ corresponding to a starting end $S_0$ of the directional branch.

Further, the key may be configured by a set key k for encrypting or decrypting the content or the content key, and an intermediate key t for generating the set key k. In addition, the key generation unit may be configured to generate the set key $k(S_0)$ corresponding to a starting end $S_0$ of the directional branch, and the intermediate key $t(S_1)$ corresponding to a terminating end $S_1$ of the directional branch according to an input of the intermediate key $t(S_0)$ corresponding to the starting end $S_0$ of the directional branch.

In order to solve the above issue, according to another aspect of the invention, there is provided an information processing method in a terminal device. The information processing method includes the steps of: acquiring information related to a set, which is selected from a plurality of sets representing a combination of a plurality of terminal devices, and which represents some or all of the plurality of terminal devices; extracting the set contained in the information and to which it belongs; and generating a directional branch for generating a key corresponding to the extracted set in a predetermined digraph formed by a plurality of directional branches.

According to such configuration, each terminal device can calculate the desired digraph and generate the key when deriving a key corresponding to each set selected by the key distribution server, which is an example of an information processing device, in various types of broadcast encryption systems.

Therefore, according to the present invention, the amount of calculation for each terminal device to calculate the desired digraph used for key generation can be reduced.

Figure 1:
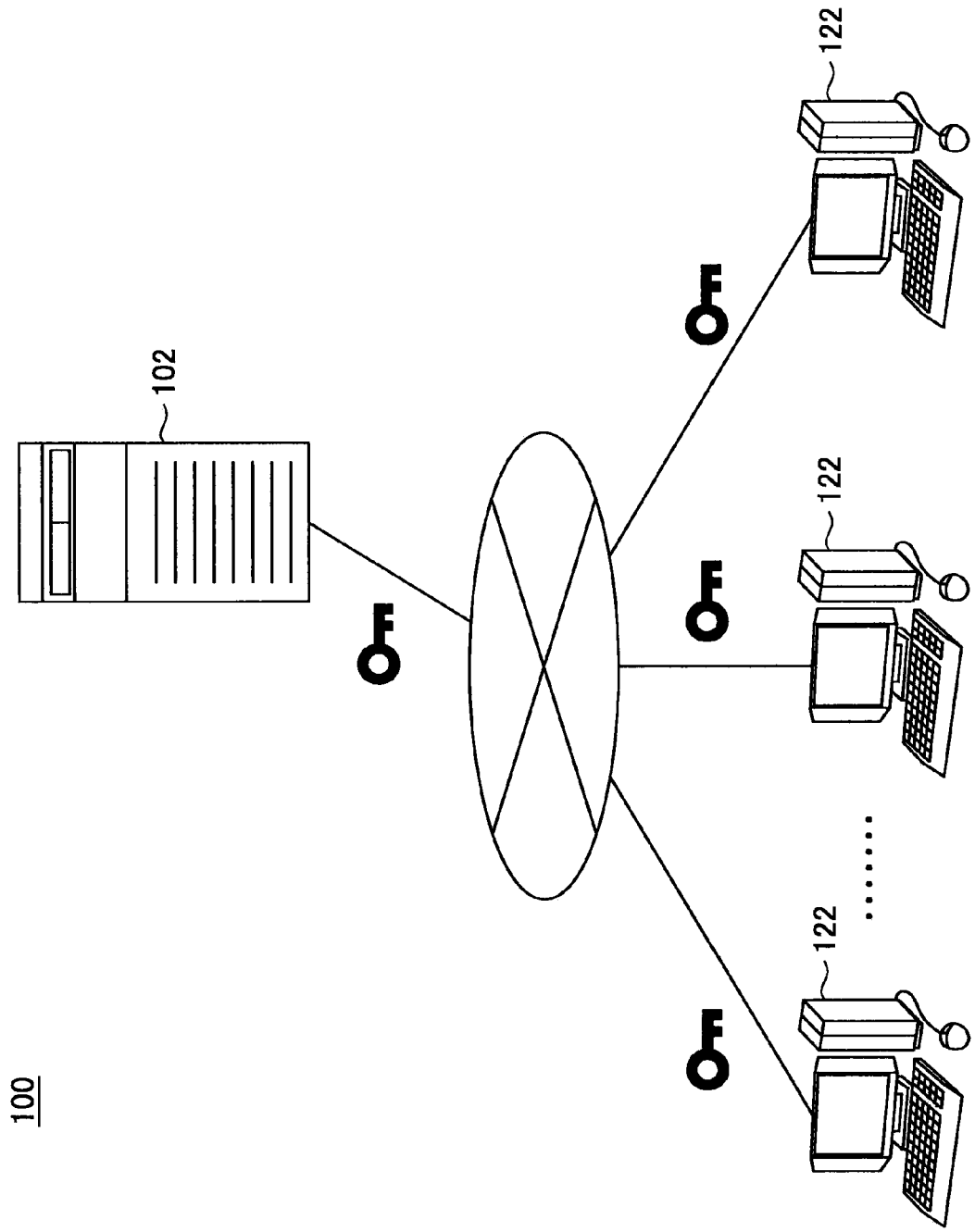
FIG. 1 is an explanatory view showing a configuration of a key providing system according to first to fourth embodiments of the present invention.

| EXPLANATION OF NUMERAL | |
|---|---|
| 100 | KEY PROVIDING SYSTEM |
| 102 | KEY DISTRIBUTION SERVER |
| 104 | TREE STRUCTURE SETTING UNIT |
| 106 | COORDINATE AXIS SETTING UNIT |
| 108 | TEMPORARY DIGRAPH GENERATION UNIT |
| 110 | DIGRAPH GENERATION UNIT |
| 112 | INITIAL INTERMEDIATE KEY SETTING UNIT |
| 114 | KEY GENERATION UNIT |
| 116 | ENCRYPTION UNIT |
| 118 | COMMUNICATION UNIT |
| 120 | SUBSET DETERMINATION UNIT |
| 122 | TERMINAL DEVICE |
| 124 | COMMUNICATION UNIT |
| 126 | JUDGMENT UNIT |
| 127 | DIGRAPH GENERATION UNIT |
| 128 | KEY GENERATION UNIT |
| 130 | DECRYPTION UNIT |
| 202 | KEY DISTRIBUTION SERVER |
| 206 | COORDINATE AXIS SETTING UNIT |
| 210 | DIGRAPH GENERATION UNIT |
| 222 | TERMINAL DEVICE |
| 227 | DIGRAPH GENERATION UNIT |
| 302 | KEY DISTRIBUTION SERVER |
| 308 | TEMPORARY DIGRAPH GENERATION UNIT |
| 310 | DIGRAPH GENERATION UNIT |
| 322 | TERMINAL DEVICE |
| 327 | DIGRAPH GENERATION UNIT |
| 402 | KEY DISTRIBUTION SERVER |
| 408 | TEMPORARY DIGRAPH GENERATION UNIT |
| 410 | DIGRAPH GENERATION UNIT |
| 422 | TERMINAL DEVICE |
| 427 | DIGRAPH GENERATION UNIT |
| 702 | CONTROLLER |
| 704 | CALCULATION UNIT |
| 706 | INPUT/OUTPUT INTERFACE |
| 708 | SECURE STORAGE UNIT |
| 710 | MAIN STORAGE UNIT |
| 712 | NETWORK INTERFACE |
| 716 | MEDIA INTERFACE |
| 718 | INFORMATION MEDIA |

BEST MODE FOR CARRYING OUT THE INVENTION

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

[Outline]

Prior to describing the embodiment of the present invention, the AI05 system, the A06(A) system, the A06(B) system, and the A06(A+B) system to which the technique of the present invention can be applied will be briefly described, and the issues will be addressed. It can be recognized that the key distribution system to which the technique of the present invention can be applied is not limited to such systems, and it should be apparent to those skilled in the art that the technique of the present invention can be easily applied to other key distribution systems with reference to such examples.

(Outline of AI05 System)

In the AI05 system, each terminal device included in the key providing system is corresponded to the element of the set, and a set of the entire terminal device is considered, similar to the broadcast encryption system of the related art. The key distribution is executed using a plurality of subsets obtained by dividing the set. That is, the key distribution server first forms a binary tree (BT) and corresponds each terminal device to a leaf node. The key distribution server then generates a plurality of "set of subsets" having the subset as the element according to a predetermined rule, and corresponds each set of subsets to a root node and each intermediate node of the BT. The key distribution server associates the plurality of subsets contained in the set of subsets based on a predetermined rule (hereinafter sometimes referred to as jump). The relationship between the subsets is represented by a digraph or a directional branch.

The digraph is formed on a coordinate axis in which each subset contained in the set of subsets is corresponded to each coordinate point, and is configured by directional branches (represent jump mentioned above) connecting a plurality of coordinate points. The key distribution server forms, for every set of subsets corresponded to the root node and each intermediate node contained in the BT, a digraph representing the relationship of the plurality of subsets contained therein.

The key distribution server also selects a subset including a terminal device, which is the distributing destination, and specifies the digraph containing the relevant subset. The key distribution server generates a key by repeating the calculation of a pseudo-random sequence generator (PRSG) based on the specified digraph. The characteristics of the AI05 system lie in dividing the set representing all terminal devices to subsets and generating the key based on the digraph to reduce the amount of communication, the number of keys to be held by each terminal device, and the amount of calculation for key generation compared to the broadcast encryption system of the related art.

(Outline of A06(A), A06(B), A06(A+B) Systems)

The A06(A) system is an improved system of the AI05 system where improvement is made in reducing the number of keys to be held by each terminal device by applying a process of shortening the length of the directional branch configuring the digraph. The A06(B) system is an improved system of the AI05 system where improvement is made in reducing the amount of calculation for key generation by forming the digraph such that the length of the directional branch becomes long. Moreover, the A06(A+B) system is an improved system of the AI05 system where improvement is made in reducing the number of keys to be held by each terminal device and the amount of calculation for key generation by forming the digraph of long directional branch similar to the A06(B) system and then replacing a predetermined directional branch with a short directional branch similar to the A06(A) system.

(Addressing of Issues)

Although the AI05 system, the A06(A) system, the A06(B) system, and the A06(A+B) system are systems greatly excelling in the effects of reducing the amount of calculation, the number of keys to be held by the terminal device, and the amount of calculation for key generation, how to acquire the information of the digraph for each terminal device to generate the key is not clearly described. Those skilled in the art can easily assume that each terminal device holds all information of the digraph in advance, or that each terminal device generates the digraph based on the algorithm same as the key distribution server.

However, assuming the key providing system that is actually used, the amount of information of the digraph to be held by each terminal device and the amount of calculation for generating the digraph are enormous, and thus holding or generating the digraph in a limited resource of the general terminal device is very difficult. More specifically, considering the case of the A06(B) system, the number n of terminal devices included in the key providing system is normally about $n=2^{32}$, and thus the amount of information to be held by each terminal device is about 32 GByte, which is difficult to hold in a storage unit of the general terminal device, even if the information of one directional branch can be expressed with about 8 byte. It can be easily recognized that distributing the enormous information of the digraph using the network or the recording medium is difficult.

It can also be easily recognized that when generating the digraph, (n−1) directional branches are to be calculated with respect to the number n of terminal devices $n=2^{32}$, and thus the calculation load for each terminal device to generate the digraph is very large. Therefore, the key distribution systems up to now have a very serious issue related to the means for each terminal device to acquire the information of the digraph for key generation, where the present invention aims to provide a means for solving the same. In particular, the present invention aims to provide a means capable of reducing the calculation load for each terminal device to generate the digraph and enabling each terminal device to generate the desired digraph.

The key distribution systems to which the technique of the present invention can be applied have been briefly described above and the issues thereof have been addressed, and the object of the present invention also has been clearly described. Hereinafter, a means for applying the technique of the present invention to each key distribution system described above will be disclosed and the details of each key distribution system described above will be described.

<First Embodiment>

The configuration of a key providing system 100 according to a first embodiment of the present invention and a specific system related to key distribution will be described in detail below. The present embodiment has characteristics in that a terminal device includes a means for efficiently generating the digraph in the key providing system 100 of the AI05 system.

[Configuration of Key Providing System 100]

A configuration of the key providing system 100 according to the first embodiment of the present invention will be described with reference to FIG. 1. FIG. 1 is an explanatory view showing the configuration of the key providing system 100 according to the present embodiment.

With reference to FIG. 1, the key providing system 100 is mainly configured by a key distribution server 102, terminal devices 122, and a network 10. The key distribution server 102 is an example of an information processing device.

(Network 10)

The network 10 will be described first. The network 10 is a communication line network for connecting the key distribution server 102 and the terminal device 122 in bidirectional communication or one-way communication. The network 10 is configured by a public line network such as Internet, telephone line network, satellite communication network, and broadcast communication path, and dedicated line network such as WAN (Wide Area Network), LAN (Local Area Network), IP-VPN (Internet Protocol-Virtual Private Network), and wireless LAN, and may be wired or wireless.

(Key Distribution Server 102)

The key distribution server 102 will be briefly described below. The detailed function configuration of the key distribution server 102 will be hereinafter described. The key distribution server 102 can encrypt and distribute various electronic data. For instance, the key distribution server 102 can encrypt and distribute content. In this case, the key distribution server 102 encrypts the content using a content key for encrypting and decrypting the content. The key distribution server 102 can also encrypt and distribute the content key to a predetermined terminal device 122. In this case, the key distribution server 102 can encrypt the content key using a key generated based on a predetermined algorithm so that only a predetermined terminal device 122 can decrypt the content key. According to such configuration, high security can be maintained even if the content key is distributed to the terminal device 122 that is not permitted to reproduce the content since only a predetermined terminal device 122 can carry out the decryption. The content key may be configured by an encryption content key and a decryption content key, or a decryption content key may be encrypted and distributed.

In order to realize such configuration, the key distribution server 102 generates a set key used to encrypt or decrypt the content key. In this case, the key distribution server 102 divides a plurality of terminal devices 122 to a plurality of groups, and generates a plurality of set keys respectively corresponding to each group. The key distribution server 102 expresses the group with a plurality of subsets forming a predetermined set, and generates the set key using a digraph representing the relationship between the subsets. The key distribution server 102 can acquire the digraph from another device or generate the same based on a predetermined algorithm.

The key distribution server 102 encrypts the content key using the predetermined set key. In this case, the key distribution server 102 selects at least one subset containing the terminal device 122 that is permitted to reproduce the content, and encrypts the content key using each set key corresponding to each selected subset. The selection is made such that all the permitted terminal devices 122 belong to the sum of sets of all the selected subsets.

The key distribution server 102 distributes the encrypted content key and the information of the selected subset along with the encrypted content to some or all of the terminal devices 122. Assume that at least one key (set key or intermediate key) for generating the set key corresponding to all the subsets to which it belongs is provided to the terminal device 122. The key distribution server 102 can also provide a predetermined algorithm for generating some or all of the digraphs desired by each terminal device 122.

According to such configuration, the key distribution server 102 can enable only a predetermined terminal device 122 to reproduce the distributed content key, and can easily respond to changing the combination of the terminal devices 122, which are permitted reproduction, by simply changing the combination of the set keys used in the encryption.

The key distribution server 102 uses the pseudo-random sequence generator (PRSG) when generating the set key. The PRSG is a device or a program capable of outputting a pseudo-random number sequence of a long period by inputting a predetermined seed value. The pseudo-random number generation logic is realized using linear congruential method and Mersenne Twister method. It should be recognized that the pseudo-random number may be generated using other logics or a predetermined special pseudo-random sequence may be used.

The key distribution server 102 is configured by an information processing device such as personal computer (PC) having a server function. The key distribution server 102 thus can transmit various types of information to an external device via the network 10. For example, the key distribution server 102 can distribute the content and the content key to a plurality of terminal devices 122 via the network 10.

The key distribution server 102 may have a function of providing content distribution service such as video distribution service, electronic music distribution service, and the like. That is, the key distribution server 102 can distribute video content of moving image or still image such as movie, television program, video program, and figure, audio content of music, lecture, and radio program, game content, document content, or content such as software. The key distribution server 102 can be configured to distribute the encrypted content key. For instance, the encrypted content may be distributed from the external device, and the key distribution server 102 may distribute the encrypted content key.

(Terminal Device 122)

The terminal device 122 will be briefly described below. The detailed function configuration of the terminal device 122 will be hereinafter described. The terminal device 122 can acquire various information from the key distribution server 102 via the network 10. For instance, the terminal device 122 can acquire the encrypted content and the content key. At the same time, the terminal device 122 can acquire information related to the subset selected by the key distribution server 102.

The terminal device 122 holds a key for generating the set key corresponding to the subset to which it belongs, and information of a predetermined algorithm for generating the digraph for generating the set key. Therefore, the terminal device 122 can calculate the digraph for generating the desired set key based on the predetermined algorithm. The terminal device 122 can also generate the desired set key using the key, which it holds in advance, and the calculated digraph.

The terminal device 122 can also decrypt the content key using the generated set key. Furthermore, the terminal device 122 can decrypt the content key using the decrypted content key. The terminal device 122 uses the pseudo-random sequence generator (PRSG) when generating the set key. The PRSG has substantially the same configuration as that used by the key distribution server 102 in generating the set key.

According to such configuration, the terminal device 122 can generate the desired digraph for deriving the set key corresponding to the subset to which it belongs. Thus, the terminal device 122 does not hold the information of all the digraphs, and can generate the digraph under realistic calculation load. As a result, the terminal device 122 can generate the desired set key based on the digraph, which it generated.

The terminal device 122 is configured by an information processing terminal that can information communicate with an external device by way of the network 10. The terminal device 122 is, for example, configured by information home electrical appliance such as PDA (Personal Digital Assistant), household game machine, DVD/HDD recorder, and television receiver, television broadcast tuner and decoder, and the like. The terminal device 122 may also be a portable device that can be carried around by the contractor such as portable game machine, portable telephone, portable video/audio player, PDA, and PHS.

The configuration of the key providing system 100 according to the present embodiment has been briefly described above with reference to FIG. 1. The configuration of the hardware of the key distribution server 102 and the terminal device 122 capable of realizing the above-described functions will be specifically described below with reference to FIG. 2.

[Hardware Configuration of Key Distribution Server 102 and Terminal Device 122]

Figure 2:
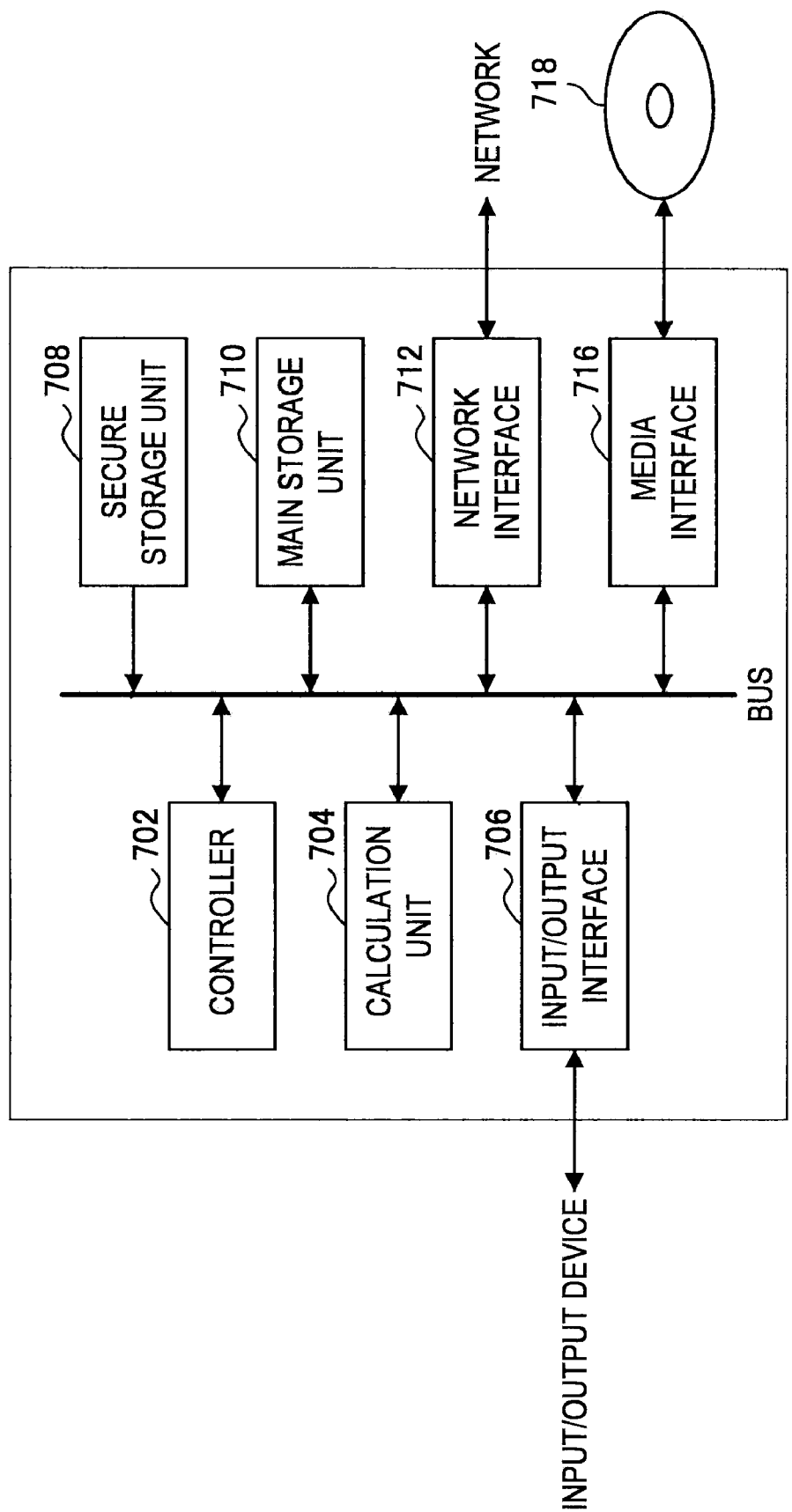
FIG. 2 is an explanatory view showing a hardware configuration of a key distribution server and a terminal device according to the embodiments.

One example of the hardware configuration of the key distribution server 102 and the terminal device 122 according to the present embodiment will be described with reference to FIG. 2. FIG. 2 is an explanatory view showing the hardware configuration capable of realizing the functions of the key distribution server 102 or the terminal device 122.

As shown in FIG. 2, the key distribution server 102 and the terminal device 122 are configured by a controller 702, a calculation unit 704, an input/output interface 706, a secure storage unit 708, a main storage unit 710, a network interface 712, and a media interface 716.

(Controller 702)

The controller 702 is connected to other components by way of a bus, and realizes a function of controlling each unit based on the program and the data stored in the main storage unit 710. The controller 202 may be configured by calculation processing devices such as a central processing unit (CPU).

(Calculation Unit 704)

The calculation unit 704 of the key distribution server 102 can realize encryption/decryption of content, encryption/decryption of content key, generation of digraph, generation of set key, and generation of intermediate key used to generate the set key. The calculation unit 704 can realize the function of the pseudo-random sequence generator (PRSG).

The calculation unit 704 is configured by calculation processing devices such as a central processing unit (CPU), and can realize each function described above based on the program and the data stored in the main storage unit 710. For instance, the calculation unit 704 can generate the digraph based on the program recorded in the main storage unit 710. Therefore, the predetermined algorithm for generating the digraph can be realized by the program recorded in the main storage unit 710 or the secure storage unit 708. The calculation unit 704 can record the output result in the main storage unit 710 or the secure storage unit 708. The calculation unit 704 may be integrally formed with the controller 702.

(Input/Output Interface 706)

The input/output interface 706 is mainly connected to an input device for the user to input data, and an output device for outputting the calculation result or the content of the content. The input device may be keyboard, mouse, track ball, touch pen, keypad, touch panel, or the like. The input device may be wire or wirelessly connected to the input/output interface 706. The input device may be a wired or wirelessly connected portable electronic device such as portable telephone and PDA. The output device may be a display device such as display, an audio output device such as speaker, or the like. The output device may be wire or wirelessly connected to the input/output interface 706.

The input/output interface 706 is connected to other components by way of a bus, and can transmit data input through the input/output interface 706 to the main storage unit 710, and the like. The input/output interface 706 outputs the data stored in the main storage unit 710, the data input through the network interface 712, or the calculation result output from the calculation unit 704 to the output device.

(Secure Storage Unit 708)

The secure storage unit 708 is a storage device for safely storing data requiring confidentiality such as mainly content key, set key, and intermediate key. The secure storage unit 708 may be configured by a magnetic storage device such as hard disc, an optical storage device such as optical disc, a magnetic-optical storage device, a semiconductor storage device, or the like. The secure storage unit 708 may have tamper resistance property.

(Main Storage Unit 710)

The main storage unit 710 may store an encryption program for encrypting the content or the content key, a decryption program for decrypting the encrypted content or content key, a key generation program for generating the set key or the intermediate key, or the like. The main storage unit 710 may temporarily or permanently store the calculation result output from the calculation unit 704, or record the data input from the input/output interface 706, the network interface 712, or the media interface 716. The main storage unit 710 may be configured by a magnetic storage device such as hard disc, an optical storage device such as optical disc, a magnetic-optical storage device, a semiconductor storage device, or the like.

(Network Interface 712)

The network interface 712 is connected to other communication devices by way of the network 10, and is a communication unit for transmitting and receiving encrypted content or content key, set key, intermediate key, parameter used in encryption, and data related to the set of terminal devices 122 permitted to reproduce the content. The network interface 712 is connected to other components by way of the bus, and transmits data received from the external device on the network 10 to other components or transmits data of other components to the external device on the network 10.

(Media Interface 716)

The media interface 716 is an interface for removably attaching an information media 718 to read or write data, and is connected to other components by way of the bus. The media interface 716 has a function of reading out the data from the attached information media 718 and transmitting the same to other components, or writing the data provided from other components to the information media 718. The information media 718 may be a portable storage medium (removable storage medium) such as optical disc, magnetic disc, and semiconductor memory, or may be a storage medium of an information terminal wire or wirelessly connected at a relatively close distance without the network 10.

One example of the hardware configuration capable of realizing the functions of the key distribution server 102 and the terminal device 122 has been described above. Each component above may be configured using a universal member or may be configured by a dedicated hardware specialized for the function of each component. Therefore, the hardware configuration to use can be appropriately changed according to the technical level at the time of implementing the present embodiment. The components such as the media interface 716 or the input/output interface 706 may be omitted depending on the usage mode.

[Configuration of Key Distribution Server 102]

Figure 3:
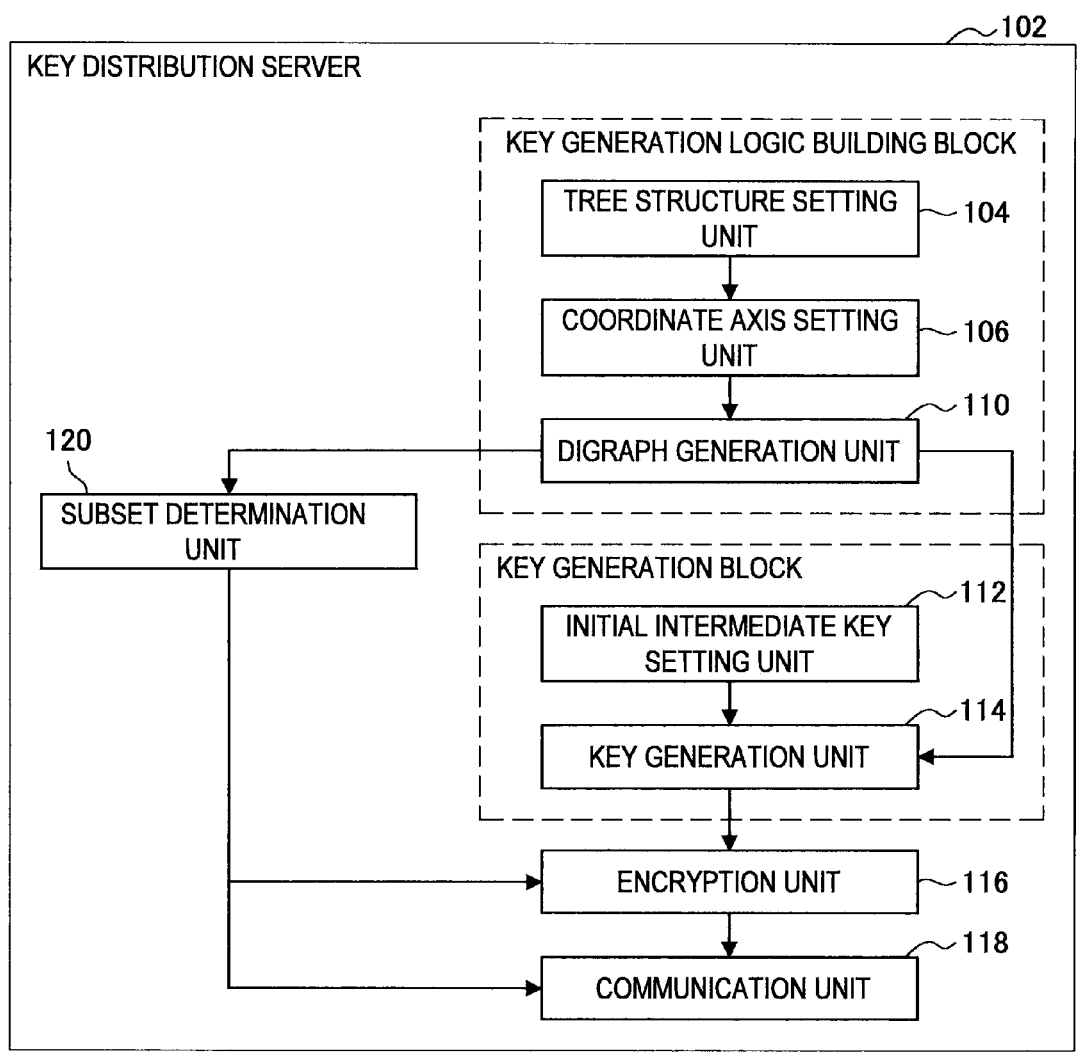
FIG. 3 is an explanatory view showing a function configuration of a key distribution server according to a first embodiment of the present invention.

The function configuration of the key distribution server 102 according to the present embodiment will now be described in detail with reference to FIG. 3. FIG. 3 is an explanatory view showing a function configuration of the key distribution server 102.

As shown in FIG. 3, the key distribution server 102 is mainly configured by a tree structure setting unit 104, a coordinate axis setting unit 106, a digraph generation unit 110, an initial intermediate key setting unit 112, a key generation unit 114, an encryption unit 116, a communication unit 118, and a subset determination unit 120. The tree structure setting unit 104, the coordinate axis setting unit 106, and the digraph generation unit 110 are collectively referred to as "key generation logic building block". The initial intermediate key setting unit 112 and the key generation unit 114 are collectively referred to as "key generation block".

[Key Generation Logic Building Block]

First, the function configuration of the key generation logic building block will be described.

(Tree Structure Setting Unit 104)

First, the function configuration of the tree structure setting unit 104 will be described with reference to FIG. 4. The tree structure setting unit 104 has a function of generating a logical binary tree BT shown in FIG. 4. The method of building the logical binary tree BT by the tree structure setting unit 104 will be described in detail below. In the following description, the terminal device 122 of the contractor u is sometimes expressed as simply contractor u. The mathematical expression defined below is used.

(1) Set N representing all contractor=(1, ..., n) is defined as N={1, ..., n} (n is power of 2)
(2) The following expression is defined for natural numbers i and j $$[i, j] = \{i, i+1, \ldots, j\} \text{ (where } i < j\text{)}$$

$$[j, i] = \{i, i-1, \ldots, j\} \text{ (where, } i < j\text{)}$$

$$(i \rightarrow i) = (i \leftarrow i) = \{\{i\}\}$$

$$(i \rightarrow j) = \{\{i\}, \{i, i+1\}, \ldots, \{i, i+1, \ldots, j\}\}$$
$$= \{[i, i], [i, i+1], \ldots, [i, j]\} \text{ (where, } i < j\text{)}$$

$$(i \leftarrow j) = \{\{j\}, \{j, j-1\}, \ldots, \{j, j-1, \ldots, i\}\}$$
$$= \{[j, j], [j, j-1], \ldots, [j, i]\} \text{ (where, } i < j\text{)}$$

The node positioned at the terminating end on the logical binary tree BT is called the leaf node, the node positioned at the vertex is the root node, and each node positioned between the root node and the leaf node is the intermediate node. Each leaf node is corresponded to each contractor 1, ..., n. In the example of FIG. 4, a case where the number of leaf nodes n of the BT is n=64 is shown.

(Formation of Binary Tree)

First, the tree structure setting unit 104 creates the logical binary tree BT in which the number of leaf nodes is n (e.g., n=64). The tree structure setting unit 104 corresponds numbers 1, ..., n to each leaf node from the left end towards the right. The tree structure setting unit 104 then corresponds the leaf nodes of numbers 1, ..., n to the contractor 1, ..., n.

The tree structure setting unit 104 then defines indices $l_v$ and $r_v$ that determine the subset to correspond to an intermediate node v. Here, v is a number given in a predetermined order to each intermediate node contained in the logical binary tree BT, and is an index representing the position of the intermediate node. The tree structure setting unit 104 then sets the number of the leaf node at the most left as $l_v$ and the number of the leaf node at the most right as $r_v$ of the leaf nodes positioned at the terminating end of the branch extending from the intermediate node v.

The tree structure setting unit 104 then classifies each intermediate node configuring the logical binary tree BT into two sets ($BT_L$, $BT_R$). The tree structure setting unit 104 defines the set of intermediate nodes positioned on the left side of a parent node as $BT_L$ and the set of intermediate nodes positioned on the right side of the parent node as $BT_R$ of the intermediate nodes existing on the logical binary tree BT. The parent node refers to a node positioned at a higher level of the two nodes connected by a branch.

(Regarding Root Node)

The tree structure setting unit 104 corresponds the set $(1 \rightarrow n)$ and the set $(2 \leftarrow n)$ to the root node of the logical binary tree BT. The set representing some or all of the leaf nodes existing at the lower level of the root node can be configured by combining a plurality of subsets contained in the set $(1 \rightarrow n)$ and the set $(2 \leftarrow n)$. For instance, all the leaf nodes excluding the leaf node u $(1 \leq u \leq n)$ can be expressed using the sum of sets of the subsets $\{1, \ldots, u-1\}$ contained in the set $(1 \rightarrow n)$ and the subsets $\{n, \ldots, u+1\}$ contained in the set $(2 \leftarrow n)$.

(Specific Example)

Figure 4:
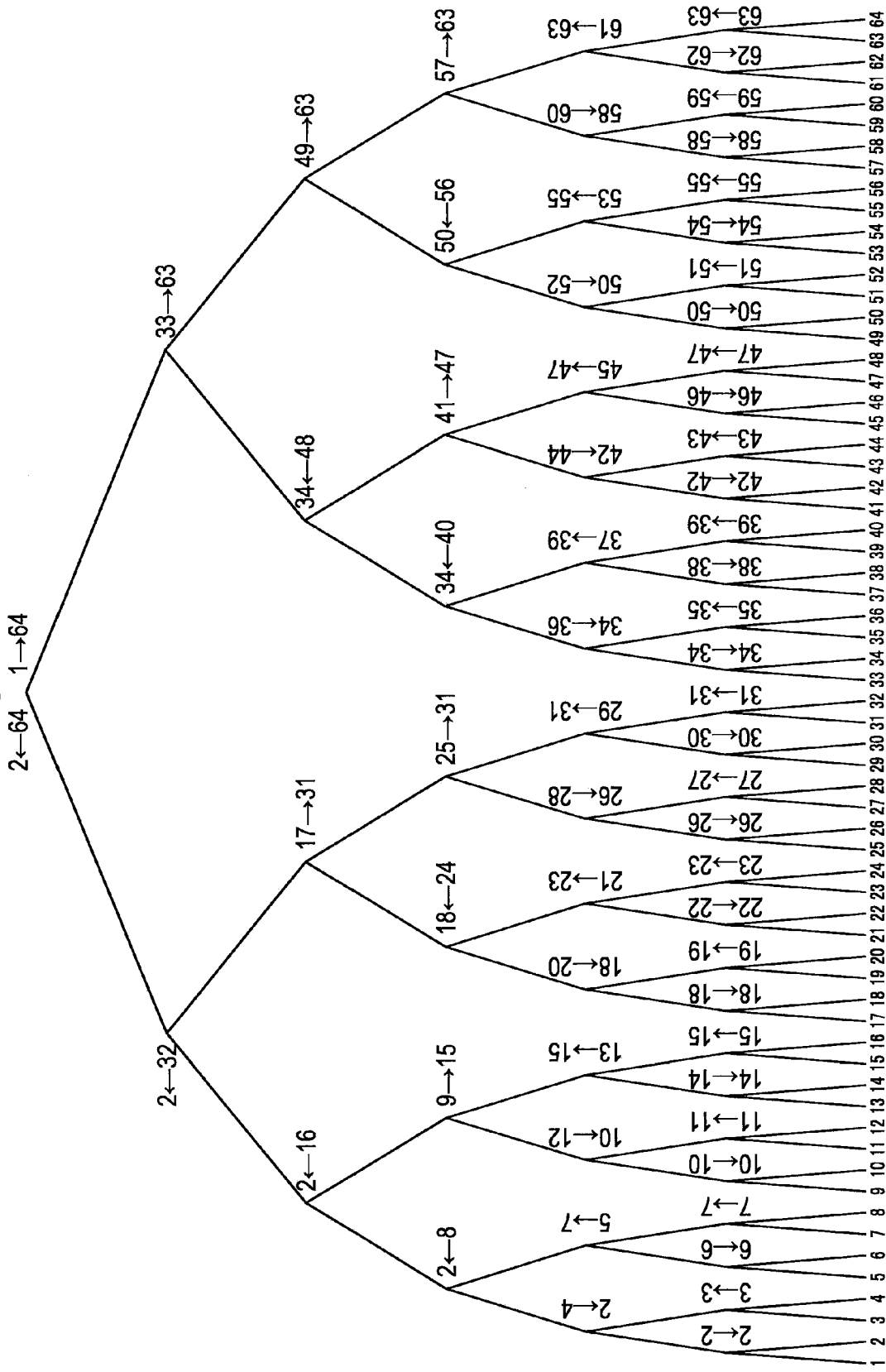
FIG. 4 is an explanatory view showing a structure of a logical binary tree according to the embodiment.

The root node of the logical binary tree BT (n=64) shown in FIG. 4 is corresponded with the set $(1 \rightarrow 64)$ and the set $(2 \leftarrow 64)$. The set $(1 \rightarrow 64)$ contains subsets [1,1], ..., [1,64] as elements. For instance, the group of leaf nodes containing all the leaf nodes 1, ..., 64 is expressed as the subset [1,64]= $\{1, \ldots, 64\}$. The group of all the leaf nodes excluding the leaf node 16 and the leaf node 17 is expressed by the subset [1,15] and the subset [64,18]. Here, the subset [1,15] is contained in the set $(1 \rightarrow 64)$, and the subset [64,18] is contained in the set $(2 \leftarrow 64)$.

(Regarding Intermediate Node)

The tree structure setting unit 104 then corresponds the subset to each intermediate node configuring the logical binary tree BT. The tree structure setting unit 104 corresponds the set $(l_v+1 \leftarrow r_v)$ to the intermediate node v belonging to the set $BT_L$. The tree structure setting unit 104 also corresponds the set $(l_v \rightarrow r_v-1)$ to the intermediate node belonging to the set $BT_R$.

(Specific Example)

For instance, with reference to FIG. 4, the set $(2 \leftarrow 4)$ is corresponded to the intermediate node v corresponding to $l_v=1$, $r_v=4$. Since $l_v=1$, $r_v=4$, the leaf nodes 1, ..., 4 are positioned at the terminating end of the leaf node v. For instance, the combination of the leaf nodes 1, 2, 4 are expressed by the subset $[1,2]=\{1,2\}$ contained in the set $(1 \rightarrow 64)$ of the root node positioned at the higher level of the intermediate node v and the subset $[4,4]=\{4\}$ contained in the subset $(2 \leftarrow 4)$ of the intermediate node v.

An arbitrary group of leaf nodes can be expressed by combining the subsets contained in the set corresponded to the root node and each intermediate node of the logical binary tree BT, as can be presumed from the specific example. That is, the group including a predetermined contractor of a plurality of contractor can be expressed by the combination of subsets. Hereinafter, the sum of sets representing the entire set corresponded to each node of the logical binary tree BT is referred to as the set system SS, and is defined as equation (1).

[Equation 1]

$$SS = \left\{ \bigcup_{v \in BT_L} (l_v + 1 \leftarrow r_v) \right\} \cup \left\{ \bigcup_{v \in BT_R} (l_v \rightarrow r_v - 1) \right\} \cup (1 \rightarrow n) \cup (2 \leftarrow n) \quad (1)$$

The function configuration of the tree structure setting unit 104 according to the present embodiment has been described above. As described above, the tree structure setting unit 104 provides a means for corresponding a predetermined subset to each node of the logical binary tree BT, and expressing the group of contractor by the combination of subsets. The generation means of the digraph defining the relationship between each subset will now be described.

(Coordinate Axis Setting Unit 106)

The function configuration of the coordinate axis setting unit 106 will be described with reference to FIG. 5. The coordinate axis setting unit 106 has a function of setting a plurality of horizontal coordinate axes for forming the digraph.

The coordinate axis setting unit 106 corresponds the plurality of subsets contained in the set ($1 \rightarrow n-1$) to each coordinate point on one horizontal coordinate axis so that the inclusion relation becomes larger towards the right, thereby forming the horizontal coordinate axis of the set ($1 \rightarrow n-1$). The coordinate axis setting unit 106 also corresponds the plurality of subsets contained in the set ($l_v \rightarrow r_v - 1$) corresponded to the intermediate v to the coordinate point on one horizontal coordinate axis so that the inclusion relation becomes larger towards the right with respect to the intermediate node v in $v \in BT_R$ of the logical binary tree BT, thereby forming the horizontal coordinate axis of the set ($l_v \rightarrow r_v - 1$). The coordinate axis setting unit 106 forms the horizontal coordinate axis of the set ($l_v \rightarrow r_v - 1$) with respect to all v in $v \in BT_R$.

The coordinate axis setting unit 106 then corresponds the plurality of subsets contained in the set ($2 \leftarrow n$) to each coordinate point on one horizontal coordinate axis so that the inclusion relation becomes larger towards the left, thereby forming the horizontal coordinate axis of the set ($2 \leftarrow n$). The coordinate axis setting unit 106 also corresponds the plurality of subsets contained in the set ($l_v + 1 \leftarrow r_v$) to each coordinate point on one horizontal coordinate axis so that the inclusion relation becomes larger towards the left, thereby forming the horizontal coordinate axis of the set ($l_v + 1 \leftarrow r_v$). The coordinate axis setting unit 106 forms the horizontal coordinate axis of the set ($l_v + 1 \leftarrow r_v$) with respect to all v in $v \in BT_R$.

Specifically, for example, the subsets [5,5], [5,6], [5,7] are corresponded in order from the left to each coordinate point of the horizontal coordinate axis of the set ($5 \rightarrow 7$)={[5,5], [5,6], [5,7]}.

The coordinate axis setting unit 106 arranges one temporary coordinate point each on the right side of the coordinate point positioned at the right end of the horizontal coordinate axis corresponding to the set ($1 \rightarrow n-1$) and the left side of the coordinate point positioned at the left end of the horizontal coordinate axis. The coordinate axis setting unit 106 arranges one temporary coordinate point each on the right side of the coordinate point positioned at the right end of the horizontal axis of the set ($l_v \rightarrow r_v - 1$) and the left side of the coordinate point positioned at the left end of the horizontal axis of the set ($l_v \rightarrow r_v - 1$). Furthermore, the coordinate axis setting unit 106 arranges one temporary coordinate point each on the right side of the coordinate point positioned at the right end of the horizontal coordinate axis of the set ($2 \leftarrow n$) and the left side of the coordinate point positioned at the left end of the horizontal coordinate axis of the set ($2 \leftarrow n$). The coordinate axis setting unit 106 further arranges one temporary coordinate point each on the right side of the coordinate point positioned at the right end of the horizontal coordinate axis of the set ($l_v + 1 \leftarrow r_v$) and the left side of the coordinate point positioned at the left end of the horizontal coordinate axis of the set ($l_v + 1 \leftarrow r_v$).

The function configuration of the coordinate axis setting unit 106 has been described above. The coordinate axis setting unit 106 can generate a plurality of horizontal coordinate axes for forming the digraph of the AI05 system. A means for generating the digraph on the horizontal coordinate axis generated by the coordinate axis setting unit 106 will now be described below.

(Digraph Generation Unit 110)

The function configuration of the digraph generation unit 110 will now be described with reference to FIG. 5. The digraph generation unit 110 has a function of generating the digraph H on each horizontal coordinate axis.

First, the digraph generation unit 110 sets a parameter k (k is an integer). The digraph generation unit 110 determines an integer x satisfying $n^{(x-1)/k} < r_v - l_v + 1 \leq n^{x/k}$. Here, k|log(n) (hereinafter, the base of log is 2) may be assumed. The parameter k is the number of intermediate keys to be held by the terminal device 122, and the amount related to the amount of calculation for generating the set key.

The digraph generation unit 110 then forms a rightward directional branch having a length of $n^{i/k}$ (i=0 to x−1) on the horizontal coordinate axis of the set ($1 \rightarrow n-1$) and the set ($l_v \rightarrow r_v - 1$). Specifically, the rightward directional branch having a length of $n^{i/k}$ is continuously formed until the directional branch reaches the temporary coordinate point on the right of the rightmost coordinate point or the next directional branch exceeds such temporary coordinate point from the temporary coordinate point on the left of the leftmost coordinate point corresponding to the subset of minimum number of elements while moving the counter i from zero to x−1. Furthermore, the digraph generation unit 110 forms a leftward directional branch having a length of $n^{i/k}$ (i=0 to x−1) on the horizontal coordinate axis of the set ($2 \leftarrow n$) and the horizontal coordinate axis of the set ($l_v + 1 \leftarrow r_v$). The digraph generation unit 110 forms the directional branch on the horizontal coordinate axis corresponding to all v. This is executed through a method of reversing left and right.

The digraph generation unit 110 then erases all directional branches having the temporary coordinate point arranged on each horizontal coordinate axis as the starting end or the terminating end. Furthermore, if a plurality of directional branches reaches one coordinate point, the digraph generation unit 110 erases all directional branches leaving only the longest directional branch from the plurality of directional branches. Through the above process, the digraph H($1 \rightarrow n-1$) of the set ($1 \rightarrow n-1$), the digraph H($2 \leftarrow n$) of the set ($2 \leftarrow n$), the digraph H($l_v \rightarrow r_v - 1$) of the set ($l_v \rightarrow r_v - 1$), and the digraph H($l_v + 1 \leftarrow r_v$) of the set ($l_v + 1 \leftarrow r_v$) are generated.

The digraph generation unit 110 adds the rightward directional branch having a length of one having the temporary coordinate point arranged on the right side of the horizontal coordinate axis of the set ($1 \rightarrow n-1$) as the terminating end to the digraph H($1 \rightarrow n-1$). That is, the digraph generation unit 110 executes the process of equation (2) and generates the digraph H($1 \rightarrow n$) of the set ($1 \rightarrow n$). Here, E(H(…)) represents the directional branch.

[Equation 2]

$$E(H(1 \rightarrow n)) = E(H(1 \rightarrow n-1)) \cup \{([1, n-1], [1, n])\} \quad (2)$$

The function configuration of the digraph generation unit 110 has been described above. The digraph generation unit 110 can generate the digraph H of the AI05 system according to the above configuration.

(Specific Example of Digraph)

Figure 5:
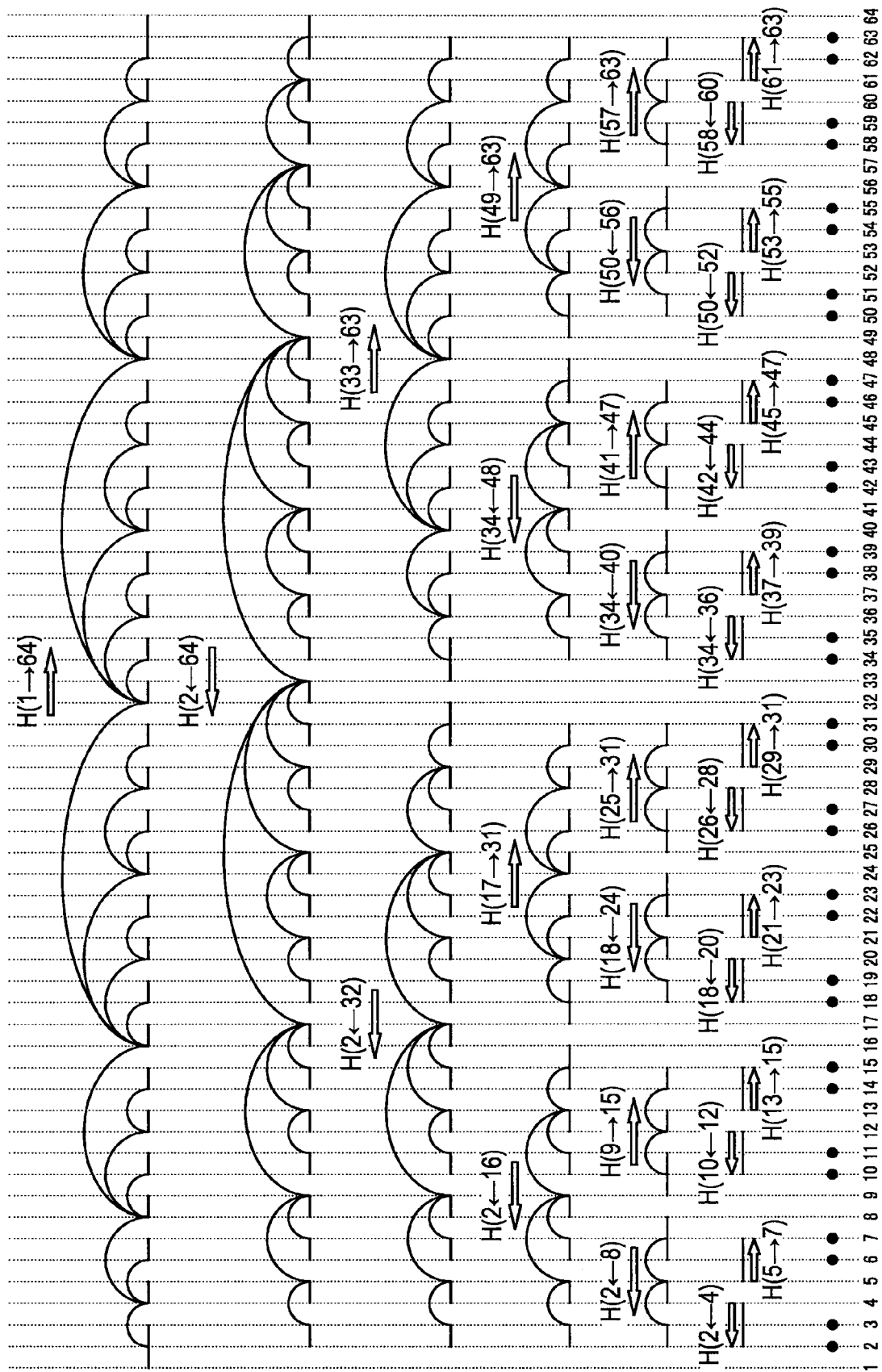
FIG. 5 is an explanatory view showing a digraph H according to the embodiment.

The configuration of the digraph will be specifically described using the digraph H($33 \rightarrow 63$) of FIG. 5 by way of example. The digraph H($33 \rightarrow 63$) is formed by a plurality of arch-shaped curves, and a line being connected to one end of each arch-shaped curve and extending horizontally. The arch-shaped curve and the horizontally extending line are directional branches. The line represents the directional branch having a length of one, and the curve represents the directional branch having a length of two or more, but whether a line or a curve is an issue of notation, and is irrelevant in nature.

The outlined arrow displayed on the upper side of the center of the digraph H($33 \rightarrow 63$) indicates the direction of the directional branch. The black circle drawn at the lowermost stage in FIG. 5 represents the digraph H($2 \leftarrow 2$), . . . , H($63 \rightarrow 63$) in order from the left.

With reference to FIG. 5, a plurality of digraphs H corresponding to the root node and the intermediate node of the logical binary tree BT and a plurality of vertical lines z (z=1 to 64) intersecting each digraph H are drawn. The intersection of the vertical line z and the digraph H represents the coordinate point of the horizontal coordinate axis. The intersection of the digraph H($1_v+1 \leftarrow r_v$) and the vertical line z represents the coordinate point corresponding to the subset $[r_v, z]$, and the intersection of the digraph H($1_v \rightarrow r_v-1$) and the vertical axis z represents the coordinate point corresponding to the subset $[1_v, z]$. For instance, the intersection of the digraph H($1 \rightarrow 64$) and the vertical line 10 is a coordinate point representing the subset [1,10]. The configuration of the key generation block for generating the set key using such digraph H will be described below.

[Key Generation Block]

The function configuration of the key generation block will be described in detail below.

(Key Generation Unit 114)

The function configuration of the key generation unit 114 will be described first. The key generation unit 114 has a function of generating the intermediate key or the set key based on the digraph H. The generation method of the set key by the key generation unit 114 will be described in detail below. In the following description, the coordinate point corresponded with the subset S is sometimes simply noted as coordinate point S. The following expression is used for the sake of convenience of the explanation.

Intermediate key corresponding to subset $S_i$: $t(S_i)$
Set key corresponding to subset $S_i$: $k(S_i)$
Content key: mek
Pseudo-random sequence generator: PRSG
Directional branch: E
Directional path: P The key generation unit 114 differs between the AI05 system and the system according to the present embodiment, and such aspect will be described. The key generation unit 114 uses the pseudo-random sequence generator PRSG for generating the set key. The key generation unit 114 of the AI05 system inputs the intermediate key $t(S_0)$ of the subset $S_0$ to the pseudo-random sequence generator PRSG, and acquires the set key $k(S_0)$ of the subset $S_0$ and the intermediate keys $t(S_1)$, $t(S_2)$, . . . , $t(S_q)$ corresponding to predetermined subsets $S_1$, $S_2$, . . . , $S_q$. The relationship between the subset $S_0$ and other subsets $S_1$, . . . , $S_q$ is defined by the digraph H. The set $S_0$, $S_1$, . . . , $S_q$ is one of the subsets configuring the set system SS.

Here, q is the number of directional branches having the coordinate point corresponding to the subset $S_0$ as the starting point.

In the following description, the output of the set key $k(S_0)$ and a plurality of intermediate keys $t(S_1)$, . . . , $t(S_q)$ as a result of the input of the intermediate key $t(S_0)$ to the pseudo-random sequence generator PRSG is expressed with equation (3). In referencing the digraph H, k directional branches having the coordinate point $S_0$ as the starting end exist, where if the coordinate points indicating the respective terminating ends are $S_1$, $S_2$, . . . , $S_q$, the coordinate points $S_1$, $S_2$, . . . , $S_q$ are noted in order from the closest to the coordinate point $S_0$.

[Equation 3]

$$t(S_1)\| \ldots \|t(S_q)\|k(S_0) \leftarrow \text{PRSG}(t(S_0)) \tag{3}$$

When the intermediate key $t(S_0)$ corresponding to the coordinate point $S_0$ of the horizontal coordinate axis is input, the pseudo-random sequence generator PRSG according to the AI05 system outputs the intermediate keys $t(S_1)$, $t(S_2)$, $t(S_3)$, . . . , $t(S_q)$ and the set key $k(S_0)$ corresponding to the coordinate point $S_0$ according to the subsets $S_1$, $S_2$, $S_3$, . . . , $S_q$ corresponded to the terminating end of the directional branch having the coordinate point $S_0$ as the starting end based on the digraph H of the AI05 system.

Since the integer determined by the digraph generation unit 110 is $1 \leq x \leq k$, the number of directional branches having each coordinate point of the digraph H as the starting end is k at maximum.

If the pseudo-random sequence generator PRSG is set so that the data output $t(S_1)\| \ldots \|t(S_q)\|k(S_0) \leftarrow \text{PRSG}(t(S_0))$ of $(q+1)^*\lambda$ bits is obtained with respect to the data input $t(S_0)$ of $\lambda$ bits, the key generation unit 114 can acquire the intermediate keys $t(S_1)$, $t(S_2)$, . . . , $t(S_q)$ and the set key $k(S_0)$ by delimiting and extracting the output of the PRSG by $\lambda$ bits from the left.

As a specific example, with reference to the digraph H($1 \rightarrow 64$) shown in FIG. 5, four directional branches are extended from the coordinate point $S_0$=[1,8] (eighth coordinate point from the left end). The terminating ends of the four directional branches are found to be coordinate points $S_1$=[1, 9], $S_2$=[1,10], $S_3$=[1,12], $S_4$=[1,16].

Therefore, when the intermediate key $t(S_0)$ is input to the pseudo-random sequence generator PRSG, the intermediate keys $t(S_1)$, $t(S_2)$, $t(S_3)$, $t(S_4)$ and the set key $k(S_0)$ are generated. Furthermore, when the obtained intermediate key $t(S_4)$ is input to the PRSG, the intermediate keys $t(S_{11})$, $t(S_{12})$, $t(S_{13})$, $t(S_{14})$, $t(S_{15})$ and the set key $k(S_4)$ corresponding to the terminating end coordinate points $S_{11}$=[1,17], $S_{12}$=[1,18], $S_{13}$=[1,20], $S_{14}$=[1,24], $S_{15}$=[1,32] of the directional branch having the coordinate point $S_4$ as the starting point are generated.

The input/output of the PRSG according to the present embodiment can be expressed as $t(S_1)\| \ldots \|t(S_k)\|k(S_0) \leftarrow \text{PRSG}(t(S_0))$.

In other words, the output of the PRSG used in the AI05 system is such that the output of $(q+1)\lambda$ bits is obtained with respect to the input of $\lambda$ bits when the number of effective branches having the coordinate point corresponding to the input intermediate key as the starting point is q. The PRSG used in the present embodiment, on the other hand, is configured to obtain the output of $(k+1)\lambda$ bits regardless of the value of q. Here, k is the system parameter.

In the present embodiment, the output obtained when the intermediate key $t(S_0)$ corresponding to the subset $S_0$ is input to the PRSG is $t(S_1)\| \ldots \|t(S_k)\|k(S_0)$. The portion of $t(S_1)\| \ldots \|t(S_k)$ is the intermediate key of the subsets $S_1$, . . . , $S_k$ corresponding to each coordinate point, which is the ending point of the effective branch having the coordinate point corresponding to the subset $S_0$ as the starting point, and the length of the directional branch connecting the coordinate point corresponding to the subset $S_0$ and the coordinate point corresponding to the subset $S_i$ is $n^{(i-1)/k}$.

For instance, if the length of the directional branch connecting the coordinate point corresponding to the subset $S_0$ and the coordinate point $2/k$ corresponding to the subset $S_i$ is $n^{2/k}$, the portion of $\lambda$ bits third from the beginning of the output of the PRSG ($t(S_0)$) becomes $t(S_i)$.

If the branch having a length of $n^{(i-1)/k}$ is not extended from the coordinate point corresponding to the subset $S_0$, the portion of $t(S_i)$ is not used even if output from the PRSG. For instance, in the effective graph of the system in which $n^{1/k}=2$, if the directional branch having a length of one and a length of four are extended from a certain coordinate point $S_0$ but the directional branch having a length of two is not extended, the portion of the first $\lambda$ bits of the output of the PRSG($t(S_0)$) becomes the intermediate key of the subset corresponding to the coordinate point that is the ending point of the directional branch having a length of one, and the portion of the third $\lambda$ bits becomes the intermediate key of the subset corresponding to the coordinate point that is the ending point of the directional branch having a length of four. In this case, the portion of the second $\lambda$ bits is not used as the directional branch having a length of two does not exist.

As opposed to the AI05 system in which the output portion of the PRSG that becomes the intermediate key of a certain coordinate point depends on the presence of other directional branches extending from the parent coordinate point, in the present embodiment, which portion of the output of the PRSG to use is uniquely defined depending only on the distance between the certain coordinate point and the parent coordinate point thereof by defining the usage method of the PRSG as above, and thus other branches may not be known.

Therefore, the key generation unit 114 can derive the set key corresponding to a plurality of coordinate points connected by a plurality of directional branches by repeatedly executing the pseudo-random number generation calculation based on the digraph H. The path between the two coordinate points formed by a plurality of directional branches is hereinafter referred to as a directional path P.

The pseudo-random sequence generator PRSG capable of calculating, from the set key $k(S_0)$, other set keys $k(S_1)$, ..., $k(S_q)$ based on the digraph H may be used when significant attention is not paid to safety, or when attempting to reduce the amount of calculation for generating the set key. According to such configuration, when the set key $k(S_0)$ is input to the pseudo-random sequence generator PRSG, the set keys $k(S_1), k(S_2), k(S_3), \ldots, k(S_q)$ corresponding to the reaching destinations of the directional branches extending from the coordinate point $S_0$ are output.

The function configuration of the key generation unit 114 has been described above. As can be easily recognized from the above example, the key generation unit 114 uses the intermediate key, if holding a certain intermediate key, and iteratively executes the pseudo-random sequence generator PRSG to derive the intermediate key and the set key corresponding to all the coordinate points that can be reached by the chain of directional branches (directional path P) extending from the coordinate point corresponding to the intermediate key.

(Initial Intermediate Key Setting Unit 112)

The function configuration of the initial intermediate key setting unit 112 will now be described. The initial intermediate key setting unit 112 has a function of setting the intermediate key to be held by the key distribution server 102 to generate the desired set key.

As described above, the key generation unit 114 iteratively executes the pseudo-random sequence generator PRSG to generate the set key corresponding to all the coordinate points that can be reached by the directional path having the coordinate point S corresponding to the input intermediate key $t(S)$ as the starting point. Therefore, the key distribution server 102 has to at least hold the intermediate key of the coordinate point (hereinafter referred to as route) corresponding to the starting point of the digraph H of each set when generating the set key of the subsets contained in all the sets corresponded to the root node and the intermediate node configuring the logical binary tree BT by the key generation unit 114.

The initial intermediate key setting unit 112 generates the intermediate key corresponding to the route of each digraph H. For instance, the initial intermediate key setting unit 112 generates a random number of $\lambda$ bits when setting up the key providing system 100, and sets the same as the intermediate key corresponding to the route of each digraph H. The route of the digraph H is defined as a coordinate point where the directional branch extends from the relevant coordinate point but the directional branch reaching such coordinate point does not exist. The coordinate [1,1] of the digraph H(1→64) shown in FIG. 5 is the route of the digraph H(1→64). For the graph in which the coordinate point is only one such as the graph H(3→3), such coordinate point is considered as a route although the directional branch is not extended therefrom.

The function configuration of the initial intermediate key setting unit 112 has been described above. As described above, the intermediate key for generating the set key corresponding to all the subsets is set by the initial intermediate key setting unit 112, and all the set keys can be generated by the key generation unit 114.

[Other Configurations]

The function configuration of each component other than the key generation logic building block and the key generation block will now be described.

(Subset Determination Unit 120)

The subset determination unit 120 determines the set key for encrypting the content key. That is, the subset determination unit 120 extracts at least one subset including the contractor permitted to reproduce the content (hereinafter referred to as permitted contractor), and determines the type (i.e., corresponding subset) of set key to be distributed to each contractor. For instance, the subset determination unit 120 determines the set (R) of the contractor (hereinafter referred to as eliminated contractor) not permitted to reproduce the content, and the set (N\R) of the permitted contractor excluding the set (R) of the eliminated contractor from the set (N) of all the contractor.

The subset determination unit 120 then determines a set of subsets $(S_1, S_2, \ldots, S_m)$ in which the set (N\R) of permitted contractor can be configured by sum of sets (N\R= $S_1 \cup S_2 \cup \ldots \cup S_m$) using the subset contained in the set system SS. In this case, the number m of subsets is preferably small. The subset determination unit 120 then extracts the ending point $EP_j$ of the digraph $H(SP_j \rightarrow EP_j)$ or the $H(EP_j \leftarrow SP_j)$ having the subset $S_j$ as the element with respect to each subset $S_j=[SP_j,TP_j]$ (where, j=1, ..., m). Here, $SP_j$ represents a number indicating the starting point of the digraph having $S_j$ as the element. The information related to such subset is referred to as sgi (sub-group information), and is expressed as equation (4).

[Equation 4]

$$sgi = \{\{S_1 = [SP_1, TP_1], EP_1\}, \ldots, \{S_m = [SP_m, TP_m], EP_m\}\} \quad (4)$$

(Encryption Unit 116)

The function configuration of the encryption unit 116 will now be described. The encryption unit 116 encrypts the content key using the set key, and generates an encrypted text. The encryption unit 116 encrypts the content key using a plurality of set keys corresponding to a predetermined subset of all the subsets configuring the set system SS. In this case, the encryption unit 116 may encrypt the content key using all the set keys generated by the key generation unit 114, but may encrypt the content key using the set keys $k(S_1), k(S_2), \ldots, k(S_m)$ corresponding to the set of subsets $(S_1, S_2, \ldots, S_m)$ determined by the subset determination unit 120. As a result, a plurality of encrypted texts may be generated with respect to one content key. The encryption unit 116 also encrypts the content using the content key.

Assume the directional path $P_j$ reaching the coordinate point $S_j = [SP_j, TP_j]$ from the coordinate point $[SP_j, SP_j]$ is specified from at least one directional branch configuring the digraph $H(SP_j \rightarrow EP_j)$ or the $H(EP_j \leftarrow SP_j)$, and the set key $k(S_j)$ is generated based on the information of the directional path $P_j$ by the digraph generation unit 110. The encryption unit 116 encrypts the content key mek using the set key $k(S_j)$. The encryption unit 116 also encrypts the content C using the content key mek. The content key mek encrypted by the set key $k(S_j)$ is expressed as $E_{k(S_j)}(s)$, and the content C encrypted by the content key mek is expressed as $E_s(M)$. The content keys $E_{k(S_1)}(s), E_{k(S_2)}(S), \ldots, E_{k(S_m)}(s)$ encrypted by the set keys $k(S_1), k(S_2), \ldots, k(S_m)$ of the subset including only the permitted contractor are sometimes referred to as header $h = \{E_{k(S_1)}(s), E_{k(S_2)}(s), \ldots, E_{k(S_m)}(s)\}$.

(Communication Unit 118)

The function configuration of the communication unit 118 will now be described. Mainly in time of system setup, the communication unit 118 distributes a predetermined intermediate key to each contractor based on the digraph H. In this case, the communication unit 118 distributes all the intermediate keys for each contractor to derive all the set keys of the subset to which the contractor is included. In time of system operation, the communication unit 118 distributes the content or the content key encrypted by the encryption unit 116 to all contractor. The communication unit 118 also distributes information for generating some or all of the digraphs to each contractor. Furthermore, the communication unit 118 distributes to each contractor the information (e.g., information of subset $(S_1, S_2, \ldots, S_m)$) related to the set (N\R) of the permitted contractor or the set $(N\backslash R = S_1 \cup S_2 \cup \ldots \cup S_m)$ of the permitted contractor.

That is, the communication unit 118 can distribute the information sgi related to the subset of at least the permitted contractor, the header h, and the encrypted content $E_s(M)$ to the terminal device 122 of the contractor. For instance, a case of permitting the decryption of the content to the contractor included in the subset $S_1 = [1,48], S_2 = [64,56]$ with respect to the number of contractor n=64 is considered. Since the digraph having the subsets $S_1, S_2$ as elements is digraph $H(1 \rightarrow 64)$ and $H(2 \leftarrow 64)$, the communication unit 118 distributes the information of equation (5) to the terminal device 122 of each contractor.

[Equation 5]

$$sgi = \{\{S_1 = [1,48], 64\}, \{S_2 = [64,56], 2\}\},$$

$$h = \{E_{k(S_1)}(s), E_{k(S_2)}(s)\},$$

$$E_s(M) \quad (5)$$

The function configuration of the key distribution server 102 according to the present embodiment has been described above. According to such configuration, the set key can be generated based on the digraph H of the AI05 system, and the content key can be encrypted and distributed. A content distribution service can be efficiently provided to the set of permitted contractor.

[Key Distribution Method]

Figure 6:
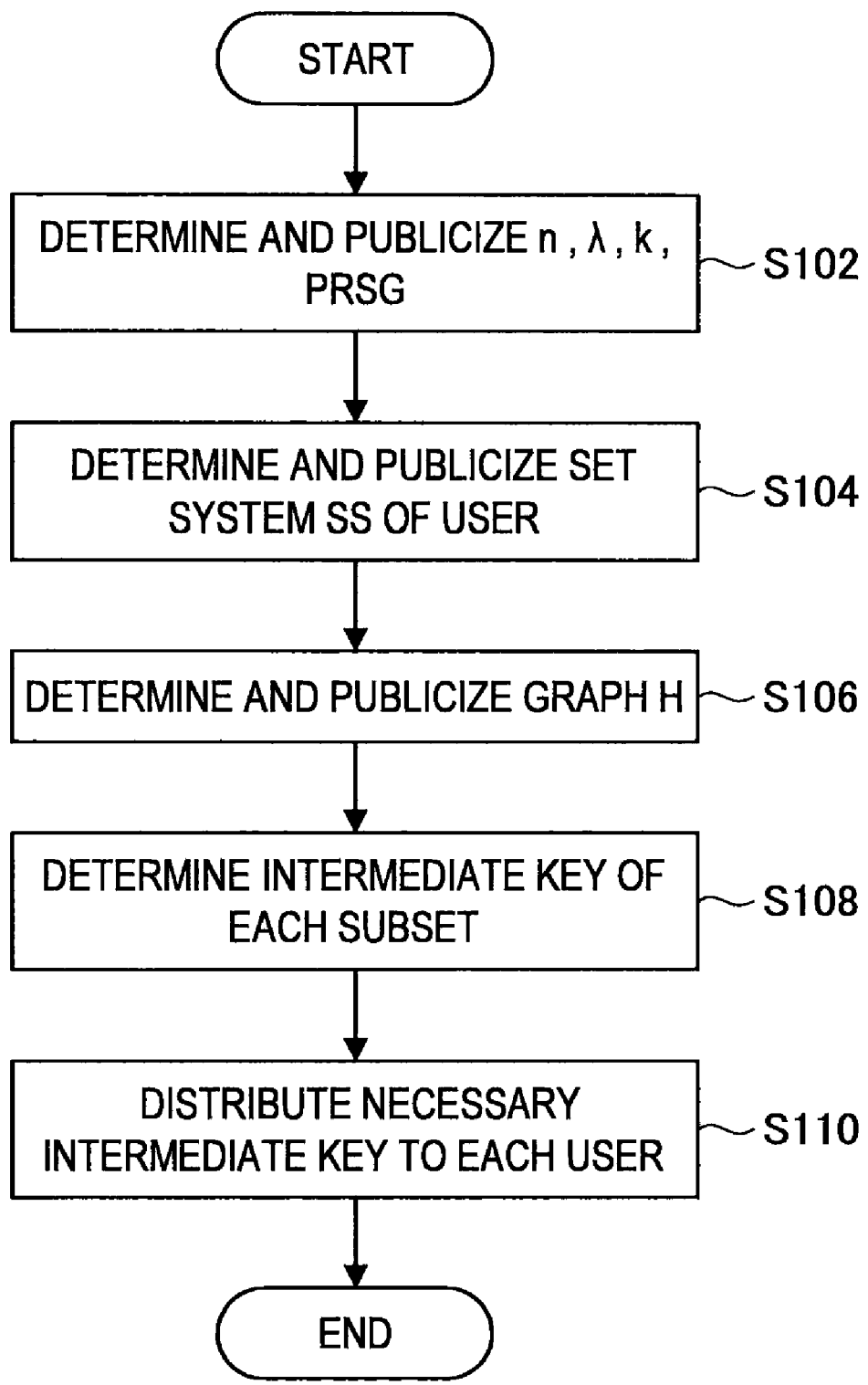
FIG. 6 is an explanatory view showing a flow of key distribution process according to the embodiment.
Figure 7:
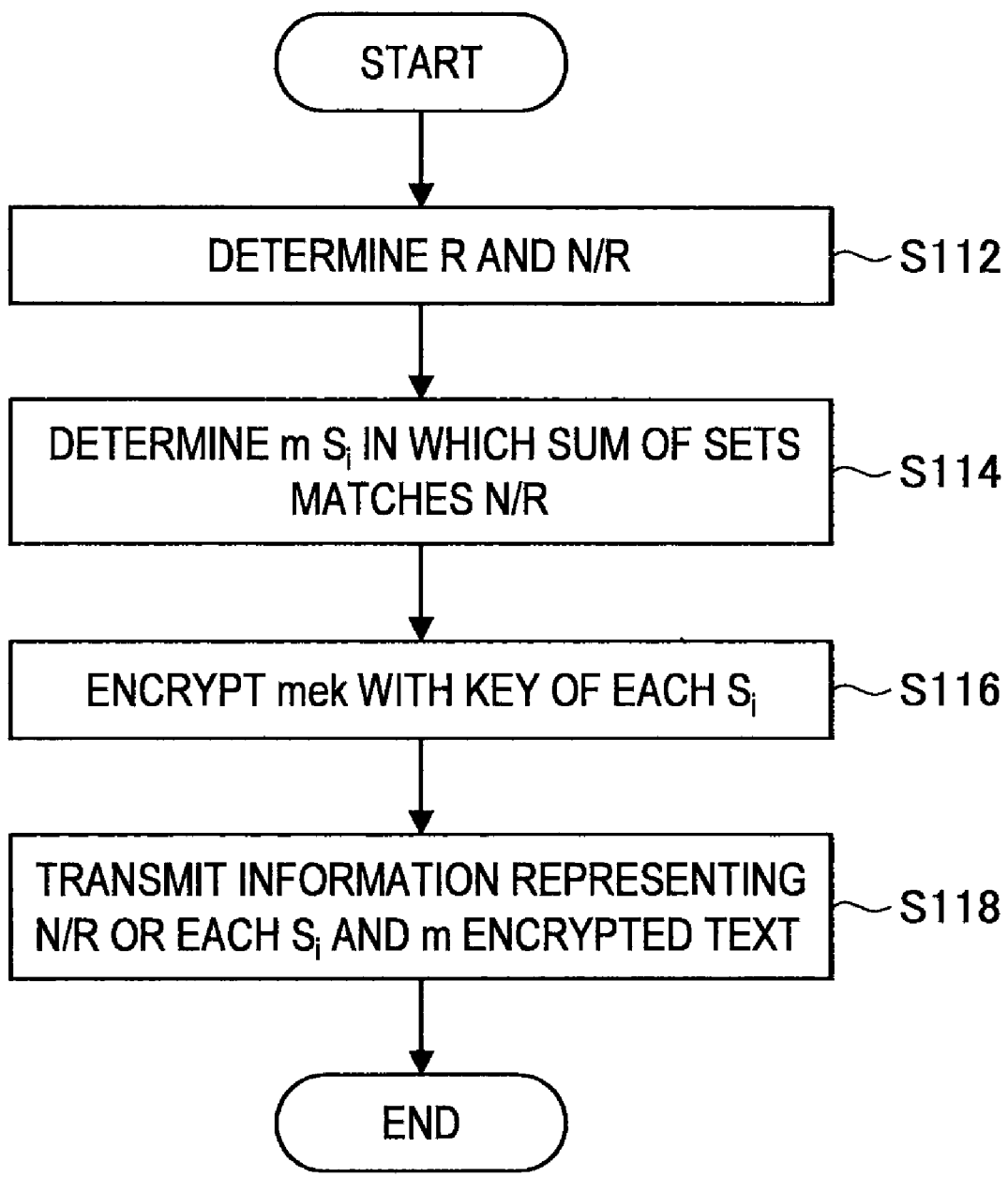
FIG. 7 is an explanatory view showing a flow of key distribution process according to the embodiment.

The key distribution method by the key distribution server 102 will now be described with reference to FIG. 6 and FIG. 7. FIG. 6 is an explanatory view showing a flow of key distribution process in time of system setup. FIG. 7 is an explanatory view showing a flow of process of distributing the content key.

(Key Distribution Method in Time of System Setup)

First, the key distribution method in time of system setup will be described with reference to FIG. 6.

As shown in FIG. 6, the key distribution server 102 determines the number of contractor n, number of bits λ of the set key and the intermediate key, a predetermined parameter k, and the pseudo-random sequence generation algorithm by PRSG, and the like, and publicizes the same to all the terminal devices 122 (S102). The key distribution server 102 then divides the set of terminal devices 122 to a predetermined subset, and then determines the set system SS (see equation (1)) expressed by the sum of sets, and publicizes the same to all the terminal devices 122 (S104). The key distribution server 102 determines the digraph H formed by a plurality of directional branches E, and publicizes part of or all of the information to all the terminal devices 122 (S106). The intermediate key corresponding to each subset configuring the set system SS is then determined (S108). The intermediate key for each terminal device 122 to derive the set key of all the subsets to which it belongs based on the digraph is distributed to each terminal device 122 (S110).

As described above, a plurality of intermediate keys for deriving the set key of all the subsets including the relevant contractor is provided in advance to each contractor in time of system setup. The intermediate key for deriving the set key of the subset not including the contractor is not provided to the contractor. The number of intermediate keys to be provided to each contractor is preferably a minimum. A method of selecting such intermediate key will be briefly described.

The key distribution server 102 first extracts all digraphs H that can reach the coordinate point of the subset to which the contractor u is included. If the contractor u is included in the subset corresponding to the route of the digraph H, only the intermediate key corresponding to such route is provided to the contractor u.

If the contractor u is included in one of the subsets corresponding to the coordinate point other than the route of the digraph H, the key distribution server 102 extracts the subset $S_0$ in which the contractor u is included in the subset $S_0$ and not included in the subset parent $(S_0)$ or the parent of the subset $S_0$. The intermediate key $t(S_0)$ corresponding to the relevant subset $S_0$ is then provided to the contractor u.

That is, if the contractor u is included in the subset corresponding to a plurality of coordinate points other than the route of the digraph H, the key distribution server 102 references the starting end of the directional branch that reaches each coordinate point, and selects the coordinate point such that the subset corresponding to the starting end of each coordinate point does not include the contractor. With the subset corresponding to such coordinate point as $S_0$, the subset corresponding to the starting end (parent) of the directional branch that reaches the coordinate point $S_0$ as parent ($S_0$), the key distribution server 102 provides to the contractor the intermediate key $t(S_0)$ corresponding to the coordinate point $S_0$ where the subset parent ($S_0$) corresponding to the parent coordinate point does not include the contractor u but the subset $S_0$ corresponding to the coordinate point includes the contractor u. The starting end parent (S) of one directional branch is expressed as the parent of the terminating end S of the relevant directional branch. The parent of the coordinate point $S_0$ is noted as parent($S_0$).

Furthermore, if such coordinate point $S_0$ exists in plurals, the key distribution server 102 provides the plurality of intermediate keys $t(S_0)$ corresponding thereto to the contractor u. Obviously, the parent of the coordinate point $S_0$ does not exist if the coordinate point $S_0$ is the route of the effective graph H. Only one parent of the coordinate point $S_0$ exists if not the route of the effective graph H.

(Specific Example 1)

Consider the intermediate key to be distributed to the contractor 1. First, the digraph H that can reach the subset to which the contractor 1 is included is extracted. With reference to FIG. 5, such digraph H is the digraph H(1→64). The contractor 1 belongs to the subset [1,1] corresponding to the route of the digraph H(1→64). Therefore, the intermediate key t([1,1]) is distributed to the contractor 1.

(Specific Example 2)

Consider the intermediate key to be distributed to the contractor 3. First, the digraph H that can reach the subset to which the contractor 3 is included is extracted. With reference to FIG. 5, such digraph H is the digraphs H(1→64), H(2←64), H(2←32), H(2←16), H(2←8), H(2←4), H(3→3). Considering the digraph H(1→64) first, the contractor 3 is not included in the subset [1,1] corresponding to the route of the digraph H(1→64).

However, the contractor 3 is included in the subsets [1,3], [1,4], . . . , [1,64] after the third coordinate point. With reference to the subset of the parent of such coordinate points, the coordinate point not including the contractor 3 in the subset of the parent is recognized to be only [1,3] and [1,4]. Therefore, the coordinate point [1,2] corresponding to the parent ([1,3]) and the parent ([1,4]) of the coordinate points [1,3], [1,4] does not include the contractor 3.

As a result, the intermediate keys t([1,3]) and t([1,4]) corresponding to the digraph H(1→64) are distributed to the contractor 3. Similarly, the intermediate key is selected for the other digraphs H(2←64), H(2←32), H(2←16), H(2←8), H(2←4), H(3→3), and distributed to the contractor 3. Consequently, a total of eight intermediate keys are distributed to the contractor 3.

(Distribution Method of Content Key)

The distribution method of the content key mek will be described below with reference to FIG. 7.

With reference to FIG. 7, the key distribution server 102 determines the set R of eliminated contractor, and determines the set N\R of permitted contractor (S112). Thereafter, m subsets $S_i$(i=1, 2, . . . , m) in which the sum of sets becomes N\R are selected from the subsets configuring the set system SS (S114). The content key mek is then encrypted using the set key k($S_i$) corresponding to each selected subset $S_i$ (S116). The information representing the set N\R or each subset $S_i$, and the m encrypted content keys mek are distributed to all the terminal devices 122 (S118).

The key distribution method in time of setup and the distribution method of the content key mek by the key distribution server 102 have been described above. According to the distribution method, the intermediate key for each permitted contractor to generate the set key is efficiently distributed.

[Generation Method of Digraph H]

Figure 9:
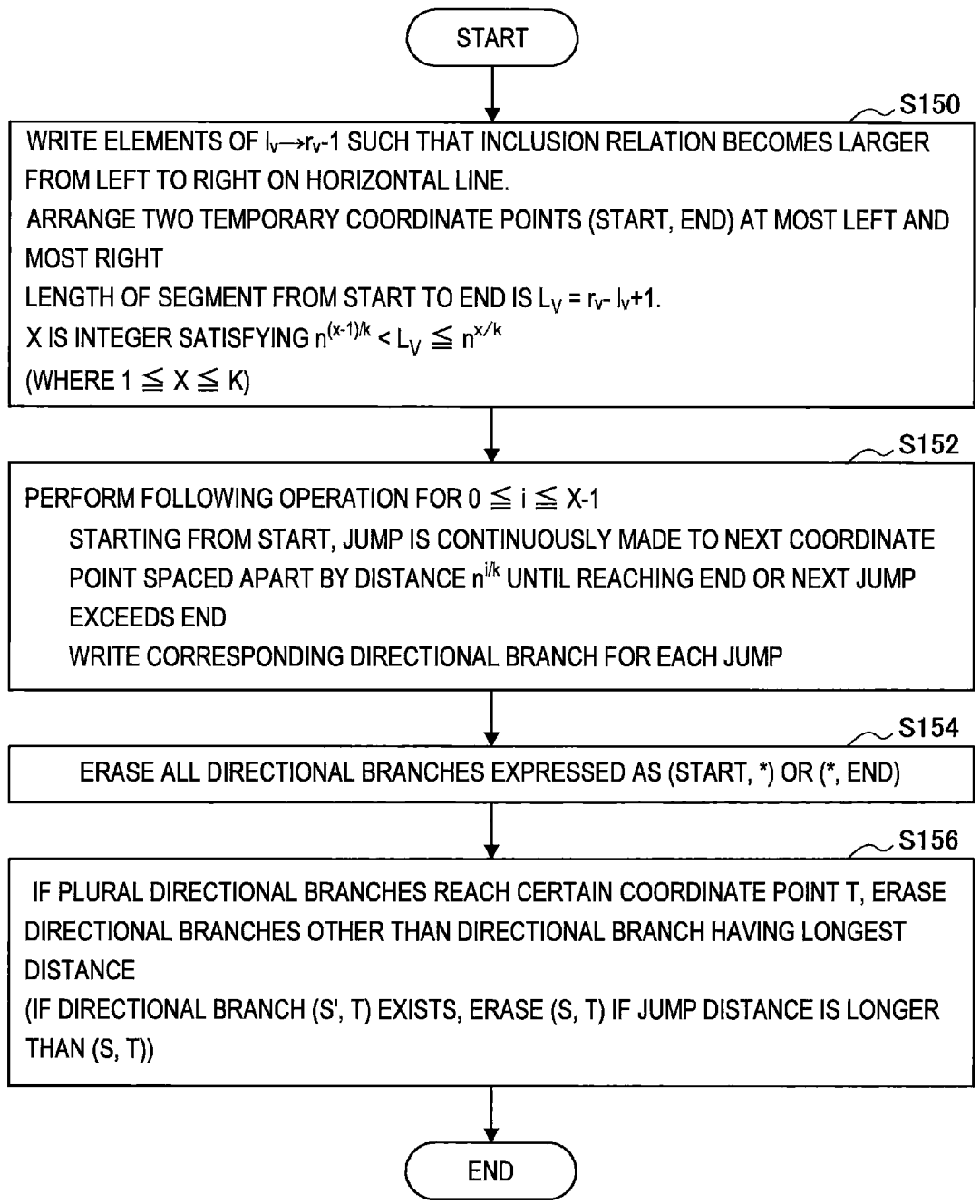
FIG. 9 is an explanatory view showing a flow of graph generation method according to the embodiment.

The generation method of the digraph H will now be described with reference to FIG. 9. FIG. 9 is an explanatory view showing a flow of generation process of the digraph $H(l_v \to r_v - 1)$.

With reference to FIG. 9, the coordinate axis setting unit 106 arranges the elements of the set $(l_v \to r_v - 1)$ such that the inclusion relation becomes larger from left to right on the horizontal line. One temporary coordinate point Start is then arranged on the left side of the leftmost coordinate point, and one temporary coordinate point End is arranged on the right side of the rightmost coordinate point. The length from the temporary coordinate point Start to the temporary coordinate point End becomes $L_v = r_v - l_v + 1$. Furthermore, the integer $x (1 \leq x \leq k)$ satisfying $n^{(x-1)/k} < L_v \leq n^{x/k}$ is calculated (S150).

The digraph generation unit 110 then performs the following operation while moving the counter i from 0 to x–1. Starting from the temporary starting point Start, jump is continuously made from such coordinate point to the coordinate point spaced apart by $n^{i/k}$ until reaching the temporary coordinate point End or the next jump exceeds the temporary coordinate point End. The directional branch corresponding to each jump is thereafter generated (S152). All the directional branches reaching the temporary coordinate point Start or End are then erased (S154). If a plurality of directional branches reaches a certain coordinate point T, the directional branches other than the directional branch having the longest jump distance are erased (S156).

The generation method of the digraph H has been described above. The digraph H shown in FIG. 5 can be generated by executing the above processes.

[Function Configuration of Terminal Device 122]

Figure 10:
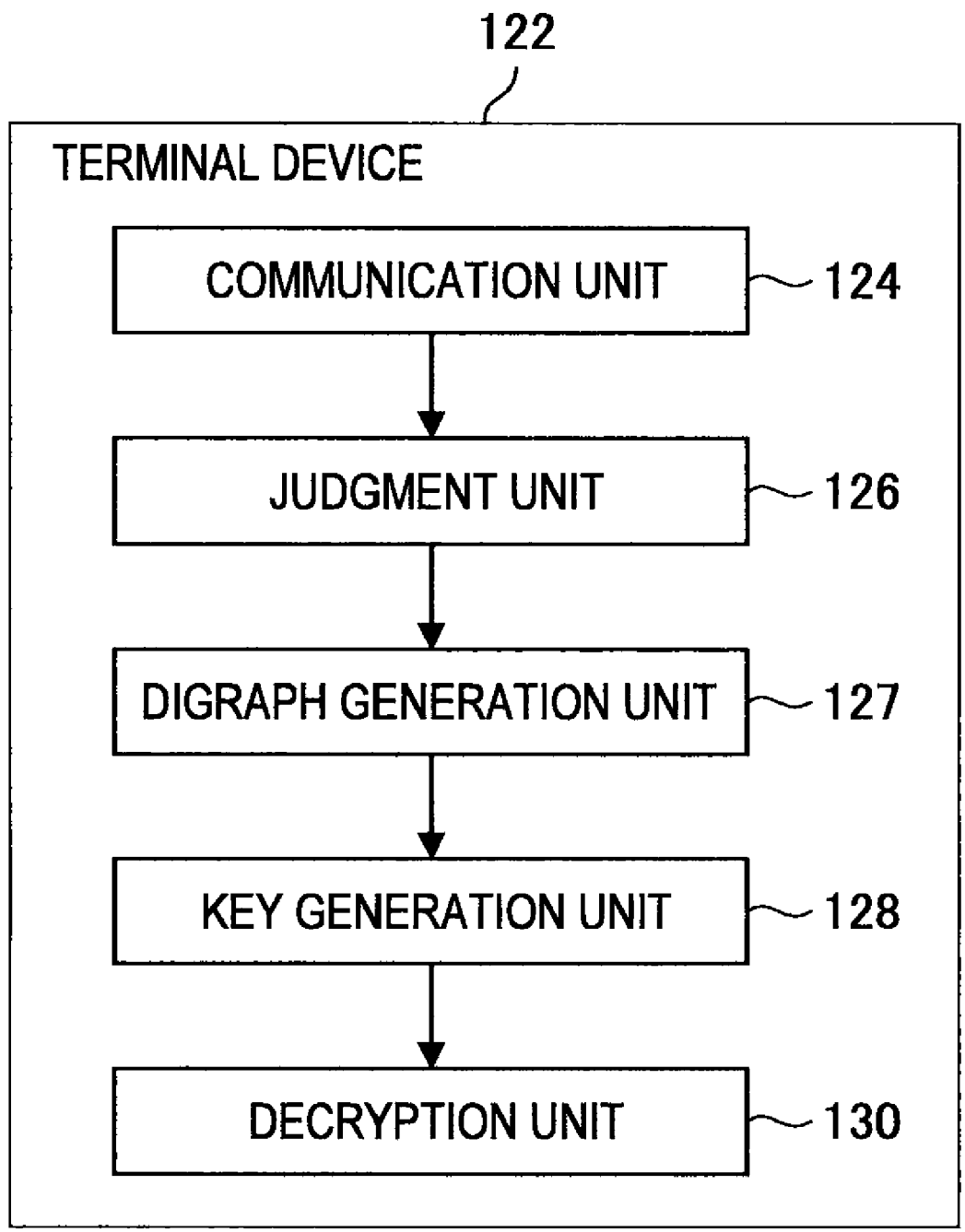
FIG. 10 is an explanatory view showing a function configuration of a terminal device according to the embodiment.

The function configuration of the terminal device 122 according to the present embodiment will now be described with reference to FIG. 10. FIG. 10 is an explanatory view showing the function configuration of the terminal device 122.

As shown in FIG. 10, the terminal device 122 is mainly configured by a communication unit 124, a judgment unit 126, a digraph generation unit 127, a key generation unit 128, and a decryption unit 130.

(Communication Unit 124)

The function configuration of the communication unit 124 will be first described. The communication unit 124 is an example of an acquiring unit for acquiring information distributed from the key distribution server 102. For instance, the communication unit 124 has a function of receiving information related to content, content key, intermediate key, and digraph, information related to permitted contractor, or the like distributed from the key distribution server 102.

The communication unit 124 may also be an acquiring unit for acquiring information from a plurality of information sources (e.g., key distribution server 102) connected to wire or wireless network or an information source (e.g., information media such as optical disc device, magnetic disc device, or portable terminal device) directly or indirectly connected without the network.

(Judgment Unit 126)

The function configuration of the judgment unit 126 will be described below. The judgment unit 126 judges whether or not it is included as an element in one of the subsets corresponding to the set key used in the encryption of the content key. That is, the judgment unit 126 judges whether or not it is included in one of the subsets selected by the subset determination unit 120 of the key distribution server 102. In this case, the judgment unit 126 references the subset of the permitted contractor acquired from the key distribution server 102.

(Digraph Generation Unit 127)

The function configuration of the digraph generation unit 127 will now be described. The digraph generation unit 127 has a function of generating only the directional path for deriving the set key of the subset to which it belongs in the digraph H used by the key distribution server 102 to derive the set key. That is, the digraph generation unit 127 can generate the digraph G configured only by the directional paths enabling the necessary set key to be derived.

The intersection of the digraphs H(a→b) and the H(b←a) and the vertical line z is noted as the coordinate point [a,z] in the above description, but the intersection of the digraph H and the vertical line z is expressed as the coordinate z in addition thereto in the following description. Therefore, it is to be noted that the coordinate point and the coordinate are different.

(Generation Method of Digraph G)

Figure 13:
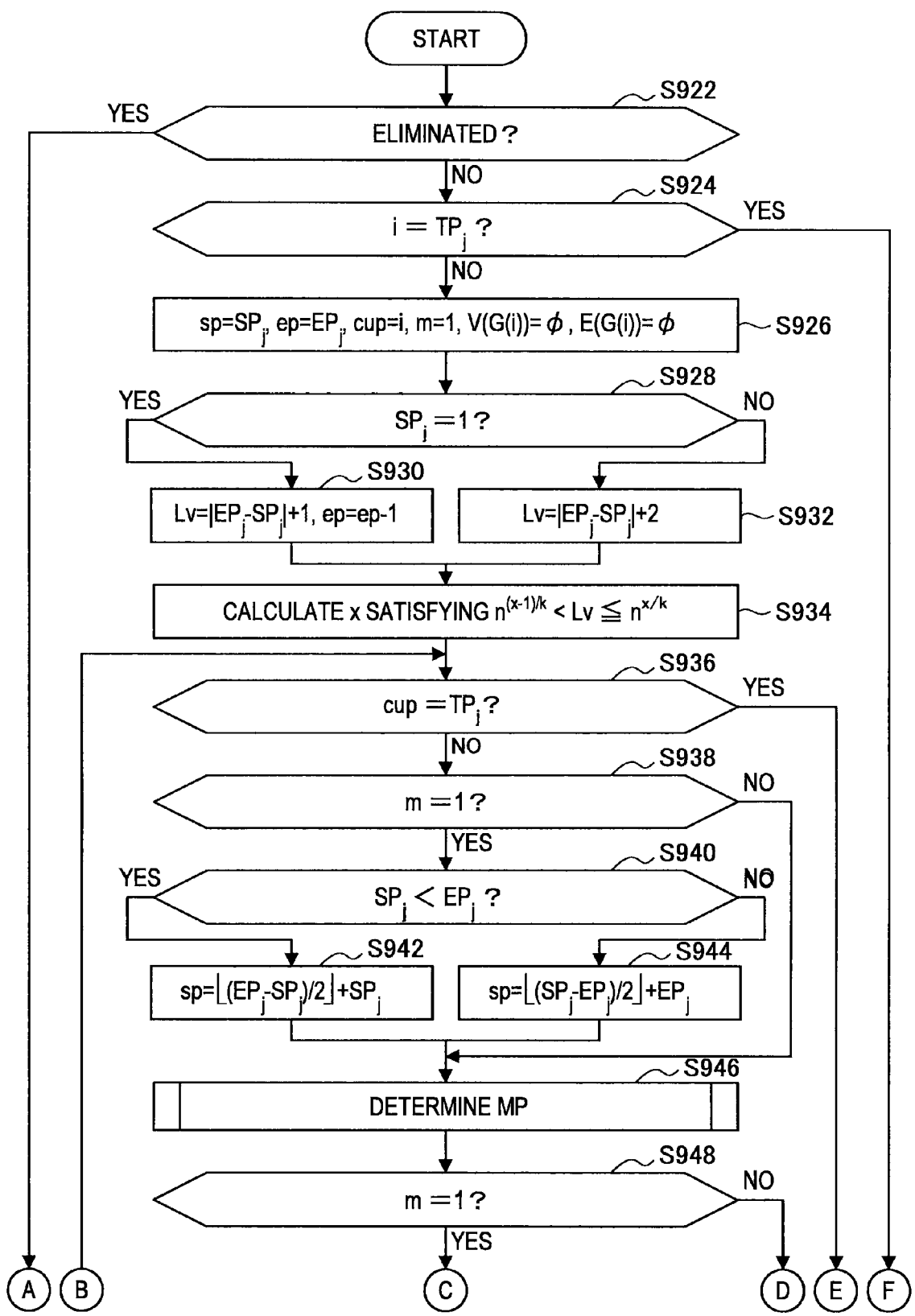
FIG. 13 is an explanatory view showing a flow of graph generation method according to the embodiment.
Figure 14:
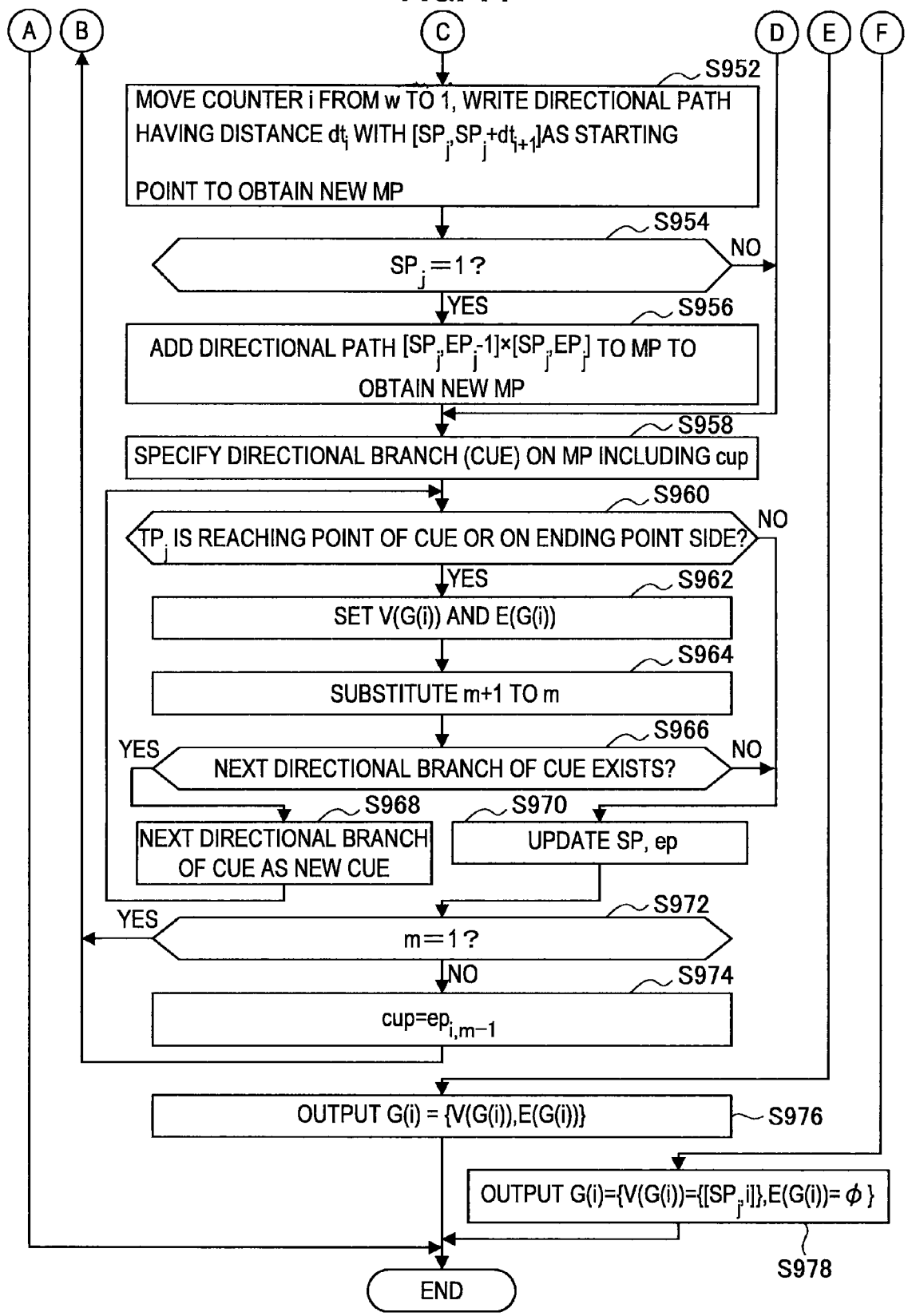
FIG. 14 is an explanatory view showing a flow of graph generation method according to the embodiment.

The generation method of the digraph G will be described in detail with reference to FIG. 13 and FIG. 14. FIG. 13 and FIG. 14 are explanatory views showing a flow of process for generating the digraph G for the contractor i to derive the set key $k(S_j)$ of the subset $S_j$ to which the contractor belongs.

Each symbol of A, B, C, D, E, F described at the lowermost stage of FIG. 13 and the uppermost stage of FIG. 14 is a symbol for clearly indicating the moving destination in the transition of processes of FIG. 13 and FIG. 14. For instance, the steps to reach A of FIG. 13 are assumed to have reached A of FIG. 14.

The terminal device 122 holds, in advance, the information of the number of contractor n and the parameter k. The digraph G is configured by the set V(G(i)) of coordinate points and the set E(G(i)) of directional branches, and is expressed as G(i)={V(G(i),E(G(i))}. If the coordinate point contained in the digraph G(i) is one, the set E(G(i)) of directional branches is expressed as E(G(i))=φ (symbol φ is empty set). [a,b]×[a,c] represents the directional branch in which the coordinate point of the starting end is [a,b] and the coordinate point of the terminating end is [a,c]. For the sake of convenience of the explanation, the information of equation (6) is assumed to be acquired from the key distribution server 102.

[Equation 6]

$$sgi=\{\{S_1=[SP_1,TP_1],EP_1\},\ldots,\{S_y=[SP_y,TP_y],EP_y\}\},$$

$$h=\{E_{k(S_1)}(s),\ldots,E_{k(S_y)}(s)\},$$

$$E_s(M) \qquad (6)$$

As shown in FIG. 13, whether or not the subset $S_j(j\in S_j)$ to which it (contractor i) is included exists in the information sgi related to the subset of the permitted contractor acquired by the communication unit 124 is judged (S922). If the subset $S_j$ exists, the process proceeds to step S924. If the subset $S_j$ does not exist, the generation process of the digraph G is terminated assuming that the contractor is eliminated (no authority to acquire content). The process of step S922 is mainly executed by the judgment unit 126.

The digraph generation unit 127 then judges whether or not the number i of the contractor matches $TP_j$ (S924). If i=$TP_j$, the digraph G(i)={V(G(i),E(G(i))} to be generated when the contractor i derives the set key is output as V(G(i))= {[$SP_j$,i]}, E(G(i))=φ (S978), and the generation process of the digraph G is terminated. If not i=$TP_j$, the process proceeds to step S926.

The digraph generation unit 127 initializes the coordinate cup of the current position of the contractor i, the coordinate sp of the starting point and the coordinate ep of the ending point of the range currently being considered, the counter m, the counter z, the set V(G(i)) of coordinate points, and the set E(G(i)) of directional branches in the following manner (S926).

sp=$SP_j$, ep=$EP_j$, cup=i, m=1, z=0, V(G(i))=φ, E(G(i))=φ. Here, j represents the index j of the subset $S_j$ satisfying i∈$S_j$.

The digraph generation unit 127 then judges whether or not $SP_j$=1 (S928). The process proceeds to step S930 if $SP_j$=1. The digraph generation unit 127 then calculates $L_v$=|$EP_j$−$SP_j$|+1, and substitutes ep-1 to ep (S930), and then proceeds to step S934. If not $SP_j$=1, the process proceeds to step S932. The digraph generation unit 127 calculates $L_v$=|$EP_j$−$SP_j$|+2 (S932), and then proceeds to step S934.

The digraph generation unit 127 calculates x (1≦x≦k) satisfying $n^{(x-1)/k}<L_v \leq n^{x/k}$ (S934). The digraph generation unit 127 judges whether or not cup=$TP_j$ (S936). If cup=$TP_j$, the process proceeds to step S976. The digraph G{V(G(i)),E(G(i))} used by the contractor i to derive the key of the subset is output (S976), and the generation process of the digraph G is terminated.

If not cup=$TP_j$, the process proceeds to step S938. The digraph generation unit 127 then judges whether or not z=0 (S938). If z=0, the process proceeds to step S940. If not z=0, the process proceeds to step S946, and the maximum directional path (MP; MaxPath) in which the number of jumps from sp to ep becomes a minimum is determined (S946). This process will be hereinafter described.

The digraph generation unit 127 then judges whether or not $SP_j<EP_j$ (S940). If $SP_j<EP_j$, the process proceeds to step S942. Here, sp is set as in equation (7) (S942), and the process proceeds to step S946. If not $SP_j<EP_j$, the process proceeds to step S944. Here, sp is set as in equation (8) (S944), and the process proceeds to step S946.

[Equation 7]

$$sp = \left\lfloor \frac{EP_j - SP_j}{2} \right\rfloor + SP_j \qquad (7)$$

$$sp = \left\lfloor \frac{SP_j - EP_j}{2} \right\rfloor + EP_j \qquad (8)$$

The digraph generation unit 127 then determines the directional path in which the number of jumps becomes a minimum as the MP (MaxPath) of the directional paths from sp to ep so as to match one part of the digraph H in the AI05 system (S946). The process for determining the MP will be hereinafter described.

The digraph generation unit 127 then judges whether or not z=0 (S948). If not z=0, the process proceeds to step S958. If z=0, the process proceeds to step S952. With the number of directional branches on the MP as w, and the directional branch having [$SP_j$,sp] as the starting end as the first directional branch, the distance of the $i^{th}$ directional branch on the MP is defined as $dt_i$. Here, $dt_{w+1}$=0. With [$SP_j$,$SP_j$] as the starting point, the jump of distance $dt_i$ is executed while moving the counter i from w to 1, and the directional branch corresponding thereto is generated. In this case, it is to be noted that the reaching point in the $i^{th}$ jump is the departure point of the i−$1^{th}$ jump. Furthermore, the MP determined in step S946 and the directional branch generated here (S952) are set as the new MP, and z=1 (S952).

The digraph generation unit 127 then judges whether or not $SP_j=1$ (S954). If not $SP_j=1$, the process proceeds to step S958. If $SP_j=1$, the process proceeds to step S956. The digraph generation unit 127 then adds the directional branch $[SP_j, EP_j-1] \times [SP_j, EP_j]$ on the MP to obtain a new MP (S956).

The digraph generation unit 127 specifies the directional branch in which the coordinate point $[SP_j, \text{cup}]$ is contained between the starting end and the terminating end of each directional branch existing on the MP (S958). However, a case where the coordinate point of the starting end or the terminating end and the coordinate point $[SP_j, \text{cup}]$ match is also included. The specified directional branch is called the CUE (Current User's Edge). If the coordinate point $[SP_j, \text{cup}]$ exists on the MP and the coordinate point $[SP_j, \text{cup}]$ matches the starting end and the terminating end of the two adjacent directional branches, the directional branch having the coordinate point $[SP_j, \text{cup}]$ as the starting point is assumed as CUE.

The digraph generation unit 127 proceeds to step S970 if the coordinate point $[SP_j, TP_j]$ does not match the terminating end of the CUE and is not closer to the ending point side of the digraph H than the terminating end of the CUE. The process proceeds to step S962 if the coordinate point $[SP_j, TP_j]$ matches the terminating end of the CUE or is closer to the ending point side of the digraph H than the terminating end of the CUE (S960).

The digraph generation unit 127 then sets V(G(i)) and E(G(i)) as below (S962).

If $V(G(i))=\phi$, $V(G(i))=[SP_j, sp_{i,m}] \cup [SP_j, ep_{i,m}]$. If not $V(G(i))=\phi$, $V(G(i))=V(G(i)) \cup [SP_j, ep_{i,m}]$. Furthermore, $E(G(i))= E(G(i)) \cup \{[SP_j, sp_{i,m}] \times [SP_j, ep_{i,m}]\}$.

Here, $sp_{i,m}$, $ep_{i,m}$ represent the coordinates of the starting end and the terminating end of the current CUE. The process differs for when $V(G(i))=\phi$ and when not $V(G(i))=\phi$ for the following reasons. If $V(G(i))=\phi$, both the starting end and the terminating end of the directional branch are to be added as the coordinate points, but if not $V(G(i))=\phi$, the starting end of the directional branch to be added is already added as the coordinate point of the V(G(i)) and thus only the coordinate point for the terminating end is added to V(G(i)) to avoid redundancy.

The digraph generation unit 127 substitutes m+1 to m (S964). The digraph generation unit 127 judges whether or not the next directional branch (directional branch having the terminating end of the CUE as the starting end) of the CUE exists (S966). If the next directional branch of the CUE exists, the process proceeds to step S968, the next directional branch of the CUE existing on the MP is set as the new CUE, and the process is returned to the process of step S960. If the next directional branch of the CUE does not exist, the process proceeds to step S970.

The digraph generation unit 127 then sets the coordinate of the starting end of the CUE to the sp, and sets the coordinate of the coordinate point positioned one before the terminating end of the CUE to the ep (S970). The digraph generation unit 127 then judges whether or not m=1 (S972). If m=1, the process returns to the process of step S936. If not m=1, the process proceeds to step S974.

The digraph generation unit 127 sets $\text{cup}=ep_{i,(m-1)}$ (S974), and returns to the process of step S936.

The generation method of the digraph G according to the present embodiment has been described. In the above-described generation method, assumption is made that the information $EP_j$ related to the ending point of the digraph H is contained in the sgi, but the contractor may specify the $EP_j$ as the $EP_j$ can be uniquely specified by the logical binary tree BT once $SP_j$ is determined. Such configuration is realized by adding the step of deriving the $EP_j$ to the process of step S926.

(Determination Method of Maximum Directional Path MP)

Figure 15:
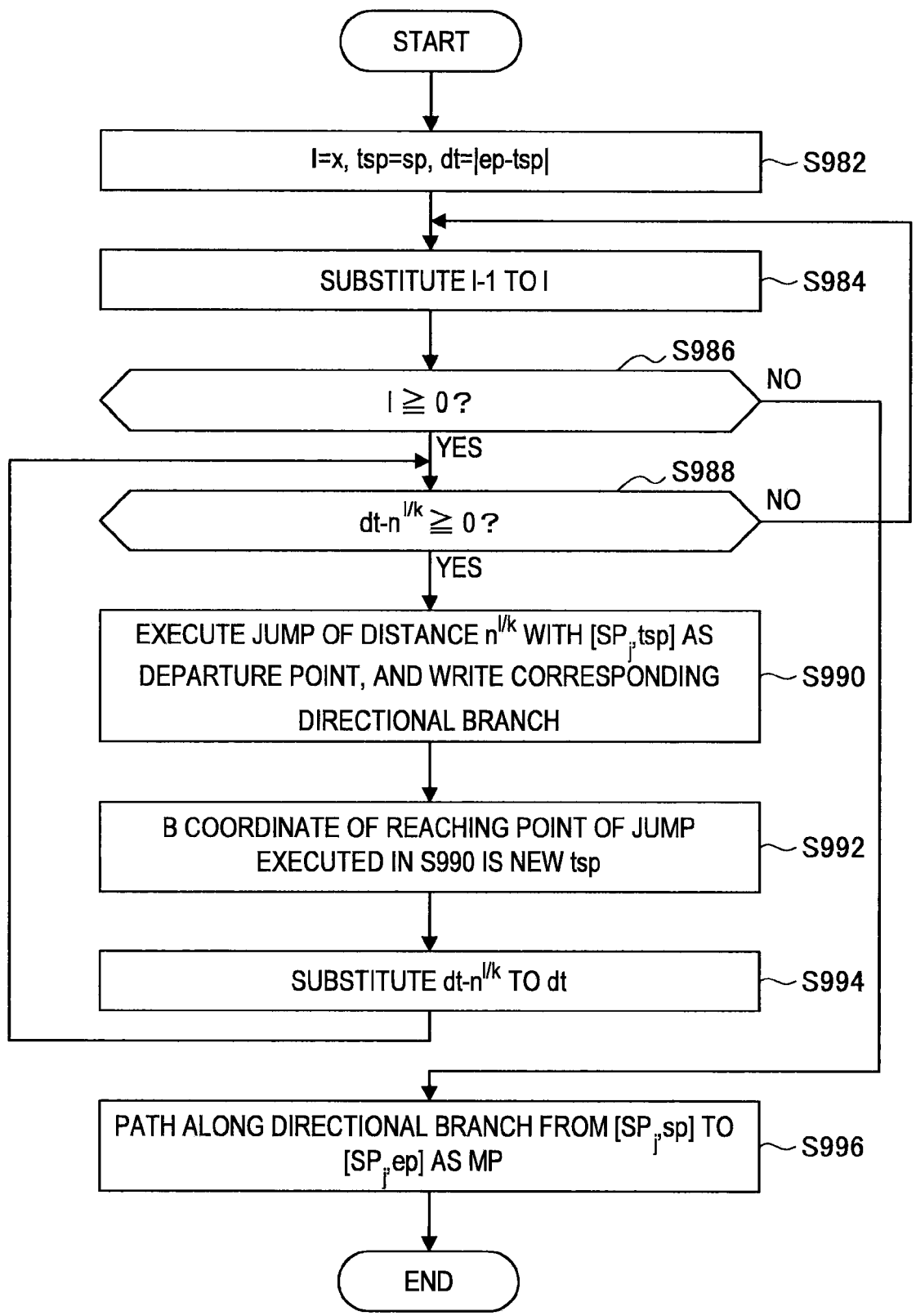
FIG. 15 is an explanatory view showing a flow of graph generation method according to the embodiment.

The determination method of the maximum directional path MP in step S946 of FIG. 13 will now be described with reference to FIG. 15. FIG. 15 is an explanatory view showing a flow of determination process of the maximum directional path MP.

As shown in FIG. 15, the digraph generation unit 127 first initializes the counter 1, the coordinate tsp of the reaching point of the jump currently being considered, and the distance dt currently being considered as below (S982). l=x, tsp=sp, dt=|ep−tsp|.

The digraph generation unit 127 then substitutes l−1 to 1 (S984). The digraph generation unit 127 judges whether or not $l \geq 0$ (S986). If not $l \geq 0$, the process proceeds to step S996, sets the directional path formed by a chain of at least one directional branch from the coordinate point $[SP_j, sp]$ to the $[SP_j, ep]$ as MP (S996), and terminates the determination process of the MP. If $l \geq 0$, the process proceeds to step S988.

The digraph generation unit 127 then judges whether or not $dt - n^{1/k} \geq 0$ (S988). If not $dt - n^{1/k} \geq 0$, the process returns to the process of step S984. If $dt - n^{1/k} \geq 0$, the process proceeds to step S990.

The digraph generation unit 127 executes a jump of distance $n^{1/k}$ with $[SP_j, tsp]$ as the departure point, and generates the corresponding directional branch (S990). The digraph generation unit 127 then newly sets the coordinate of the terminating end of the directional branch generated in step S990 as tsp (S992). The digraph generation unit 127 then substitutes $dt - n^{1/k}$ to dt (S994), and returns to the process of step S988.

The determination method of the maximum directional path MP has been described above. The generation process of the digraph G can be performed by the above-described determination process.

(Specific Example)

Figure 11:
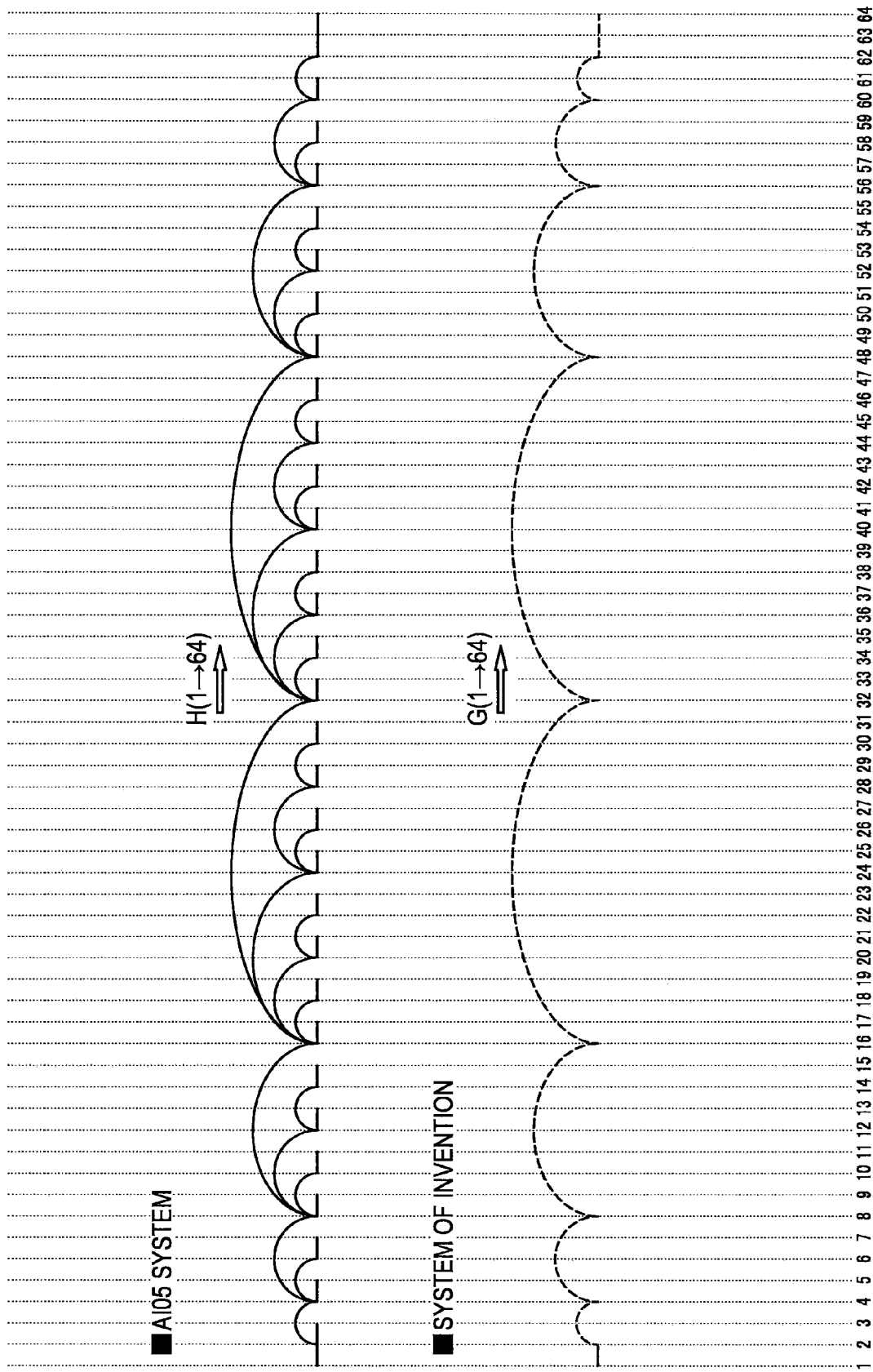
FIG. 11 is an explanatory view showing a digraph G according to the embodiment.
Figure 12:
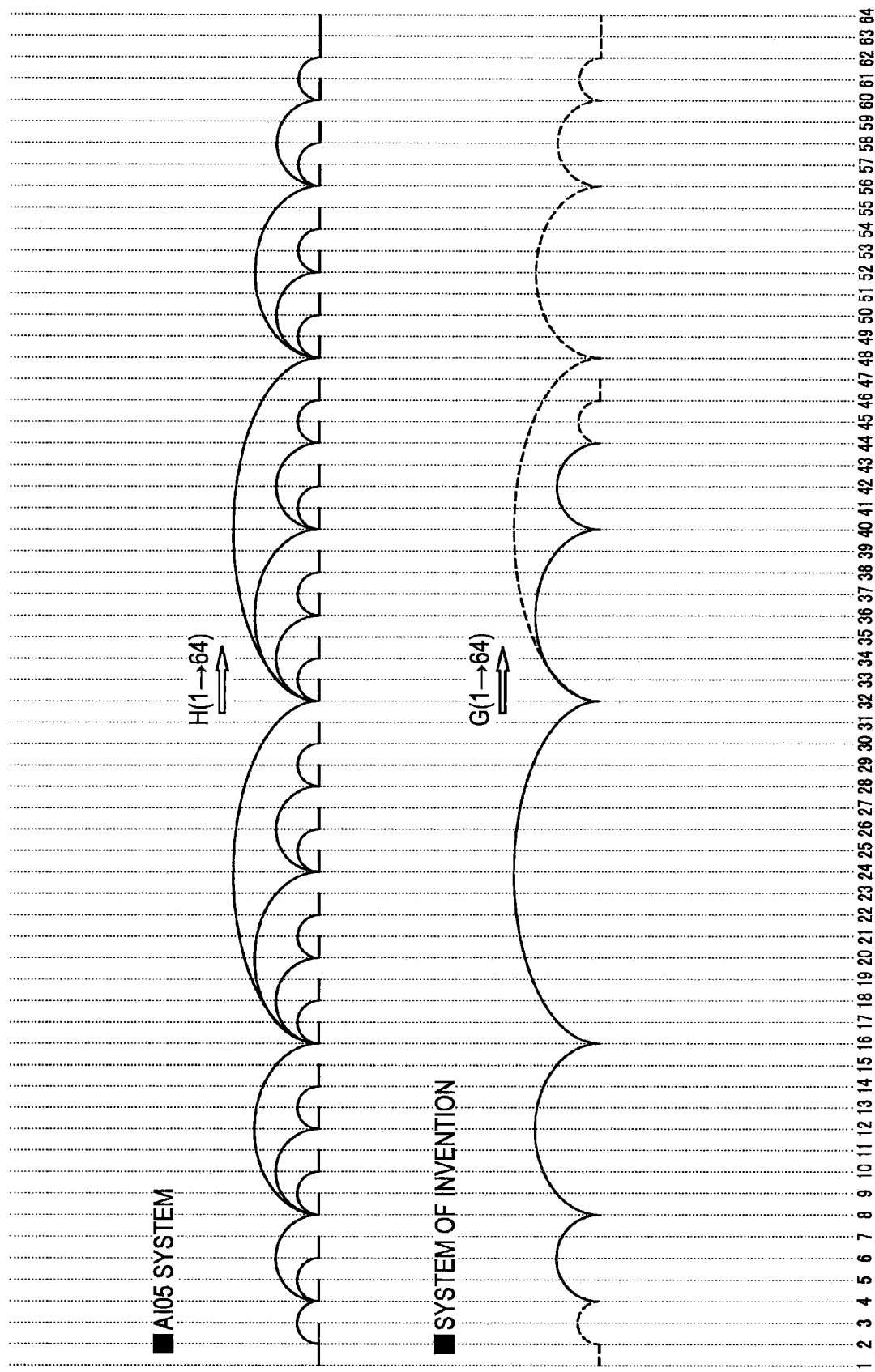
FIG. 12 is an explanatory view showing a digraph G according to the embodiment.

The specific example of the digraph G generated by the digraph generation unit 127 based on the above-described generation method will be described with reference to FIG. 11 and FIG. 12. FIG. 11 and FIG. 12 are explanatory views showing a digraph G generated when the number of contractor is n=64, and the parameter is k=6. In particular, only the digraph corresponding to the set (1→64) is shown. The diagrams drawn on the upper side of FIG. 11 and FIG. 12 are the digraph H derived by the contractor when the algorithm of the AI05 system is used. The diagrams drawn on the lower side are the digraph G derived by the contractor when the algorithm of the present embodiment is used.

(Specific Example 1)

First, the digraph G generated for the contractor 1 to derive the set key of the subset [1,2] is shown with reference to FIG. 11. The solid line in the figure shows the directional branch to be eventually derived when the contractor 1 derives the set key. That is, when deriving the set key of the subset [1,2], the contractor 1 inputs the intermediate key t([1,1]) corresponding to the starting end of the directional branch shown with a solid line to the PRSG, and derives the t([1,2]) corresponding to the terminating end thereof. Furthermore, the digraph G configured by the solid line and the broken line represents the maximum directional path MP to be derived by the contractor 1.

(Specific Example 2)

The digraph G generated for the contractor 7 to generate the set key of the subset [1,44] is shown with reference to FIG. 12. The solid line in the figure shows the directional branch corresponding to the jump to be eventually derived when the contractor 7 derives the set key. That is, when deriving the set key of the subset [1,44], the contractor 7 uses the intermediate key t([1,4]) it holds in advance and repeatedly executes the PRSG along the directional branch shown with a solid line to derive the intermediate key t([1,44]). Furthermore, the digraph G configured by the solid line and the broken line represents the maximum directional path MP to be derived by the contractor 7.

(Key Generation Unit 128)

The function configuration of the key generation unit 128 will now be described. The key generation unit 128 generates the desired intermediate key or the set key using the intermediate key distributed in advance and the PRSG. In this case, the key generation unit 128 generates the desired intermediate key or the set key based on the digraph H generated by the digraph generation unit 127. If judged that a subset to which it is included does not exist by the judgment unit 126, the key generation unit 128 does not execute the generation process of the intermediate key or the set key. The PRSG is substantially the same as the PRSG held by the key distribution server 102, and has a function of, when the intermediate key corresponding to the starting end of the directional branch is input based on a predetermined digraph, outputting the set key corresponding to the relevant intermediate key and the intermediate key corresponding to the terminating end of the relevant directional branch. It is to be noted that if a plurality of directional branches extends from one coordinate point, the PRSG outputs the intermediate keys corresponding to the terminating ends of all the directional branches.

(Key Generation Method)

Figure 16:
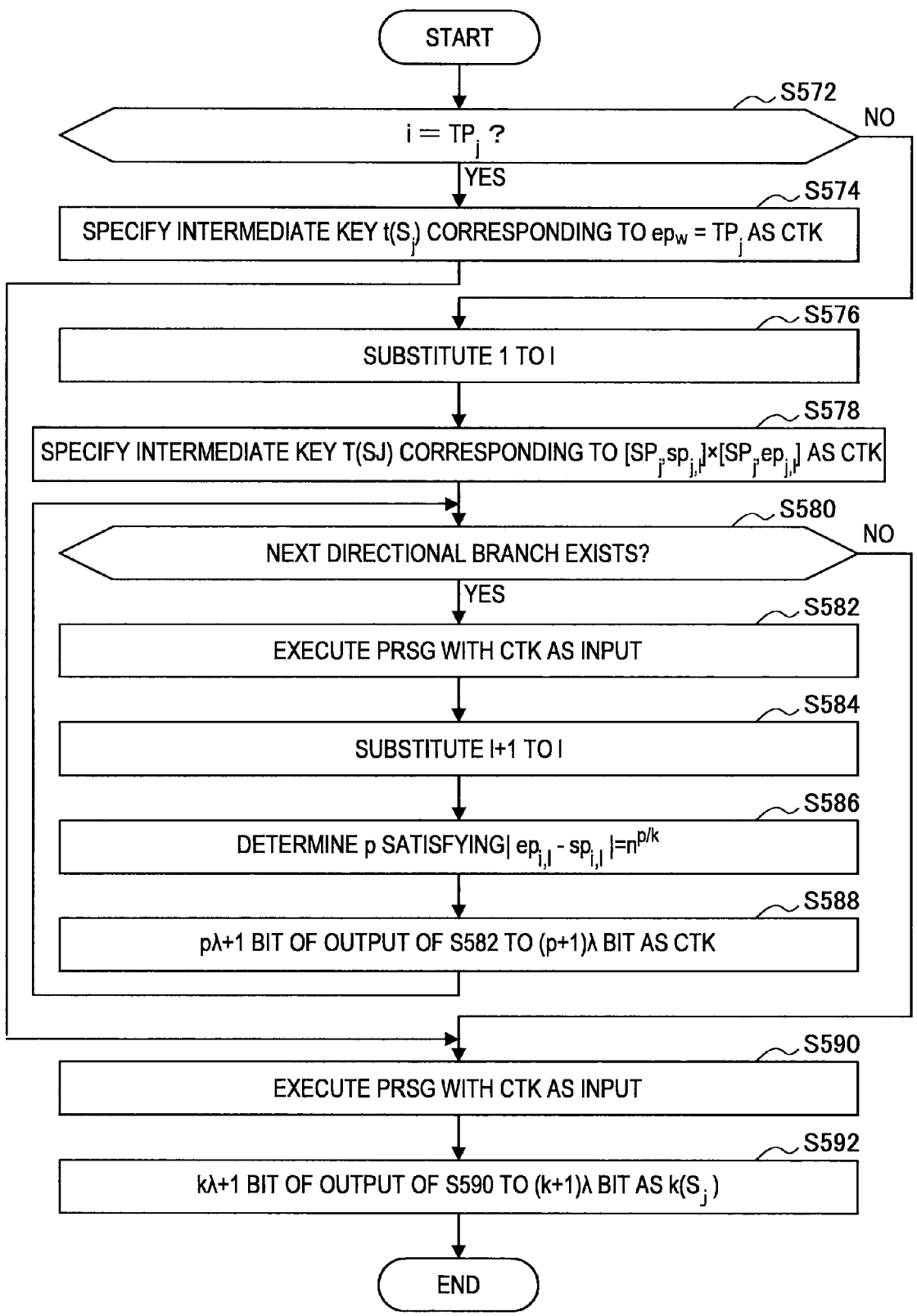
FIG. 16 is an explanatory view showing a flow of key generation method according to the embodiment.

The key generation method according to the present embodiment will now be described with reference to FIG. 16. FIG. 16 is an explanatory view showing a flow of key generation process by the key generation unit 128. In the following description, assumption is made that the contractor i has already derived the digraph G(i). The set E(G(i)) of directional branches configuring the digraph G(i) is expressed as equation (9). In the two adjacent directional branches contained in E(G(i)) and expressed as equation (10) and equation (11), $ep_{i,(w-1)} = sp_{i,w}$ is met. Here, $w = 2, \ldots, m-1$.

[Equation 8]

$$E(G(i)) = \{[SP_j, sp_{i,1}] \times [SP_j, ep_{i,1}], \ldots, [SP_j, sp_{i,(m-1)}] \times [SP_j, ep_{i,(m-1)}]\} \quad (9)$$

$$[SP_j, sp_{i,(w-1)}] \times [SP_j, ep_{i,(w-1)}] \quad (10)$$

$$[SP_j, sp_{i,w}] \times [SP_j, ep_{i,w}] \quad (11)$$

As shown in FIG. 16, the key generation unit 128 first judges whether $TP_j$ that is $i = TP_j$ exists (S572). If $TP_j$ that is $i = TP_j$ exists, the process proceeds to step S574. The key generation unit 128 then specifies the intermediate key $t(S_j)$ in which the $TP_j$ and the coordinate $ep_{i,w}$ of the subset $S_j$ corresponding to the intermediate key $t(S_j) = t([SP_j, ep_{i,w}])$ ($w = 1, \ldots, z$) match (S574). The intermediate key $t(S_j)$ is set as the intermediate key CTK (Current Temporary Key), and the process proceeds to step S590.

If $TP_j$ that is $i = TP_j$ does not exist in step S572, the process proceeds to step S576. the key generation unit 128 substitutes 1 to the counter 1 (S576). The key generation unit 128 sets the intermediate key $t(S_j)$ in which the coordinate indicating the terminating end of $[SP_j, sp_{i,1}] \times [SP_j, ep_{i,1}] \in E(G(i))$ and the coordinate $ep_w$ of the subset $S_j$ corresponding to the intermediate key $t(S_j) = t([SP_j, ep_{i,w}])$ ($w = 1, \ldots, z$) match as the current intermediate key CTK (S578).

The key generation unit 128 then judges whether or not the next directional branch (directional branch having the terminating end of a certain directional branch as starting end) of the $[SP_j, sp_{i,1}] \times [SP_j, ep_{i,1}] \in E(G(i))$ exists (S580). If the next directional branch exists, the process proceeds to step S582. IF the next directional branch does not exist, the process proceeds to step S590.

The key generation unit 128 inputs the CTK to the PRSG and outputs the value of $(k+1)*\lambda$ bits (S582). The key generation unit 128 then substitutes l+1 to 1 (S584). The key generation unit 128 then determines p that satisfies $|ep_{i,1} - sp_{i,1}| = n^{p/k}$ (S586). The key generation unit 128 sets the MSB (Most Significant Bit) of the output acquired in step S582 as the first bit, and sets the value from $p*\lambda + 1$ bit to $(p+1)*\lambda$ bit as a new CTK (S588). The process returns to the process of step S580.

The key generation unit 128 then inputs CTK to the PRSG and outputs the value of $(k+1)*\lambda$ bits (S590). The key generation unit 128 then sets the MSB of the output obtained in step S590 as the first bit, and acquires the value from $k*\lambda + 1$ bit to $(k+1)*\lambda$ bit as the set key $k(S_j)$ (S592).

The key generation method according to the present embodiment has been described above. The key generation unit 128 can generate the desired set key based on the digraph G through the above-described process.

(Decryption Unit 130)

The function configuration of the decryption unit 130 will now be described. The decryption unit 130 decrypts the content key using the set key generated by the key generation unit 128. The decryption unit 130 can also decrypt the content using the content key.

(Decryption Method of Content Key)

Figure 8:
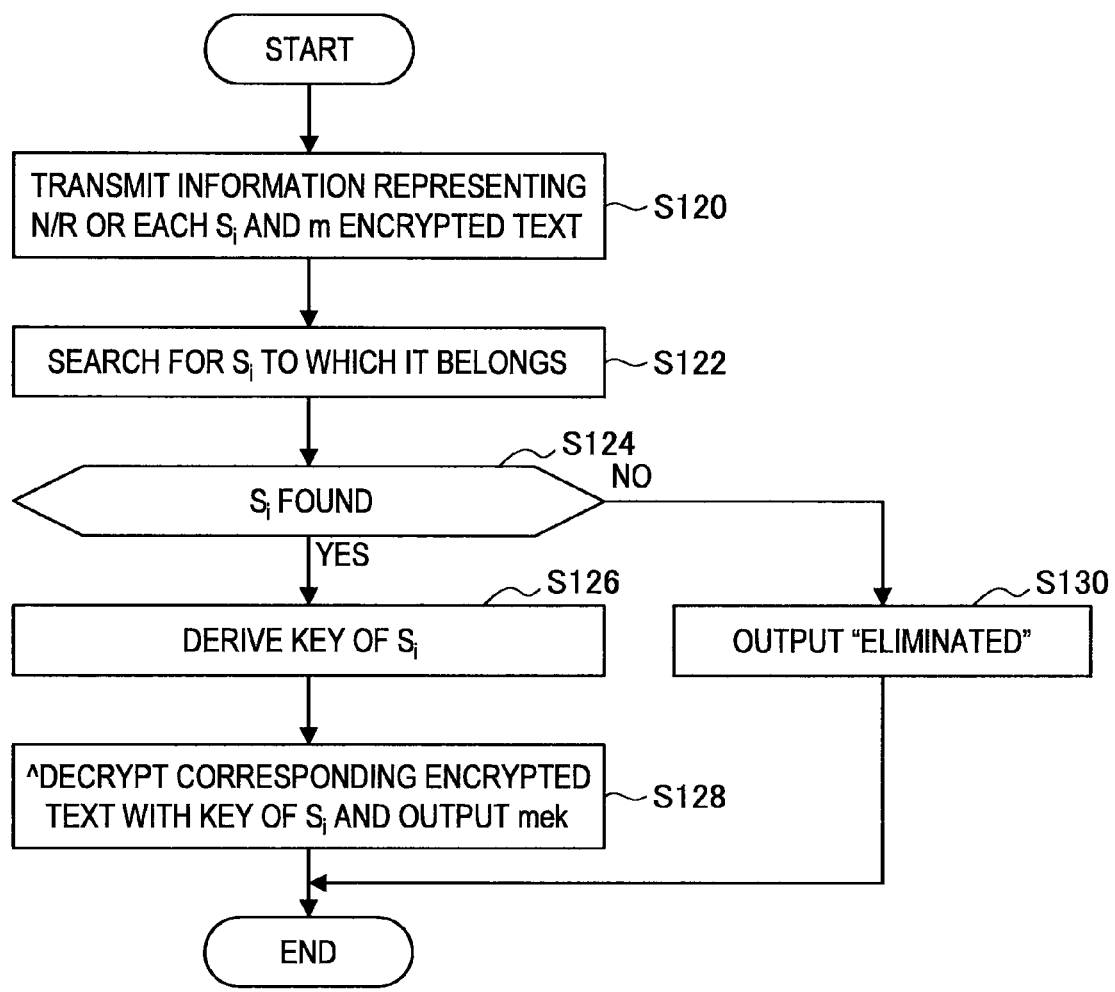
FIG. 8 is an explanatory view showing a flow of key distribution process according to the embodiment.

A decryption process of the encrypted content key mek will now be described with reference to FIG. 8. FIG. 8 is an explanatory view showing a flow of decryption process of the content key.

As shown in FIG. 8, the communication unit 124 acquires m encrypted keys mek and information representing the set N\R or the information representing the m subsets $S_i$ ($i = 1, 2, \ldots, m$) from the key distribution server 102 (S120). The judgment unit 126 searches the subset $S_i$ to which it is included (S122), and judges whether or not it is included in one of the m subsets $S_i$ (S124).

If the subset $S_i$ to which it is included exists, the key generation unit 128 utilizes the pseudo-random sequence generator PRSG to derive the set key $k(S_i)$ corresponding to the subset $S_i$ (S126). The decryption unit 130 decrypts the encrypted content key mek using the derived set key $k(S_i)$ (S128). If it is not included in any one of the subsets $S_i$, the judgment unit 126 displays and outputs a notification that it is an eliminated contractor (S130), and terminates the decryption process of the content key.

As described above, the terminal device 122 can decrypt the content key mek based on the information of the set N\R or the m subsets $S_i$, and the m encrypted content keys $k(S_i)$ acquired from the key distribution server 102.

[Application Example of Key Providing System 100]

The application example of the key providing system 100 according to each embodiment will be briefly described with reference to FIG. 17 and FIG. 18.

(Application Example 1)

First, a configuration of a broadcast encryption system 800 will be described as one application example of the key providing system 100. FIG. 17 is an explanatory view showing the configuration of the broadcast encryption system 800 using broadcast satellite.

Figure 17:
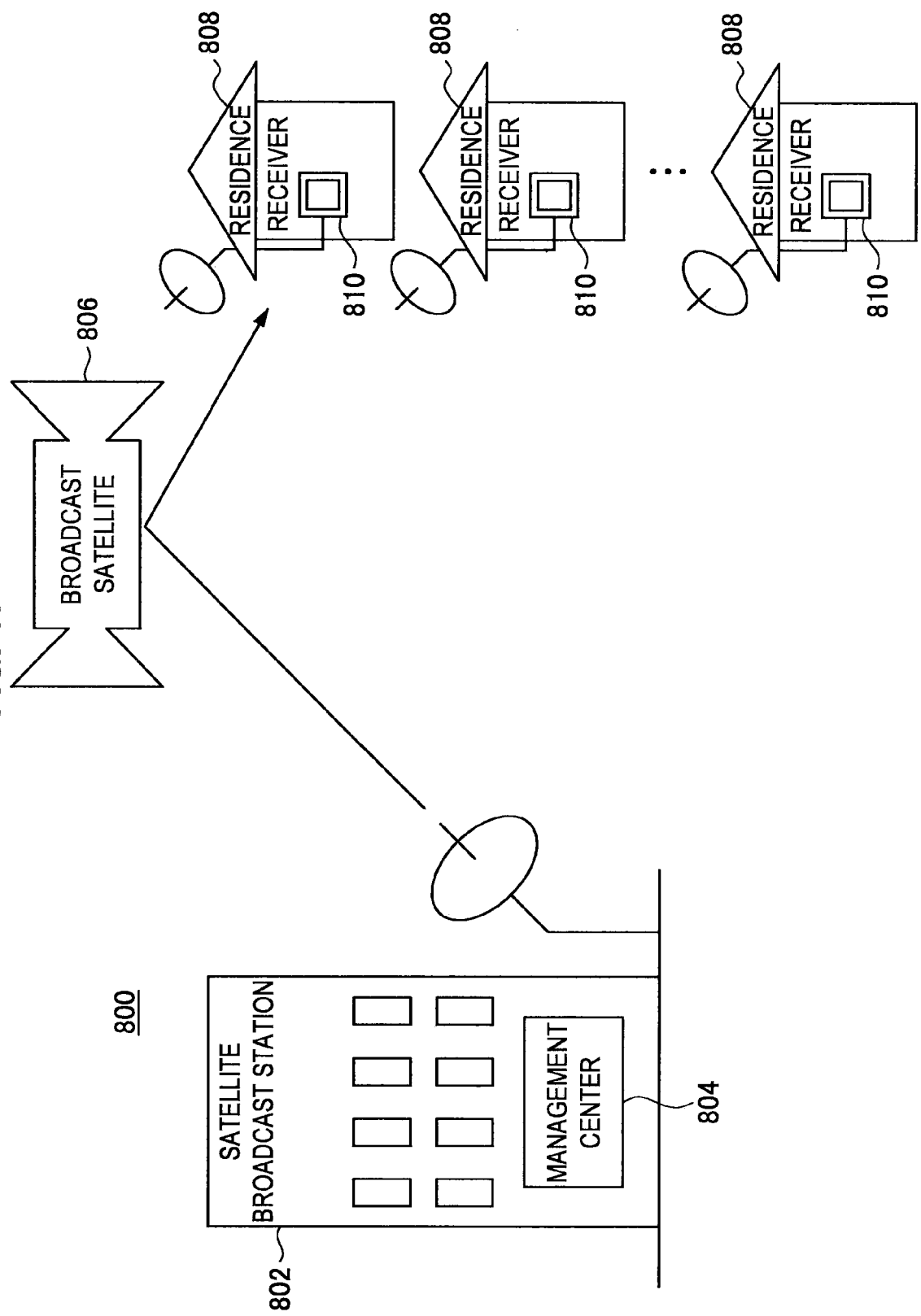
FIG. 17 is an explanatory view showing an application example of a key distribution system according to the embodiment.

With reference to FIG. 17, the broadcast encryption system 800 is mainly configured to include a satellite broadcast station 802, a management center 804, a broadcast satellite 806, a residence 808, and a receiver 810. The broadcast encryption system 800 is a system for distributing the encrypted data (cipher text) to the receiver 810 arranged in the residence 808 via the broadcast channel. The broadcast channel is a satellite broadcast distribution channel, and the like. The cipher text is a content including encryption key, audio data, video data, text data, or the like.

First, the satellite broadcast station 802 is arranged with the management center (broadcast trusted center) 804 for transmitting data such as cipher text via the broadcast satellite 806. The management center 804 selects the key for encryption, and executes encryption of data and distribution control of data. That is, the management center 804 is one example of the key distribution server 102 according to each embodiment described above. The receiver 810 installed in the residence 808 is one example of the terminal device 122 according to each embodiment described above.

The broadcast satellite 806 broadcasts data such as cipher text to the receiver 810 through the management center 804 and the receiver 810 arranged in each residence 808. The receiver 810 is a satellite broadcast receiver and the like, and receives data broadcasted through the broadcast satellite 806. As shown in FIG. 17, the broadcast encryption system 800 may include plural receivers 810, in which case the management center 804 distributes data to a receiver group including the plural receivers 810. The management center 804 encrypts and distributes the broadcast data so that only the authenticated receiver 810 can decrypt the data.

The broadcast encryption system 800 serving as one application example of the key providing system 100 has been described above. In FIG. 17, the satellite broadcast has been described by way of example, but the broadcast encryption system 800 is also easily applicable to the encryption system using other broadcast channels such as cable television and computer network.

(Application Example 2)

A configuration of a broadcast encryption system 900 will be described as another application example of the key providing system 100. FIG. 18 is an explanatory view showing a configuration of the broadcast encryption system 900 using a recording medium.

Figure 18:
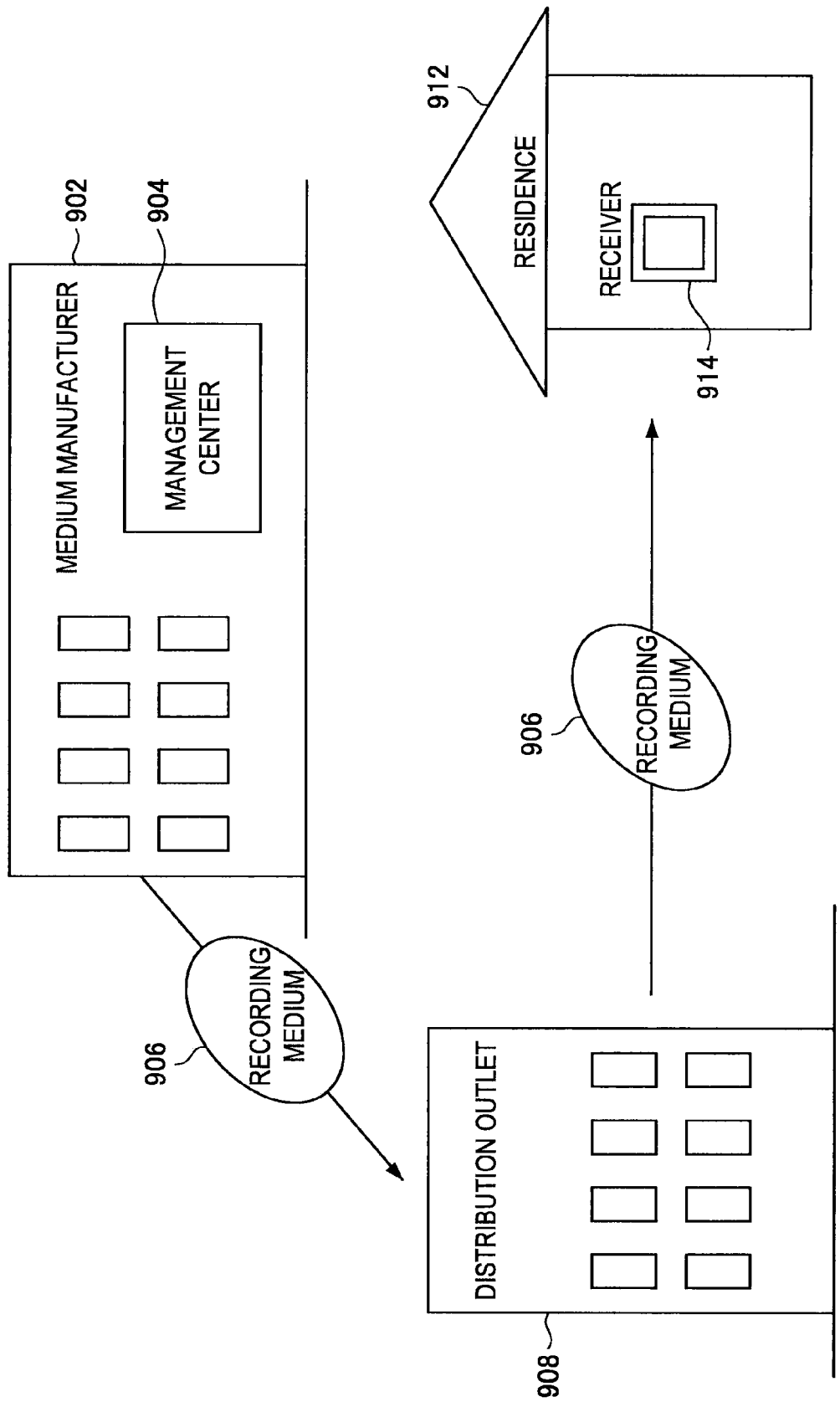
FIG. 18 is an explanatory view showing an application example of a key distribution system according to the embodiment.

With reference to FIG. 18, the broadcast encryption system 900 is mainly configured by a medium manufacturer 902, a management center 904, a recording medium 906, a distribution outlet 908, a residence 912, and a receiver 914. The broadcast channel in the broadcast encryption system 900 is a recording medium 906 recorded with data.

First, the medium manufacturer 902 is arranged with the management center 904 for providing data such as cipher text to the residence 912 via the distribution outlet 908 using the recording medium 906. The management center 904 merely records data such as cipher text in the recording medium 906, and indirectly provides data such as cipher text using the recording medium 906. The recording medium 906 is a read-only medium (e.g., CD-ROM, DVD-ROM etc.), rewritable medium (e.g., CD-RW, DVD-RW, etc.), or the like. Similar to the application example 1, the management center 904 corresponds to the key distribution server 102 according to each embodiment described above. There is a slight difference in that the data such as cipher text is recorded and provided in the recording medium, but the key distribution server according to the embodiment of the present invention can appropriately change the means for distributing information such as cipher text according to the embodiment as in this application example.

The medium manufacturer 902 sends the recording medium 906 recorded with data such as cipher text to the distribution outlet 908 such as retailer. The distribution outlet 908 then provides the medium 906 to each residence 912. For instance, the distribution outlet 908 sells the recording medium 906 to the individual corresponding to each residence 912. The individual brings home the recording medium 906 to the residence 912, and reproduces the data recorded on the recording medium 906 using the receiver 914. The receiver 914 is one example of the terminal device 122 according to each embodiment, but slightly differs in acquiring the data such as cipher text through the recording medium. However, the terminal device according to the embodiment of the present invention can appropriately change the means for acquiring the information such as cipher text according to the embodiment as in this application example. The receiver 914 is a CD player, a DVD player, or a computer equipped with the DVD-RW drive, and is configured by a device capable of reading out and reproducing the data recorded on the recording medium 906.

The broadcast encryption system 900 serving as one application example of the key distribution system 100 has been described above. In FIG. 18, the means for providing the data such as cipher text to the contractor through the recording medium 906 has been described by way of example. The key distribution server and the terminal device according to the embodiment of the present invention can change the configuration related to the distribution means of various types of information according to the embodiment.

[Effect]

In the related art, each contractor holds all digraphs H corresponding to the subset to which it belongs or derives all digraphs H on its own. However, the present embodiment provides a means in which each contractor derives the digraph G configured only with the directional branches necessary when deriving the key of the digraph H corresponding to the subset to which it belongs. Therefore, compared to the key distribution system of the related art, the number of directional branches to be calculated by each contractor greatly reduces, and each contractor can generate the digraph G and derive the desired set key at high speed. As a result, the time for decrypting the content can be greatly reduced.

<Second Embodiment>

The configuration of the key providing system 100 and the specific system related to the key distribution according to a second embodiment of the present invention will be described in detail below. The same reference numerals are denoted for the components substantially the same as the key providing system 100 according to the first embodiment to omit redundant description, and the differing components will be described in detail. The present embodiment has characteristics in that a terminal device includes a means for efficiently generating the digraph in the key providing system 100 of the A06(B) system.

[Characteristics of Second Embodiment]

The second embodiment and the first embodiment of the present invention will be compared and described to clarify the difference of the embodiments, and to thereby clearly show the characteristics of the second embodiment. First, the greatest difference of the first embodiment and the present embodiment is the difference in the key distribution system to which the technique of the present invention is applied. The first embodiment is applicable to the AI05 system, whereas the present embodiment is applicable to the A06(B) system.

(Comparison of AI05 System and A06(B) System)

The difference between the AI05 system and the A06(B) system will be briefly described, and the characteristics of the A06(B) system will be clearly defined. The difference between the AI05 system and the A06(B) system lies in the amount of calculation for key generation, as already stated at the beginning of the specification. Specifically, the difference is as follows.

As described in the description of the first embodiment, in the AI05 system, the digraphs H(1→n) and H(2←n) are corresponded to the root node of the logical binary tree BT, and the digraphs H($l_v$→$r_v$+1) or H($l_v$+1←$r_v$) are corresponded to other intermediate nodes v. The digraph H to which the contractor u belongs is either one in each of the log(n)−1 intermediate nodes v (v=1, . . . , log(n)−1) excluding the leaf node and the root node, or the two digraphs corresponded to the root node of the nodes existing on the path from the leaf node u to the root node of the logical binary tree BT. Therefore, a total of log(n)+1 digraphs H exist. With respect to each digraph H, the maximum value of the number of keys to be held by the contractor is smaller than the maximum number of directional branches contained in the directional path having a certain coordinate point as the departure point. Therefore, the maximum number of the directional branches is equal to the parameter k, and the number of keys to be held by each contractor becomes, even in the worst case, smaller than or equal to k*(log(n)+1). This gradually becomes O(k*log(n)).

More specifically, the length $L_v$ of the segment used in generating the digraph H is obtained by calculating x(1≦x≦k) that satisfies $n^{(x-1)/k}$<$Lv$≦$n^{x/k}$. When x is calculated with respect to each intermediate node of the logical binary tree Bt, the upper limit of the number of keys to be held by each contractor can be expressed with equation (12). As a result, in the AI05 system, one issue arises in that the amount of calculation of each contractor is still large.

[Equation 9]

$$\sum_{x=1}^{k-1} x\left(\frac{\log n}{k}\right) + k\left(\frac{\log n}{k} - 1\right) + 2k = \frac{(k+1)}{2}\log n + k \qquad (12)$$

The amount of calculation for each contractor to generate the set key will now be considered. The dominant factor that determines the amount of calculation of each contractor is the number of calculations of the PRSG for generating the desired intermediate key. The worst value is represented by the number of directional branches contained in the directional path reaching the leaf (coordinate point from which the directional branch is not extended) most distant from the route of the digraph H. Such worst value becomes a maximum in the directional path from the coordinate point [1,1] to [1,n] of the digraph H(1→n). Assuming t=$n^{1/k}$−1, and the process for continuously executing the jump (correspond to directional branch) of distance b for a times is expressed as J(a,b), the directional path can be expressed as equation (13).

[Equation 10]

$$J(t,1), J(t,n^{1/k}), \ldots, J(t,n^{(k-2)/k}), J(t-1,n^{(k-1)/k}),$$
$$J(t,n^{(k-2)/k}), \ldots, J(t,n^{1/k}), J(t+1,1) \qquad (13)$$

That is, the number of directional branches (number of jumps) configuring such directional path is as expressed with equation (14). For instance, if number of contractor n=64, and parameter k=6, eleven directional branches exist in the directional path from the coordinate point [1,1] to [1,64] of the digraph H(1→64). As a result, the number of directional branches is large in the AI05 system, and thus another issue arises in that the number of jumps, that is, the amount of calculation to be executed by each contractor is still large.

[Equation 11]

$$2(k-1)(n^{1/k}-1)+n^{1/k}-2+1=(2k-1)(n^{1/k}-1) \qquad (14)$$

Figure 20:
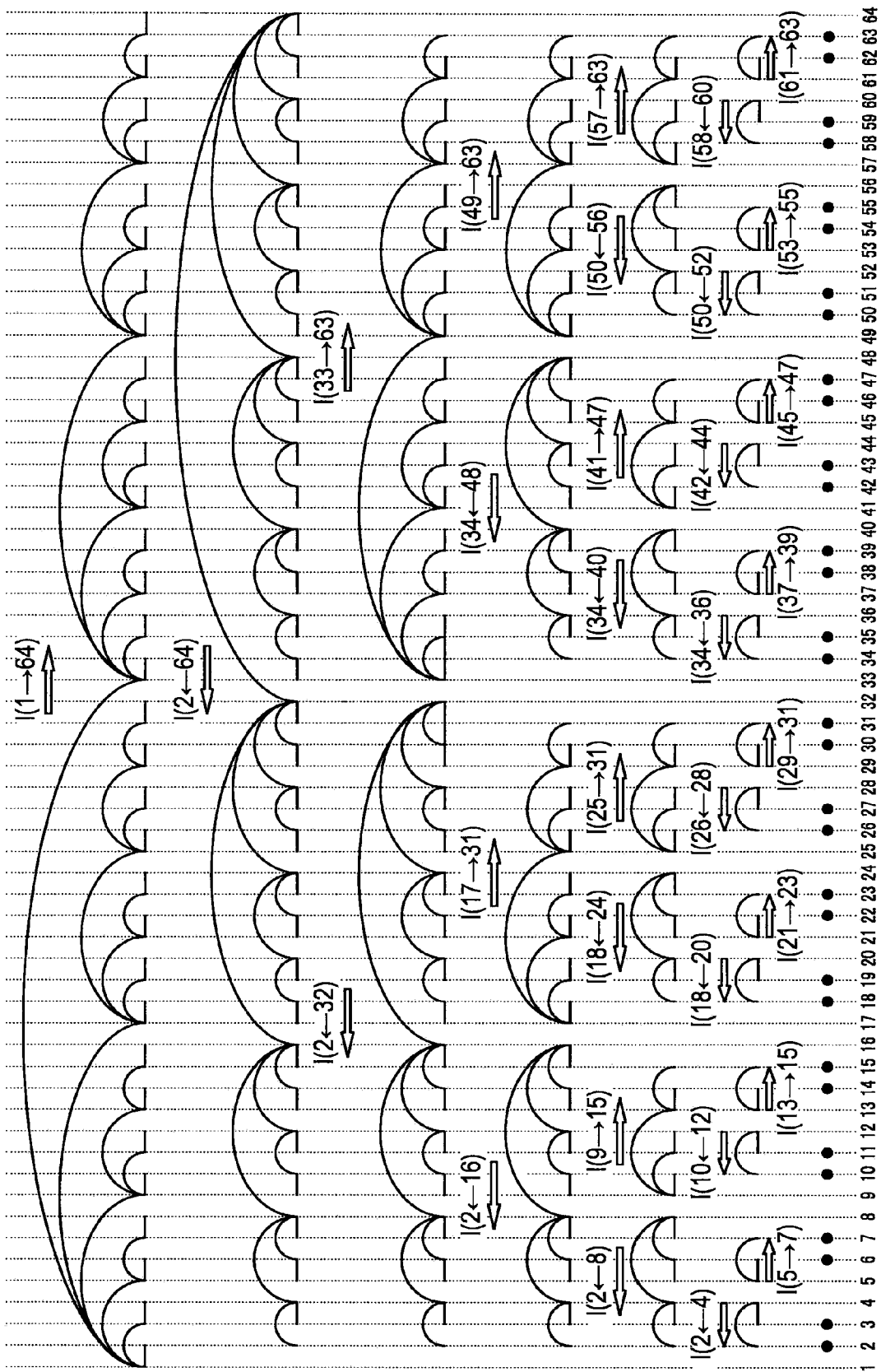
FIG. 20 is an explanatory view showing a digraph I according to the embodiment.

In the A06(B) system, the characteristic lies in that improvement is made to configure the digraph with longer directional branches. For instance, the digraph I of the A06(B) system is shown in FIG. 20, where it can be easily recognized that the directional branch of longer length is contained compared to the digraph H of the AI05 system shown in FIG. 5. Such digraphs are obviously configured based on the same logical binary tree BT, and the number of contractor n and the parameter k are also the same. As a result, it is intuitively apparent that the amount of calculation of each contractor can be reduced, compared to the AI05 system, by applying the A06(B) system.

Similar to equation (13), the directional path from the coordinate point [1,1] to [1,n] of the digraph I(1→n) of the A06(B) system can be expressed as equation (15). The definition of J(a,b) is the same as the AI05 system.

[Equation 12]

$$J(t,n^{(k-1)/k}), J(t,n^{(k-2)/k}), \ldots, J(t,n^{0/k}) \qquad (15)$$

Therefore, the number of directional branches (number of jumps) configuring the directional path becomes k*($n^{1/k}$−1), which is reduced to about half compared to (2k−1)*($n^{1/k}$−1) of the AI05 system. Thus, by applying the A06(B) system, the amount of calculation of each contractor can be greatly reduced.

(Common Issue)

As described above, the amount of calculation is reduced to about half in the A06(B) system compared to the AI05 system, but an issue arises in that the calculation load on each contractor is still high assuming a realistic situation assuming implementation. In the A06(B) system as well, the information of the digraph I are all to be held, or all digraphs I are to be generated, similar to the AI05 system, where the calculation load on the terminal device of each contractor greatly oppresses the effective resource of the general terminal device.

Specifically, when applying the A06(B) system in a state of number of contractor n, the number of directional branches contained in the digraph I(1→n) is expressed with equation (16).

[Equation 13]

$$t \cdot n^{0/k} + t \cdot n^{1/k} + \ldots + t \cdot n^{k-1/k} = t\sum_{i=0}^{k-1} n^{i/k} \qquad (16)$$
$$= n - 1$$

Therefore, when the number of contractor is n=64, the information related to 63 directional branches are held or derived. The information related to the directional branch requires information of the starting end and the terminating end of the directional branch, where a data region of 252 Bytes is necessary for only the digraph I(1→n) even if one is expressed with 32 bits=4 Bytes. In reality, the number of contractor n is about n=$2^{32}$, and thus the information of the digraph I(1→n) is about 32 GBytes. The storage resource of the terminal device is obviously greatly oppressed, and recording and distributing with the removable media become difficult. Furthermore, when each contractor generates the digraph I(1→n), n−1=4294967295 directional branches are to be calculated, where an enormous time is required for only the generation of the digraph.

(Object of the Present Embodiment)

The object of the present embodiment is to provide a means for greatly reducing the calculation load on each contractor by generating only the information of the digraph required by each contractor in the key providing system 100 based on the digraph I of the A06(B) system.

[Configuration of Key Providing System 100]

A configuration of the key providing system 100 according to the present embodiment will be described. The basic system configuration is substantially the same as the configuration of the first embodiment shown in FIG. 1, and thus the detailed description will be omitted. The hardware configuration of a key distribution server 202 and a terminal device 222 arranged in the key providing system 100 according to the present embodiment is also substantially the same as the hardware configuration of the key distribution server 102 and the terminal device 122 shown in FIG. 2, and thus the detailed description thereof will be omitted.

[Function Configuration of Key Distribution Server 202]

Figure 19:
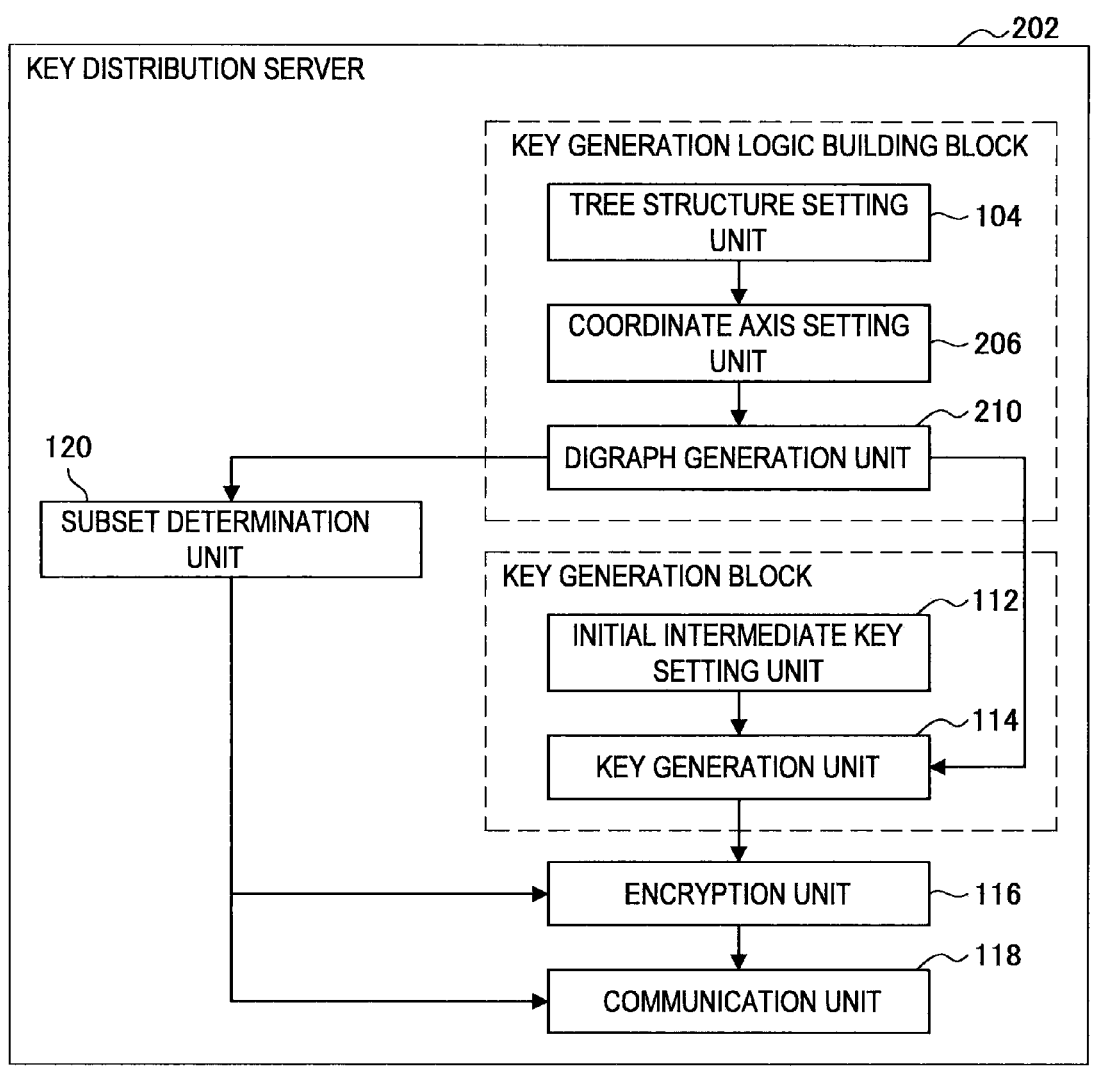
FIG. 19 is an explanatory view showing a configuration of a key distribution server according to a second embodiment of the present invention.

The function configuration of the key distribution server 202 according to the present embodiment will be described with reference to FIG. 19. FIG. 19 is an explanatory view showing a function configuration of the key distribution server 202.

As shown in FIG. 19, the key distribution server 202 is mainly configured by the tree structure setting unit 104, a coordinate axis setting unit 206, a digraph generation unit 210, the initial intermediate key setting unit 112, a key generation unit 114, the encryption unit 116, the communication unit 118, and the subset determination unit 120. The characteristic configuration of the present embodiment mainly lies in the coordinate axis setting unit 206 and the digraph generation unit 210, and other components are substantially the same as the components of the key distribution server 102 according to the first embodiment. Therefore, only the function configuration of the coordinate axis setting unit 206 and the digraph generation unit 210 will be described in detail.

(Coordinate Axis Setting Unit 206)

First, the function configuration of the coordinate axis setting unit 206 will be described. The coordinate axis setting unit 206 has a function of setting a plurality of horizontal coordinate axes for forming the digraph I.

First, the coordinate axis setting unit 206 corresponds the plurality of subsets contained in the set $(1 \rightarrow n-1)$ to each coordinate point on one horizontal coordinate axis so that the inclusion relation becomes larger towards the right, thereby forming the horizontal coordinate axis of the set $(1 \rightarrow n-1)$. The coordinate axis setting unit 206 also corresponds the plurality of subsets contained in the set $(l_v \rightarrow r_v-1)$ corresponded to the intermediate v to the coordinate point on one horizontal coordinate axis so that the inclusion relation becomes larger towards the right with respect to the intermediate node v in $v \in BT_R$ of the logical binary tree BT, thereby forming the horizontal coordinate axis of the set $(l_v \rightarrow r_v-1)$. The coordinate axis setting unit 206 forms the horizontal coordinate axis of the set $(l_v \rightarrow r_v-1)$ with respect to all v in $v \in BT_R$.

The coordinate axis setting unit 206 then corresponds the plurality of subsets contained in the set $(2 \leftarrow n)$ to each coordinate point on one horizontal coordinate axis so that the inclusion relation becomes larger towards the left, thereby forming the horizontal coordinate axis of the set $(2 \leftarrow n)$. The coordinate axis setting unit 206 also corresponds the plurality of subsets contained in the set $(l_v+1 \leftarrow r_v)$ to each coordinate point on one horizontal coordinate axis so that the inclusion relation becomes larger towards the left, thereby forming the horizontal coordinate axis of the set $(l_v+1 \leftarrow r_v)$. The coordinate axis setting unit 206 forms the horizontal coordinate axis of the set $(l_v+1 \leftarrow r_v)$ with respect to all v in $v \in BT_R$.

The coordinate axis setting unit 206 arranges two temporary coordinate points on the right side of the coordinate point positioned at the right end of the horizontal coordinate axis corresponding to the set $(1 \rightarrow n-1)$. The coordinate axis setting unit 206 also arranges two temporary coordinate points on the right side of the coordinate point positioned at the right end of the horizontal axis of the set $(l_v \rightarrow r_v-1)$. Furthermore, the coordinate axis setting unit 206 arranges two temporary coordinate points on the left side of the coordinate point positioned at the left end of the horizontal coordinate axis of the set $(2 \leftarrow n)$. The coordinate axis setting unit 206 further arranges two temporary coordinate points on the left side of the coordinate point positioned at the left end of the horizontal coordinate axis of the set $(l_v+1 \leftarrow r_v)$.

The function configuration of the coordinate axis setting unit 206 has been described above. According to the above-described configuration, the coordinate axis setting unit 206 can generate a plurality of horizontal coordinate axes for forming the digraph of the AI06(B) system. A means for generating the digraph I on the horizontal coordinate axis generated by the coordinate axis setting unit 206 will now be described below.

(Digraph Generation Unit 210)

The function configuration of the digraph generation unit 210 will now be described. The digraph generation unit 210 has a function of generating the digraph I on each horizontal coordinate axis.

First, the digraph generation unit 210 sets a parameter k (k is an integer). The digraph generation unit 210 determines an integer x satisfying $n^{(x-1)/k} < r_v - l_v + 1 \leq n^{x/k}$. Here, k|log(n) (hereinafter, the base of log is 2) may be assumed. The parameter k is the number of intermediate keys to be held by the terminal device 222, and the amount related to the amount of calculation for generating the set key.

The digraph generation unit 210 then forms a rightward directional branch having a length of $n^{i/k}$ (i=0 to x-1) on the horizontal coordinate axis of the set $(1 \rightarrow n-1)$ and the set $(l_v \rightarrow r_v-1)$. The digraph generation unit 210 also forms a leftward directional branch having a length of $n^{i/k}$ (i=0 to x-1) on the horizontal coordinate axis of the set $(2 \leftarrow n)$ and the set $(l_v+1 \leftarrow r_v)$. The digraph generation unit 210 forms the directional branch on the horizontal coordinate axis corresponding to all v.

Specifically, the elements of the set $(1 \rightarrow n-1)$ or the set $(l_v \rightarrow r_v-1)$ are lined such that the inclusion relation becomes larger from left to right on the horizontal line for the horizontal coordinate axis of the set $(1 \rightarrow n-1)$ and the horizontal coordinate axis of the set $(l_v \rightarrow r_v-1)$. The left most coordinate point is the starting point. Furthermore, two temporary coordinate points are arranged on the right of the rightmost coordinate point. The following operation is then performed while moving the counter i from 0 to z-1. Starting from the starting point, jump is continuously made from the relevant coordinate point to the coordinate point spaced apart by $n^{i/k}$ until reaching the temporary coordinate point or the next jump exceeds the temporary coordinate point. Thereafter, the directional branch corresponding to each jump is generated. It is to be noted that the directional branch is generated for the horizontal coordinate axis of the set $(2 \leftarrow n)$ and the set $(l_v+ \leftarrow r_v)$ through similar process but with the left and the right reversed.

The digraph generation unit 210 then erases all directional branches having the temporary coordinate point arranged on each horizontal coordinate axis as the starting end or the terminating end. Furthermore, if a plurality of directional branches reaches one coordinate point, the digraph generation unit 210 erases all directional branches leaving only the longest directional branch from the plurality of directional branches. Through the above process, the digraph $H(1\to n-1)$ of the set $(1\to n-1)$, the digraph $H(2\leftarrow n)$ of the set $(2\leftarrow n)$, the digraph $H(l_v \to r_v-1)$ of the set $(l_v \to r_v-1)$, and the digraph $H(l_v+1 \leftarrow r_v)$ of the set $(l_v+1 \leftarrow r_v)$ are generated.

The digraph generation unit 210 adds the rightward directional branch having a length of one having the temporary coordinate point arranged on the left side of the two temporary coordinate points arranged on the right side of the horizontal coordinate axis of the set $(1\to n-1)$ as the terminating end to the digraph $H(1\to n-1)$. That is, the digraph generation unit 210 executes the process of equation (17) and generates the digraph $H(1\to n)$ of the set $(1\to n)$. Here, $E((\ldots))$ represents the directional branch.

[Equation 14]

$$E(H(1\leftarrow n))=E(H(1\leftarrow n-1))\cup\{([1,n-1],[1,n])\} \qquad (17)$$

The function configuration of the digraph generation unit 210 has been described above. The digraph generation unit 210 can generate the digraph I of the AI06(B) system according to the above configuration.

[Generation Method of Digraph I]

Figure 22:
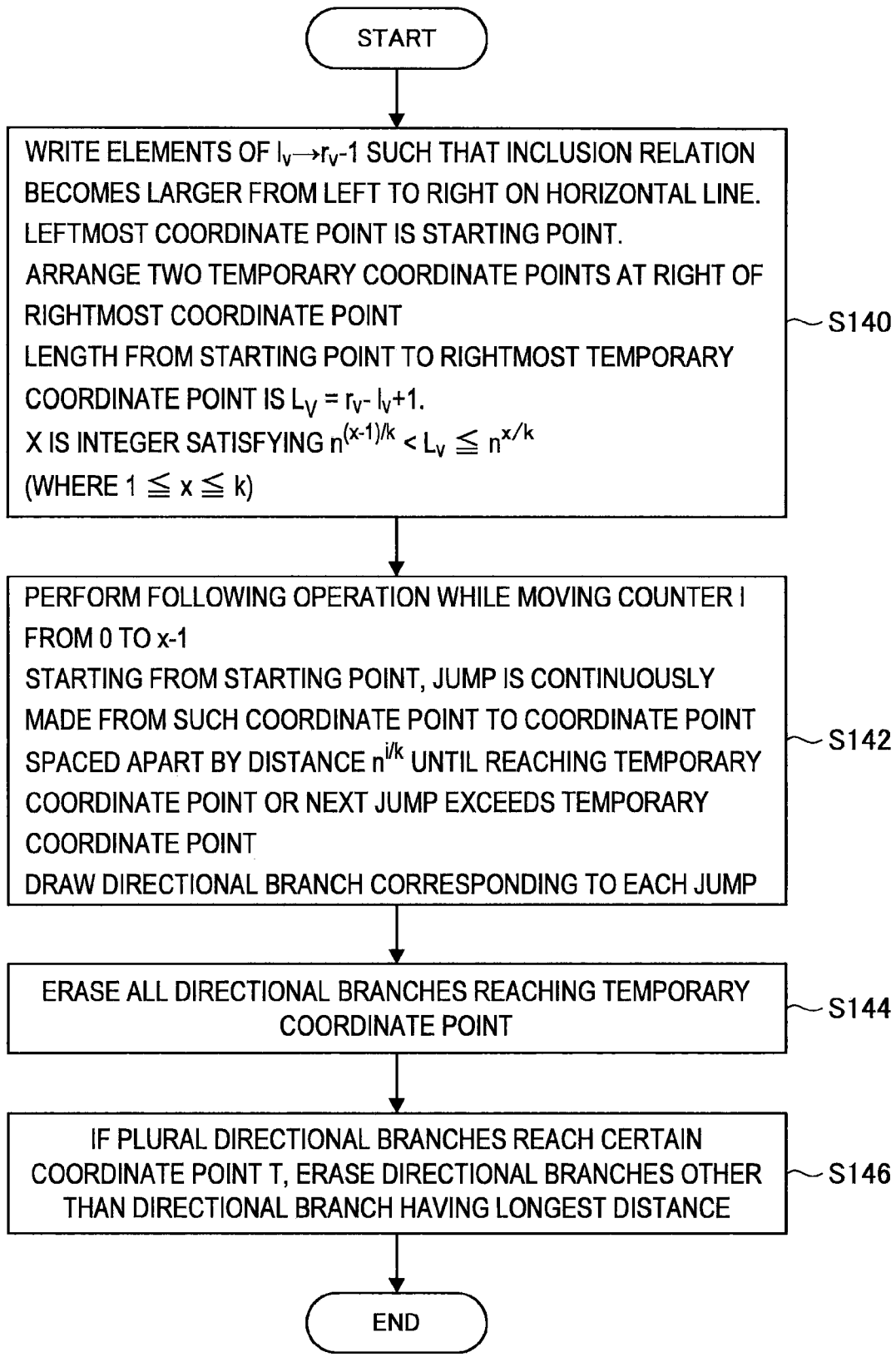
FIG. 22 is an explanatory view showing a flow of graph generation method according to the embodiment.

The generation method of the digraph I will now be described with reference to FIG. 22. FIG. 22 is an explanatory view showing a flow of generation process of the digraph $I(l_v \to r_v-1)$.

The elements of the set $(l_v \to r_v-1)$ are lined such that the inclusion relation becomes larger from left to right on the horizontal line. The leftmost coordinate point is the starting point. Two temporary coordinate points are arranged on the right of the rightmost coordinate point (S140). The length from the starting point to the rightmost temporary coordinate point becomes $L_v = r_v - l_v + 1$. Furthermore, the integer $x(1 \leq x \leq k)$ satisfying $n^{(x-1)/k} < L_v \leq n^{x/k}$ is calculated. The following operation is performed while moving the counter i from 0 to x-1. Starting from the starting point, jump is continuously made from such coordinate point to the coordinate point spaced apart by $n^{i/k}$ until reaching the temporary coordinate point or when the next jump exceeds the temporary coordinate point. The directional branch corresponding to each jump is thereafter generated (S142). All the directional branches reaching the temporary coordinate point are then erased (S144). If a plurality of directional branches reaches a certain coordinate point T, the directional branches other than the directional branch having the longest jump distance are erased (S146).

Figure 21:
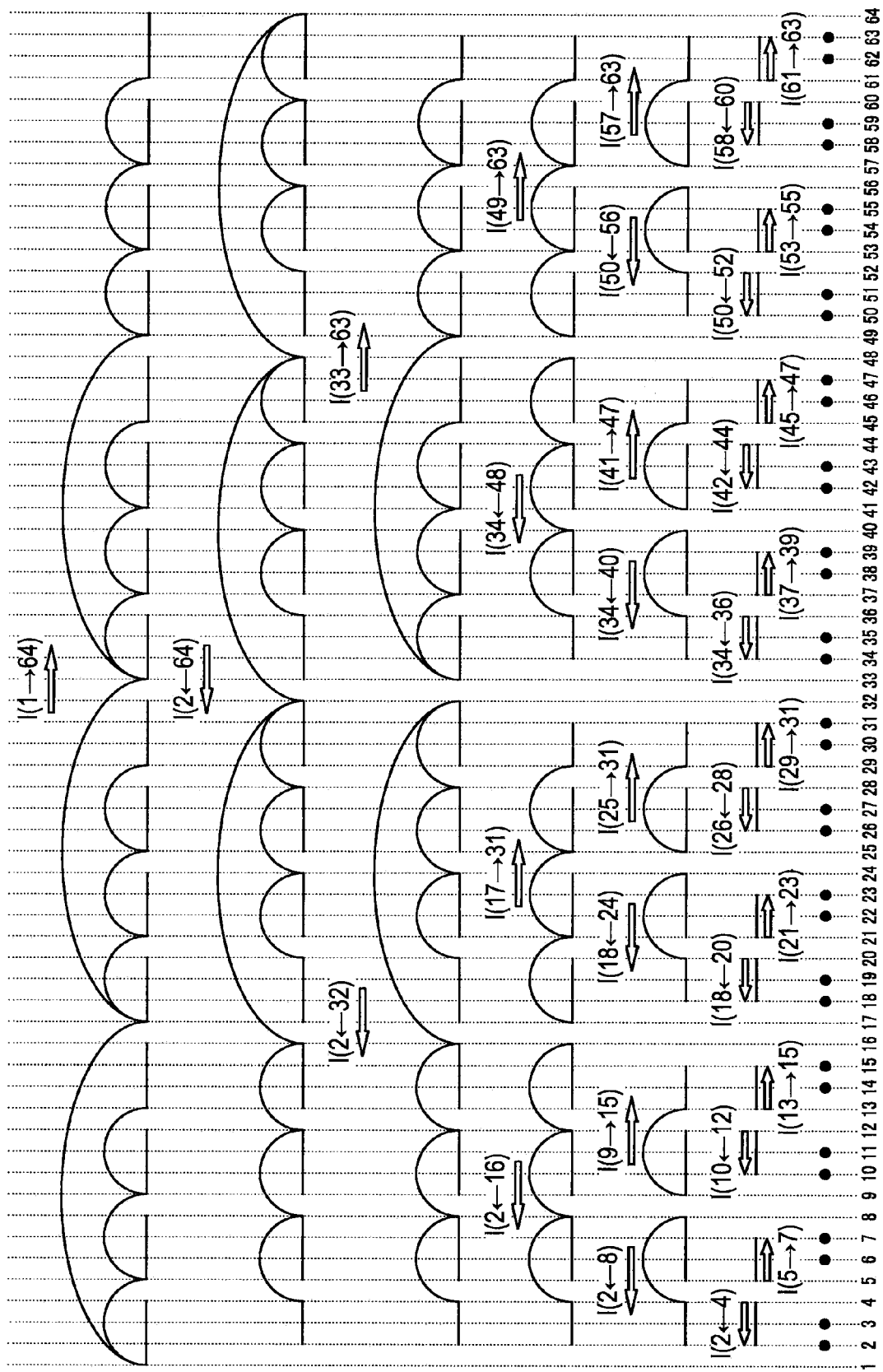
FIG. 21 is an explanatory view showing a digraph I according to the embodiment.

The digraph I of the A06(B) system can be generated through the above-described configuration described for the function configuration of the key distribution server 202 according to the present embodiment. The example of the digraph I is shown in FIG. 20 and FIG. 21. FIG. 20 is an explanatory view showing the digraph I generated under the condition of the number of contractor n=64 and the parameter k=6. FIG. 21 is an explanatory view showing the digraph I generated under the condition of the number of contractor n=64 and the parameter k=3.

[Function Configuration of Terminal Device 222]

Figure 23:
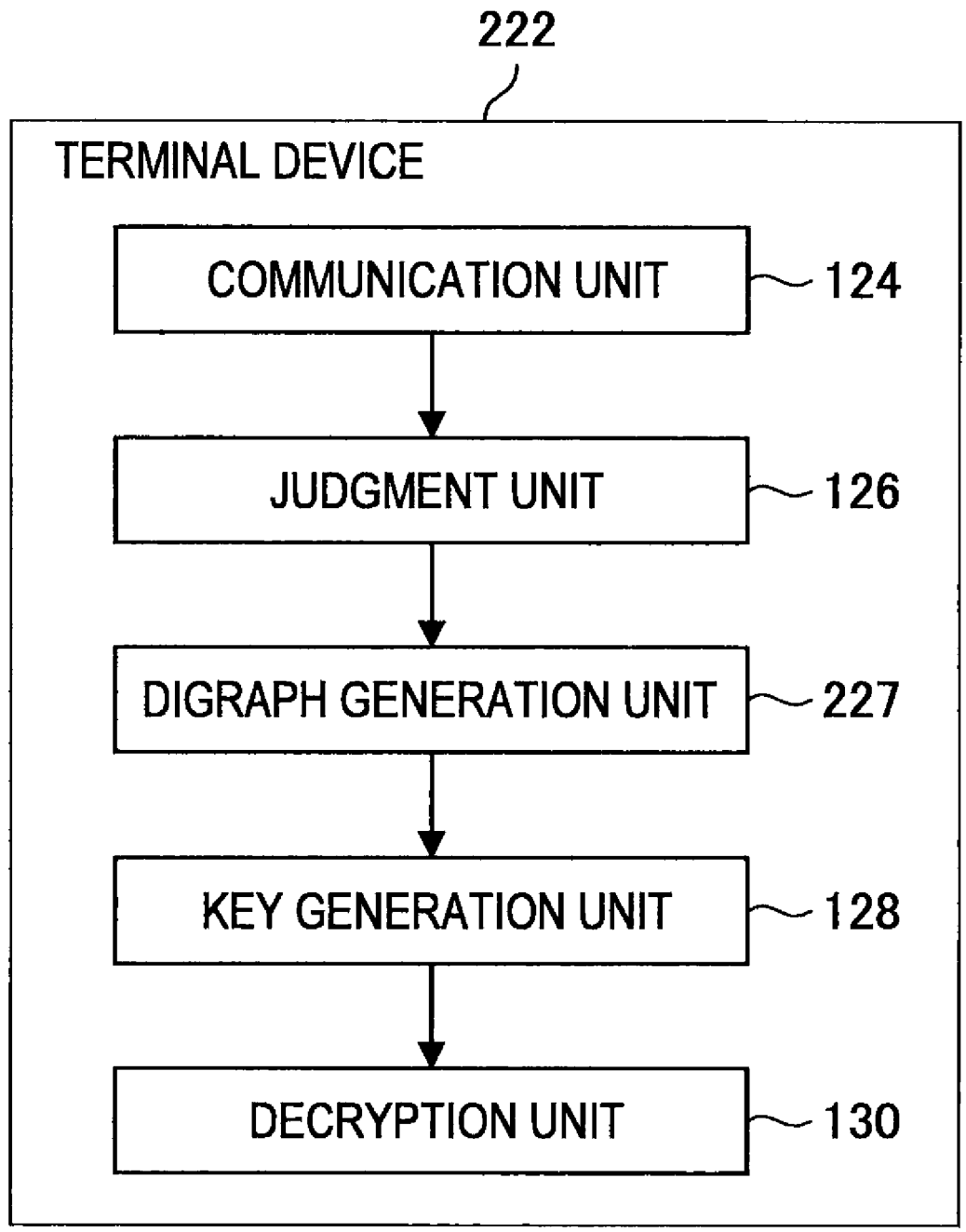
FIG. 23 is an explanatory view showing a function configuration of a terminal device according to the embodiment.

The function configuration of the terminal device 222 according to the present embodiment will now be described with reference to FIG. 23. FIG. 23 is an explanatory view showing the function configuration of the terminal device 222.

As shown in FIG. 23, the terminal device 222 is mainly configured by the communication unit 124, the judgment unit 126, a digraph generation unit 227, the key generation unit 128, and the decryption unit 130. The characteristic configuration of the present embodiment mainly lies on the digraph generation unit 227, and other components are substantially the same as the components of the terminal device 122 according to the first embodiment. Therefore, only the function configuration of the digraph generation unit 227 will be described in detail.

(Digraph Generation Unit 227)

The function configuration of the digraph generation unit 227 will be described first. The digraph generation unit 227 has a function of generating only the directional path for deriving the set key of the subset to which it belongs in the digraphs I used by the key distribution server 202 to derive the set key. That is, the digraph generation unit 227 can generate the digraph G configured only by the directional path enabling the necessary set key to be derived.

(Generation Method of Digraph G)

Figure 26:
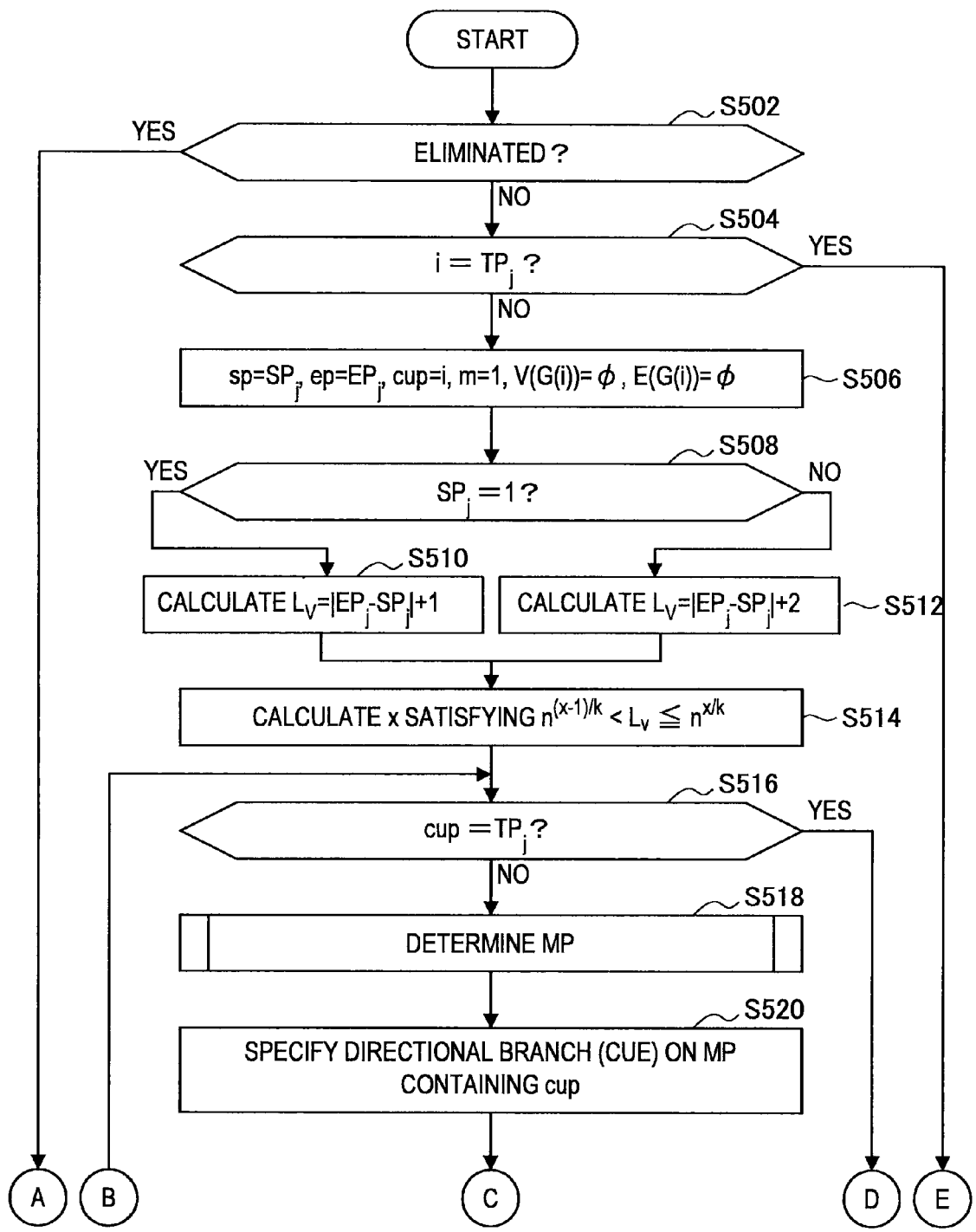
FIG. 26 is an explanatory view showing a flow of graph generation method according to the embodiment.
Figure 27:
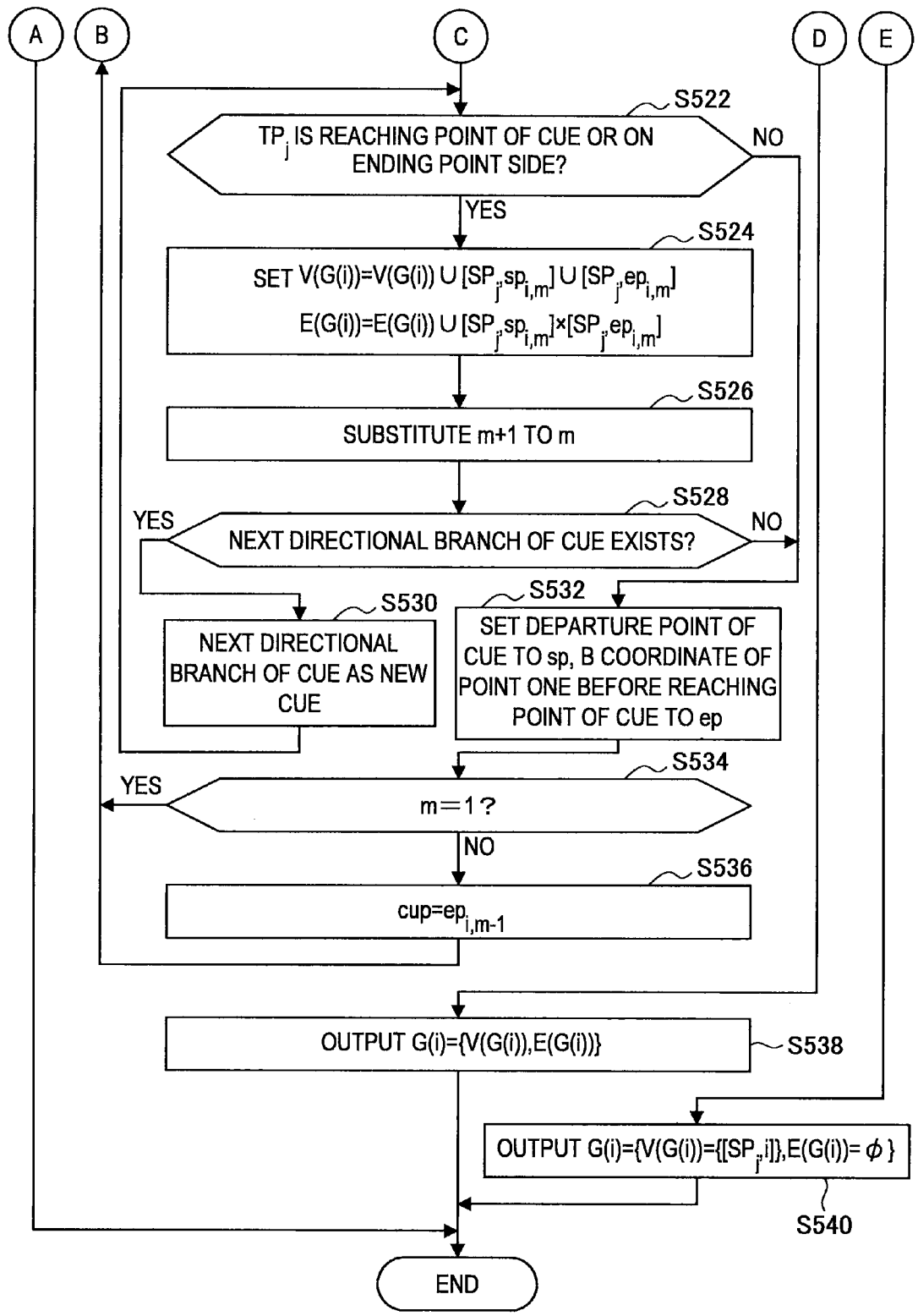
FIG. 27 is an explanatory view showing a flow of graph generation method according to the embodiment.

The generation method of the digraph G will be described in detail with reference to FIG. 26 and FIG. 27. FIG. 26 and FIG. 27 are explanatory views showing a flow of process for generating the digraph G for the contractor i to derive the set key $k(S_j)$ of the subset $S_j$ to which the contractor belongs.

Each symbol of A, B, C, D, E, F described at the lowermost stage of FIG. 26 and the uppermost stage of FIG. 27 is a symbol for clearly indicating the moving destination in the transition of processes of FIG. 26 and FIG. 27. For instance, the steps to reach A of FIG. 26 are assumed to have reached A of FIG. 27.

The terminal device 222 holds, in advance, the information of the number of contractor n and the parameter k. The digraph G is configured by the set $V(G(i))$ of coordinate points and the set $E(G(i))$ of directional branches, and is expressed as $G(i)=\{V(G(i)),E(G(i))\}$. If the coordinate point contained in the digraph $G(i)$ is one, the set $E(G(i))$ of directional branches is expressed as $E(G(i))=\phi$ (symbol $\phi$ is empty set). $[a,b]\times[a,c]$ represents the directional branch in which the coordinate point of the starting end is $[a,b]$ and the coordinate point of the terminating end is $[a,c]$. For the sake of convenience of the explanation, the information of equation (18) is assumed to be acquired from the key distribution server 202.

[Equation 15]

$$sgi=\{\{S_1=[SP_1,TP_1],EP_1\},\ldots,\{S_y=[SP_y,TP_y], EP_y\}\},$$

$$h=\{E_{k(S_1)}(s),\ldots,E_{k(S_y)}(s)\},$$

$$E_s(M) \qquad (18)$$

As shown in FIG. 26, whether or not the subset $S_j(j\in S_j)$ to which it (contractor i) is included exists in the information sgi related to the subset of the permitted contractor acquired by the communication unit 124 is judged (S502). If the subset $S_j$ exists, the process proceeds to step S504. If the subset $S_j$ does not exist, the generation process of the digraph G is terminated assuming that the contractor is eliminated (no authority to acquire content). The process of step S502 is mainly executed by the judgment unit 126.

The digraph generation unit 227 then judges whether or not the number i of the contractor matches $TP_j$ (S504). If $i=TP_j$, the digraph $G(i)=\{V(G(i)),E(G(i))\}$ to be generated when the contractor i derives the set key is output as $V(G(i))=\{[SP_j,i]\},E(G(i))=\phi$ (S540), and the generation process of the digraph G is terminated. If not $i=TP_j$, the process proceeds to step S506.

The digraph generation unit 227 initializes the coordinate cup of the current position of the contractor i, the coordinate sp of the starting point and the coordinate ep of the ending point of the range currently being considered, the counter m, the set V(G(i)) of coordinate points, and the set E(G(i)) of directional branches in the following manner (S506).

sp=SPj, ep=EPj, cup=i, m=1, V(G(i))=φ, E(G(i))=φ. Here, j represents the index j of the subset $S_j$ satisfying i∈$S_j$.

The digraph generation unit 227 then judges whether or not $SP_j=1$ (S508). The process proceeds to step S510 if $SP_j=1$. The digraph generation unit 227 then calculates $L_v=|EP_j-SP_j|+1$ (S510), and then proceeds to step S514. If not $SP_j=1$, the process proceeds to step S512. The digraph generation unit 227 calculates $L_v=|EP_j-SP_j|+2$ (S512), and then proceeds to step S514.

The digraph generation unit 227 calculates x (1≦x≦k) satisfying $n^{(x-1)/k} < L_v \leq n^{x/k}$ (S514). The digraph generation unit 227 judges whether or not cup=$TP_j$ (S516). If cup=$TP_j$, the process proceeds to step S538. The digraph G{V(G(i)),E(G(i))} used by the contractor i to derive the key of the subset is output (S538), and the generation process of the digraph G is terminated.

If not cup=$TP_j$, the process proceeds to step S518. The digraph generation unit 227 then determines the maximum directional path (MP; MaxPath) in which the number of jumps from sp to ep becomes a minimum (S518). This process will be hereinafter described.

The digraph generation unit 227 specifies the directional branch in which the coordinate point [$SP_j$,cup] is contained between the starting end and the terminating end of each directional branch existing on the MP (S520). However, a case where the coordinate point of the starting end or the terminating end and the coordinate point [$SP_j$,cup] match is also included. The specified directional branch is called the CUE (Current User's Edge). If the coordinate point [$SP_j$,cup] exists on the MP and the coordinate point [$SP_j$,cup] matches the coordinate points of the starting end and the terminating end of the two adjacent directional branches, the directional branch having the coordinate point [$SP_j$,cup] as the starting point is assumed as CUE.

The digraph generation unit 227 proceeds to step S532 if the coordinate point [$SP_j$,$TP_j$] does not match the terminating end of the CUE and is not closer to the ending point side of the digraph I than the terminating end of the CUE (S522). The process proceeds to step S524 if the coordinate point [$SP_j$,$TP_j$] matches the terminating end of the CUE or is closer to the ending point side of the digraph I than the terminating end of the CUE (S522).

The digraph generation unit 227 then sets V(G(i)) and E(G(i)) as below (S524).

If V(G(i))=φ, V(G(i))=[$SP_j$,$sp_{i,m}$]∪[$SP_j$,$ep_{i,m}$]. If not V(G(i))=φ, V(G(i))=V(G(i))∪[$SP_j$,$ep_{i,m}$]. Furthermore, E(G(i))=E(G(i))∪{[$SP_j$,$sp_{i,m}$]×[$SP_j$,$ep_{i,m}$]}.

Here, $sp_{i,m}$, $ep_{i,m}$ represent the coordinates of the starting end and the terminating end of the current CUE. The process differs for when V(G(i))=φ and when not V(G(i))=φ for the following reasons. If V(G(i))=φ, both the starting end and the terminating end of the directional branch are to be added as the coordinate points, but if not V(G(i))=φ, the starting end of the directional branch to be added is already added as the coordinate point of the V(G(i)), and thus only the coordinate point for the terminating end is added to V(G(i)) to avoid redundancy.

The digraph generation unit 227 substitutes m+1 to m (S526). The digraph generation unit 227 judges whether or not the next directional branch (directional branch having the terminating end of the CUE as the starting end) of the CUE exists (S528). If the next directional branch of the CUE exists, the process proceeds to step S530, the next directional branch of the CUE existing on the MP is set as the new CUE, and the process is returned to the process of step S522. If the next directional branch of the CUE does not exist, the process proceeds to step S532.

The digraph generation unit 227 then sets the coordinate of the starting end of the CUE to the sp, and sets the coordinate of the coordinate point positioned one before the terminating end of the CUE to the ep (S532). The digraph generation unit 227 then judges whether or not m=1 (S534). If m=1, the process returns to the process of step S516. If not m=1, the process proceeds to step S536.

The digraph generation unit 227 sets cup=$ep_{i,(m-1)}$ (S536), and returns to the process of step S516.

The generation method of the digraph G according to the present embodiment has been described. In the above-described generation method, assumption is made that the information $EP_j$ related to the ending point of the digraph I is contained in the sgi, but the contractor may specify the $EP_j$ as the $EP_j$ can be uniquely specified by the logical binary tree BT once $SP_j$ is determined. Such configuration is realized by adding the step of deriving the $EP_j$ to the process of step S506.

(Determination Method of Maximum Directional Path MP)

Figure 28:
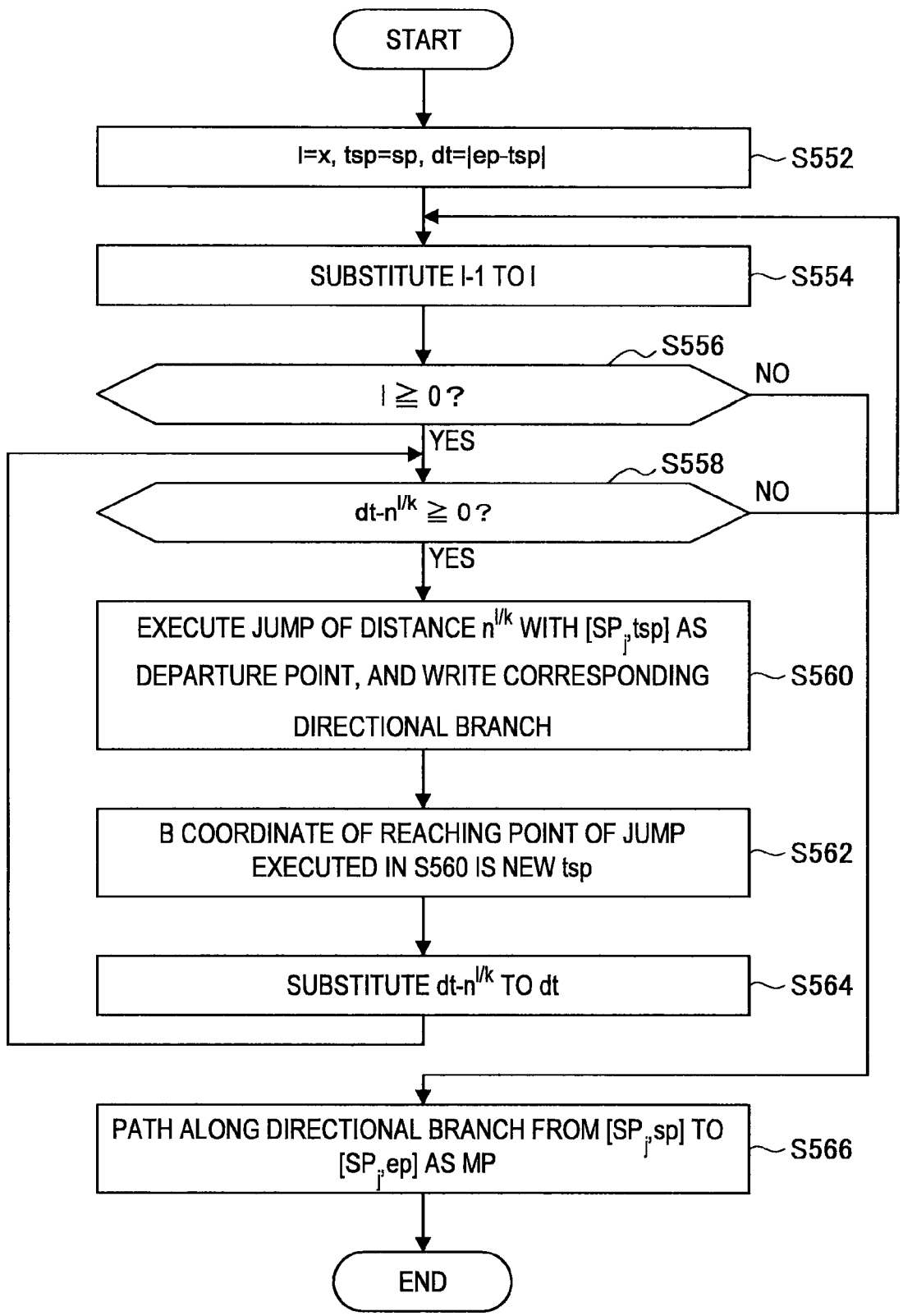
FIG. 28 is an explanatory view showing a flow of graph generation method according to the embodiment.

The determination method of the maximum directional path MP in step S518 of FIG. 26 will now be described with reference to FIG. 28. FIG. 28 is an explanatory view showing a flow of determination process of the maximum directional path MP.

As shown in FIG. 28, the digraph generation unit 227 first initializes the counter 1, the coordinate tsp of the reaching point of the jump currently being considered, and the distance dt currently being considered as below (S552). l=x, tsp=sp, dt=|ep−tsp|.

The digraph generation unit 227 then substitutes l−1 to 1 (S554). The digraph generation unit 227 judges whether or not l≧0 (S556). If not l≧0, the process proceeds to step S566, sets the directional path formed by a chain of at least one directional branch from the coordinate point [$SP_j$,sp] to the [$SP_j$,ep] as MP (S566), and terminates the determination process of the MP. If l≧0, the process proceeds to step S558.

The digraph generation unit 227 then judges whether or not dt−$n^{1/k}$≧(S558). If not dt−$n^{1/k}$≧0 the process returns to the process of step S554. If dt−$n^{1/k}$≧0, the process proceeds to step S560.

The digraph generation unit 227 executes a jump of distance $n^{1/k}$ with [$SP_j$,tsp] as the departure point, and generates the corresponding directional branch (S560). The digraph generation unit 227 then newly sets the coordinate of the terminating end of the directional branch generated in step S560 as tsp (S562). The digraph generation unit 227 then substitutes dt−$n^{1/k}$ to dt (S564), and returns to the process of step S558.

The determination method of the maximum directional path MP has been described above. The generation process of the digraph G can be performed by the above-described determination process.

(Specific Example)

Figure 24:
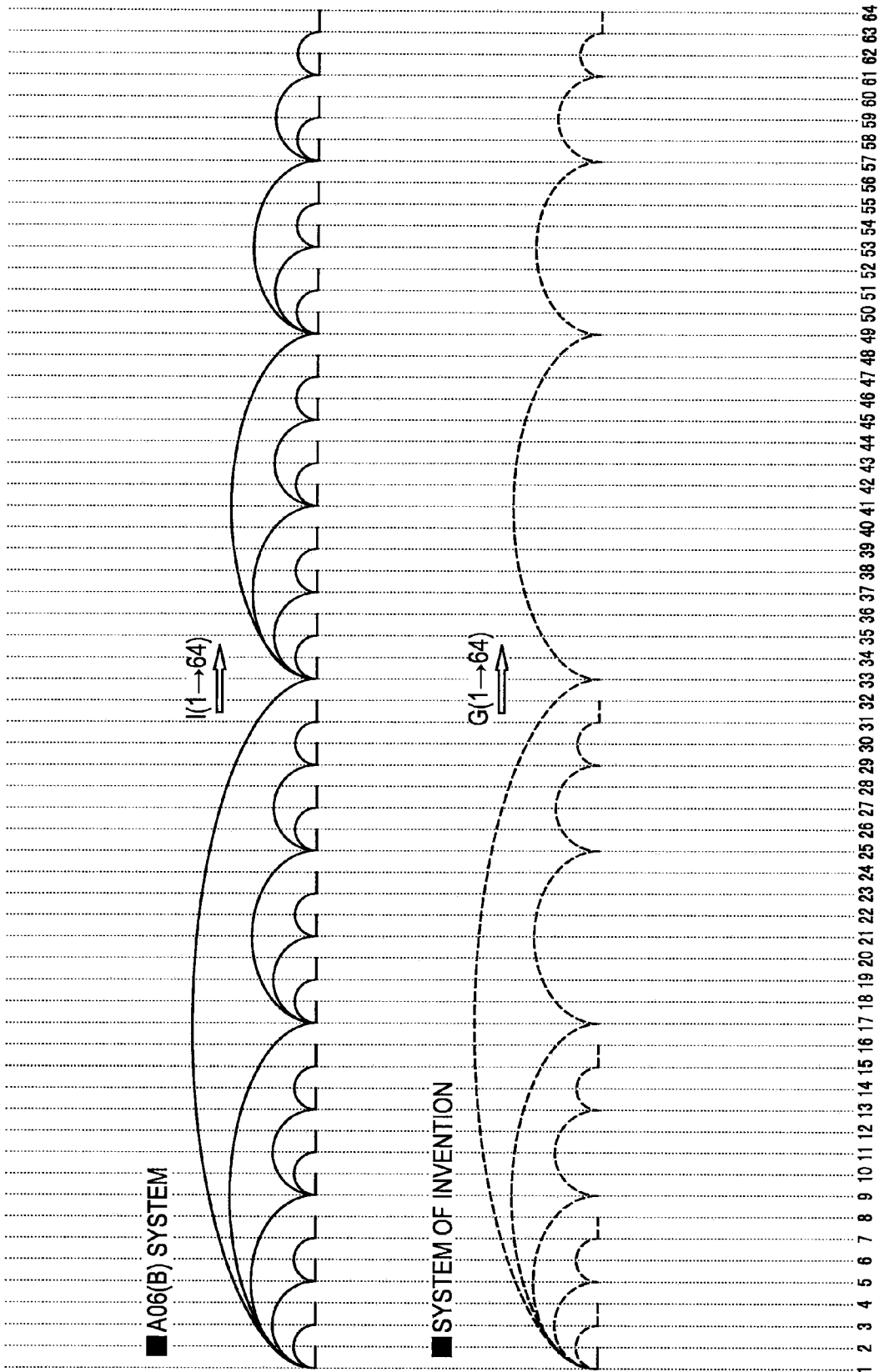
FIG. 24 is an explanatory view showing a digraph G according to the embodiment.
Figure 25:
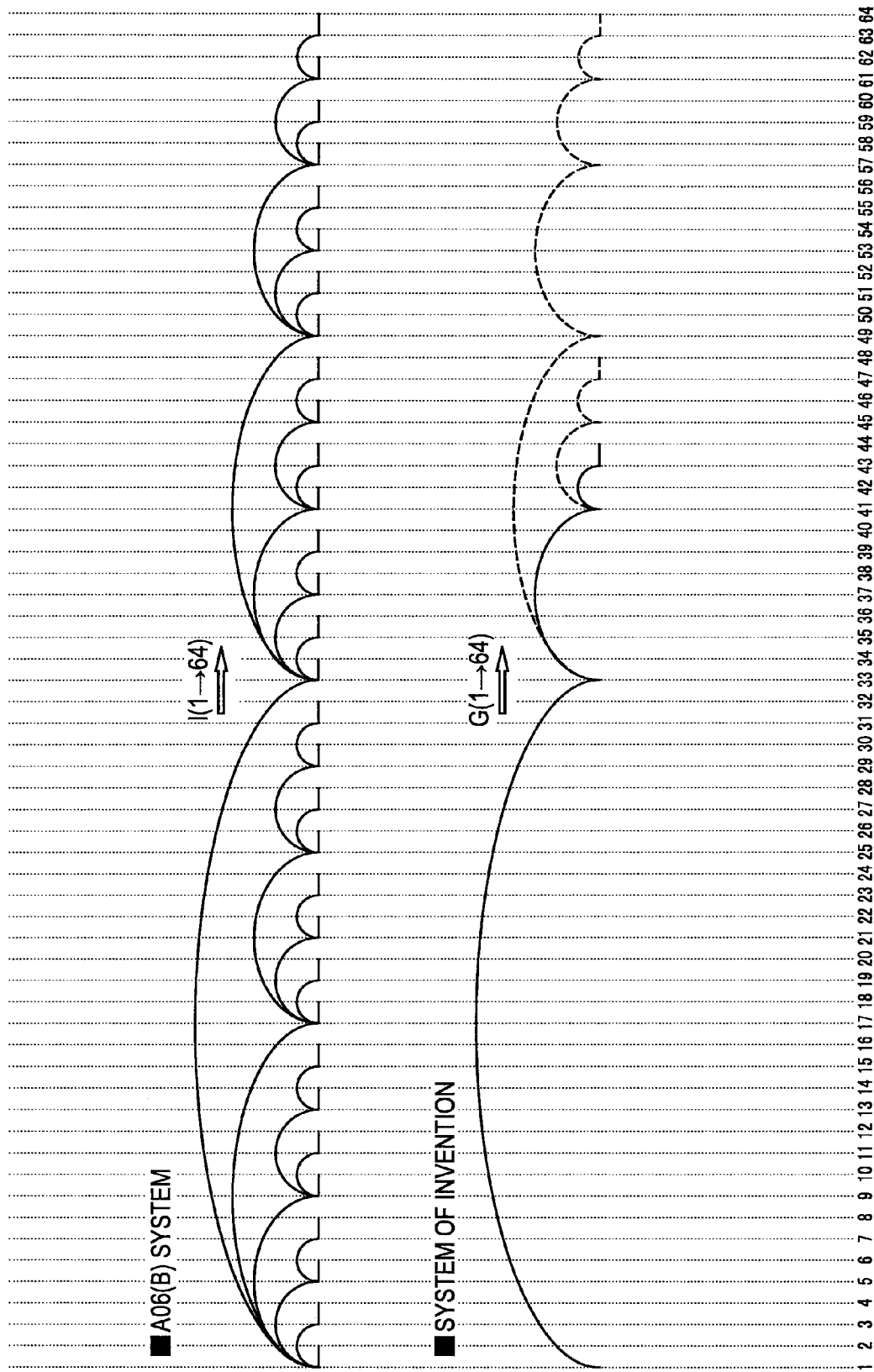
FIG. 25 is an explanatory view showing a digraph G according to the embodiment.

The specific example of the digraph G generated by the digraph generation unit 227 based on the above-described generation method will be described with reference to FIG. 24 and FIG. 25. FIG. 24 and FIG. 25 are explanatory views showing a digraph G generated when the number of contractor is n=64, and the parameter is k=6. In particular, only the digraph corresponding to the set (1→64) is shown. The diagrams drawn on the upper side of FIG. 24 and FIG. 25 are the digraph I derived by the contractor when the algorithm of the AI06(B) system is used. The diagrams drawn on the lower side are the digraph G derived by the contractor when the algorithm of the present embodiment is used.

41

(Specific Example 1)

First, the digraph G generated for the contractor 1 to derive the set key of the subset [1,2] is shown with reference to FIG. 24. The solid line in the figure shows the directional branch corresponding to the jump to be eventually derived when the contractor 1 derives the set key. That is, when deriving the set key of the subset [1,2], the contractor 1 inputs the intermediate key t([1,1]) corresponding to the starting end of the directional branch shown with a solid line to the PRSG, and derives the t([1,2]) corresponding to the terminating end thereof. Furthermore, the digraph G configured by the solid line and the broken line represents the maximum directional path MP to be derived by the contractor 1.

(Specific Example 2)

The digraph G generated for the contractor 7 to generate the set key of the subset [1,44] is shown with reference to FIG. 25. The solid line in the figure shows the directional branch corresponding to the jump to be eventually derived when the contractor 7 derives the set key. That is, when deriving the set key of the subset [1,44], the contractor 7 uses the intermediate key t([1,33]) it holds in advance and repeatedly executes the PRSG along the directional branch shown with a solid line to derive the intermediate key t([1,44]). Furthermore, the digraph G configured by the solid line and the broken line represents the maximum directional path MP to be derived by the contractor 7.

(Key Generation Method)

The flow of key generation process according to the present embodiment will be described using a specific example with reference to FIG. 16. The function configuration of the key generation unit 128 according to the present embodiment is substantially the same as the key generation unit 128 according to the first embodiment, but differs in the shape of the digraph to be referenced in the key generation.

First, a step in which the contractor 7 derives the set key of the subset [1,44] will be described with reference to FIG. 20 and FIG. 24. With reference to FIG. 20, it is apparent that the contractor 7 belongs to the subsets corresponding to the elements of seven digraphs I(1→64), I(2←64), I(2←32), I(2←16), I(2←8), I(6→7), I(7→7). Among them, a subset to which the contractor 7 belongs, the subset being the four subsets [1,7], [1,9], [1,17], [1,33] where the contractor 7 does not belong to the subset corresponding to the parent of such subset exists in the digraph I(1→64). Therefore, with respect to the digraph I(1→64), the intermediate keys t([1,7]), t([1,9]), t([1,17]), t([1,33]) are provided to the contractor 7 in time of system setup. Similar predetermined intermediate keys are also provided for other digraphs I(2←64), I(2←32), I(2←16), I(2←8), I(6→7), I(7→7).

First, the contractor 7 generates the digraph G shown in the lower diagram (system of invention) of FIG. 24 with the function of the digraph generation unit 227. Thereafter, the contractor 7 acquires the set key k([1,44]) of the subset [1,44] through the following procedures (see FIG. 16).

First, check is made that TPj that is not i=TPj does not exist, and the counter 1 is initialized to one. Thereafter, the intermediate key t([1,33]) corresponding to the subset [1,33] that matches the coordinate of the terminating end of the first directional branch [1,1]×[1,33]∈E(G(7)) is specified from the intermediate keys t([1,7]), t([1,9]), t([1,17]), t([1,33]) the contractor holds in advance, which is then set as CTK.

The presence of the next directional branch is then checked. In this case, as the directional branch [1,33]×[1,41] ∈E(G(7)) exists at the current time point, CTK=t([1,33]) is input to the PRSG, and the output of (k+1)*λ bits as shown in equation (19) is obtained.

42

[Equation 16]

$$t([1,34])\|t(1,35)\|t(1,37)\|t([1,41])\|t([1,49])\|t([1,65])\|k([1,33]) \leftarrow PRSG(t([1,33])) \quad (19)$$

Here, t([1,65]) represents a dummy intermediate key, and thus is not actually used. Then, after the counter 1 is incremented, the intermediate key to use is determined from the output intermediate keys. As the counter 1 is incremented and becomes l=2, p(p=3) satisfying |41−33|=8=$2^3$=$n^{p/k}$ is determined with respect to the directional branch [1,33]×[1,41]∈E (G(7)). In response to such result, t([1,41]) is acquired from the output of the equation (19), and the CTK is updated to t([1,41]). Similarly, the existence of the directional branch [1,41]×[1,43]∈E(G(7)) is checked, the CTK is input to the PRSG, and the output of equation (20) is obtained.

[Equation 17]

$$t([1,42])\|t(1,43)\|t(1,45)\|t([1,49])\|t([1,57])\|t([1,73])\|k([1,41]) \leftarrow PRSG(t([1,41])) \quad (20)$$

The counter 1 is then set to l=3, p=1 is calculated with respect to the directional branch [1,41]×[1,43]∈E(G(7)), and then the CTK is updated to t([1,43]). The above processes are repeatedly executed one more time to obtain a state in which the next directional branch does not exist. In this case, CTK=t ([1,44]), and thus from k*λ+$1^{th}$ bit to (k+1)*$λ^{th}$ bit of the value output by inputting the CTK to the PRSG are extracted as the set key k([1,44]).

As described above, the contractor 7 can acquire the set key k([1,44]) of the subset [1,44] using the intermediate key the contractor holds. Thus, each contractor can calculate the desired set key using the intermediate key the contractor holds.

[Effect]

The present embodiment provides a means for generating a new digraph G containing only the directional branch required by each contractor using the digraph generation method improved from the digraph generation method of the A06(B) system when each contractor derives the set key of the subset to which the contractor belongs. The effects of the present embodiment will be clarified by comparing the number of directional branches of the digraph I generated by the A06(B) system, and the number of directional branches of the digraph G generated by the system of the present embodiment.

In the A06(B) system, a maximum of n−1 directional branches are necessary for each contractor to derive the set key. In the system of the present embodiment, on the other hand, the number of directional branches of when the number of directional branches becomes a maximum (when contractor 1 derives set key corresponding to subset [1,2]) is expressed with the following equation (21).

[Equation 18]

$$kl + (kl - t) + \ldots + t = \sum_{i=1}^{k}(k+1-i)t \quad (21)$$

$$= \frac{k(k+1)}{2} \cdot (n^{1/k} - 1)$$

For instance, when the number of contractor is n=$2^{32}$ and the parameter is k=32, n−1=4294967295 directional branches are required in the A06(B) system, but only k*(k+1)*($n^{1/k−1}$)/2=528 directional branches are required in the present embodiment. That is, in this case, about eight millionth of the amount of calculation is sufficient. In the example of the digraph of FIG. 24, n−1=63 directional branches are required in the digraph I(1→64), whereas only twelve directional branches are derived in the digraph G(1→64). In the case of FIG. 24, the number of directional branches the contractor actually generates is only four. As a result, each contractor can efficiently generate the desired digraph G by applying the present embodiment, and thus can derive the key at high speed.

<Third Embodiment>

The configuration of the key providing system 100 and the specific system related to the key distribution according to a third embodiment of the present invention will be described in detail below. The same reference numerals are denoted for the components substantially the same as the key providing system 100 according to the first embodiment to omit redundant description, and the differing components will be described in detail. The present embodiment has characteristics in that a terminal device includes a means for efficiently generating the digraph in the key providing system 100 of the A06(A) system.

[Characteristics of Third Embodiment]

The difference between the third embodiment and the first embodiment of the present invention will be briefly described. First, the greatest difference of the first embodiment and the present embodiment is the difference of the key distribution system to which the technique of the present invention is applied. The first embodiment is applicable to the AI05 system, whereas the present embodiment is applicable to the A06(A) system. The issues of the AI05 system have been specifically described in the description related to the second embodiment, where A06(A) system provides a means for solving one of the issues that the number of keys to be held by each contractor is large. The A06(A) system has characteristics in the configuration of replacing the length of the directional branch configuring the digraph so as to become short under the condition of not exceeding the number of directional branches of the longest directional path in which the number of directional branches configuring the directional path in the digraph H of the AI05 system is a maximum. That is, the A06(A) system reduces the number of keys to be held by each contractor while maintaining the amount of calculation of the same extent as the AI05 system. However, similar to the AI05 system and the A06(B) system, the information of the digraph to be held or calculated by each contractor is enormous, where a common issue arises in that it is difficult to realize in a general terminal device.

(Object of the Present Embodiment)

The object of the present embodiment is to provide a means for greatly reducing the calculation load on each contractor by generating only the information of the digraph required by each contractor in the key providing system 100 based on the digraph I of the A06(A) system.

[Configuration of Key Providing System 100]

A configuration of the key providing system 100 according to the present embodiment will be described. The basic system configuration is substantially the same as the configuration of the first embodiment shown in FIG. 1, and thus the detailed description will be omitted. The hardware configuration of a key distribution server 302 and a terminal device 322 arranged in the key providing system 100 according to the present embodiment is also substantially the same as the hardware configuration of the key distribution server 102 and the terminal device 122 shown in FIG. 2, and thus the detailed description thereof will be omitted.

[Function Configuration of Key Distribution Server 302]

Figure 29:
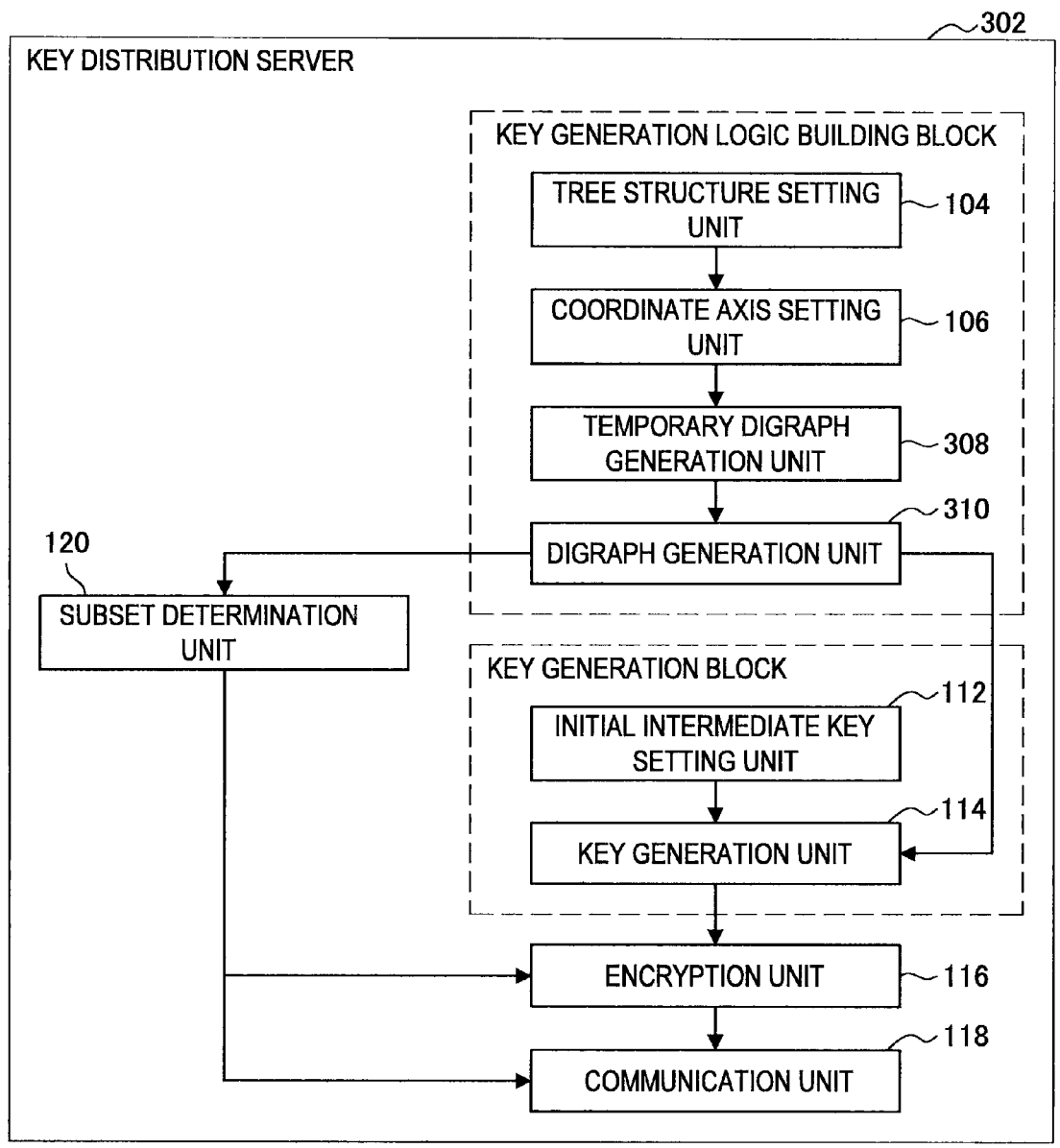
FIG. 29 is an explanatory view showing a configuration of a key distribution server according to a third embodiment of the present invention.

The function configuration of the key distribution server 302 according to the present embodiment will be described with reference to FIG. 29. FIG. 29 is an explanatory view showing a function configuration of the key distribution server 302.

As shown in FIG. 29, the key distribution server 302 is mainly configured by the tree structure setting unit 104, the coordinate axis setting unit 106, a temporary digraph generation unit 308, a digraph generation unit 310, the initial intermediate key setting unit 112, the key generation unit 114, the encryption unit 116, the communication unit 118, and the subset determination unit 120. The characteristic configuration of the present embodiment mainly lies in the temporary digraph generation unit 308 and the digraph generation unit 310, and other components are substantially the same as the components of the key distribution server 102 according to the first embodiment. Therefore, only the function configuration of the temporary digraph generation unit 308 and the digraph generation unit 310 will be described in detail.

(Temporary Digraph Generation Unit 308)

First, the function configuration of the temporary generation unit 308 will be described. The temporary generation unit 308 has substantially the same function configuration as the digraph generation unit 110 according to the first embodiment, and has a function of generating a temporary digraph I' having the same shape as the digraph H of the AI05 system. For instance, in the case of n=64 and parameter k=6, the temporary digraph I' matches the digraph H shown in FIG. 5.

(Digraph Generation Unit 310)

The function configuration of the digraph generation unit 310 will now be described. The digraph generation unit 310 has a function of generating the digraph I by replacing some of a plurality of directional branches configuring the temporary digraph I'. First, the digraph generation unit 310 selects the directional path in which the number of directional branches configuring the same is the maximum of the directional paths contained in the temporary digraph I'. Such directional path is referred to as the longest directional path LP (Longest Path). The digraph generation unit 310 generates the digraph I by replacing some of the directional paths contained in the temporary digraph I' with the directional paths configured by a chain of a plurality of shorter directional branches under the condition that the number of directional branches of all directional paths does not exceed the number of directional branches of the longest directional path LP.

(Generation Method of Digraph I)

Figure 30:
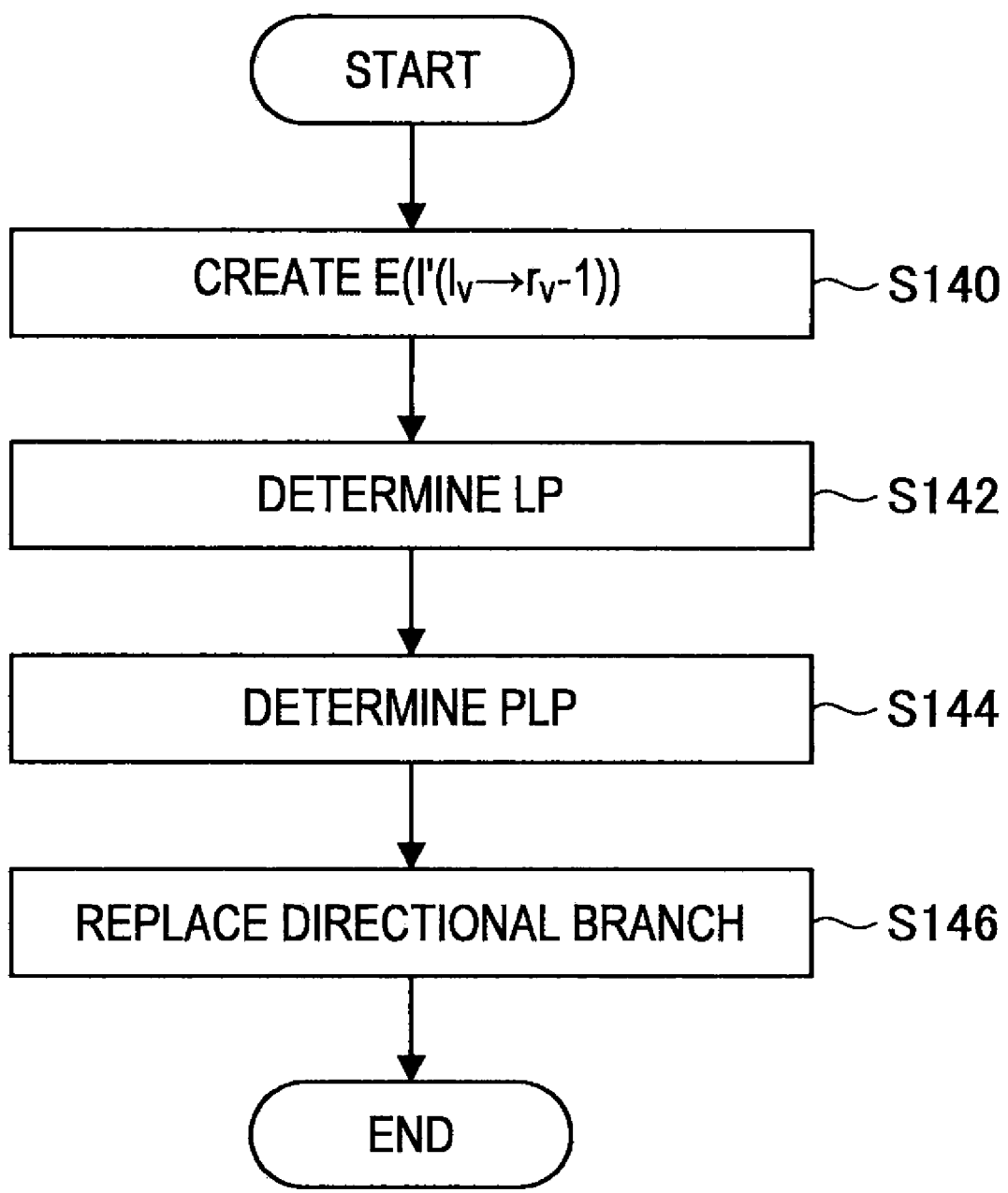
FIG. 30 is an explanatory view showing a flow of graph generation method according to the embodiment.
Figure 31:
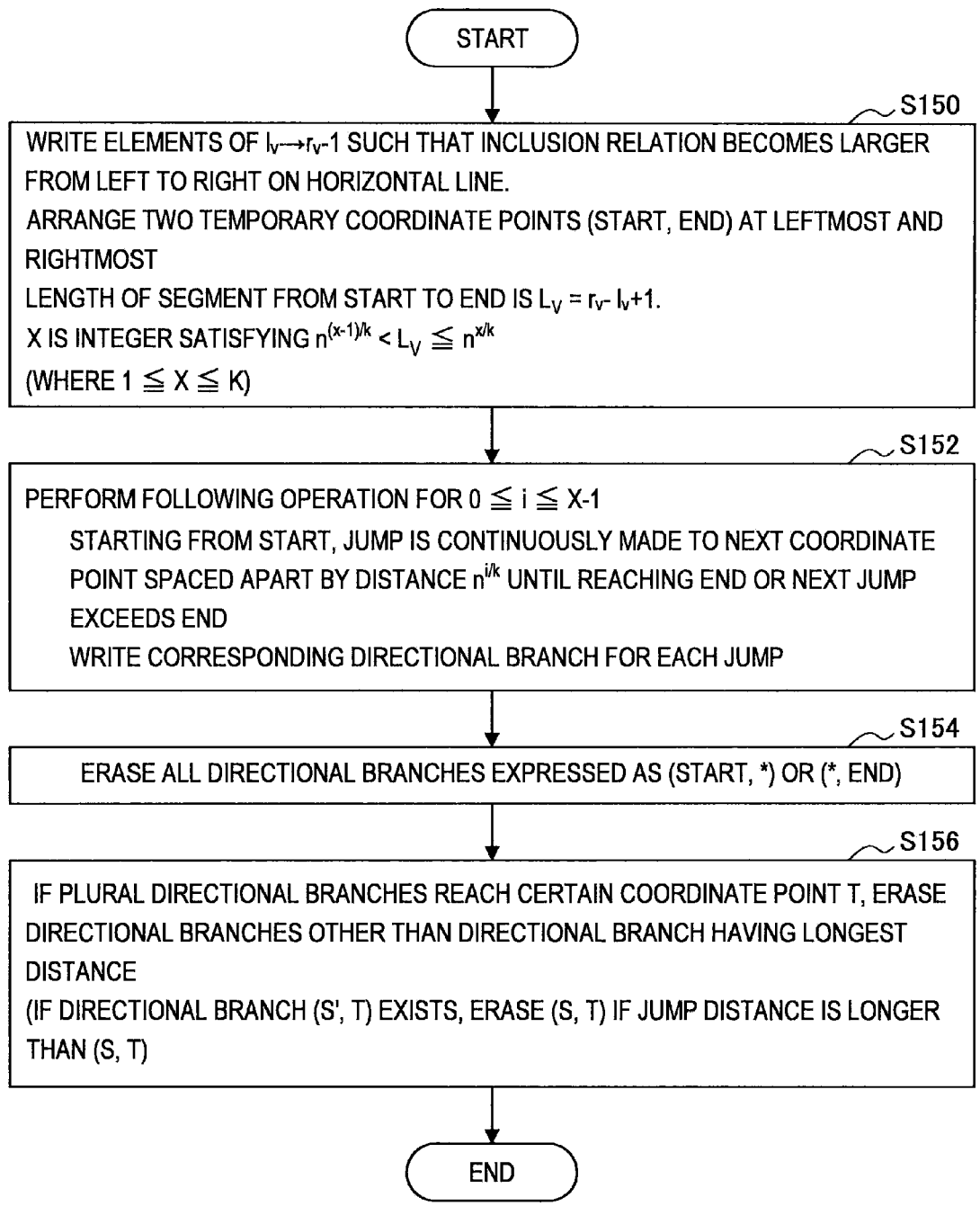
FIG. 31 is an explanatory view showing a flow of graph generation method according to the embodiment.
Figure 32:
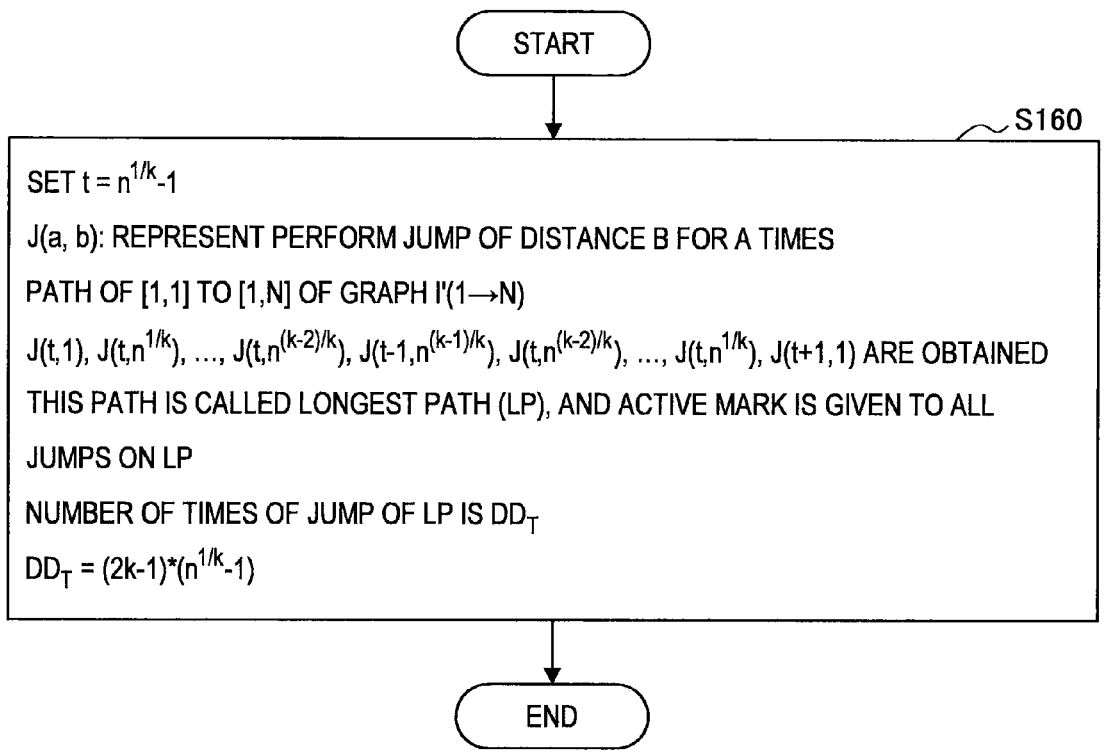
FIG. 32 is an explanatory view showing a flow of graph generation method according to the embodiment.
Figure 33:
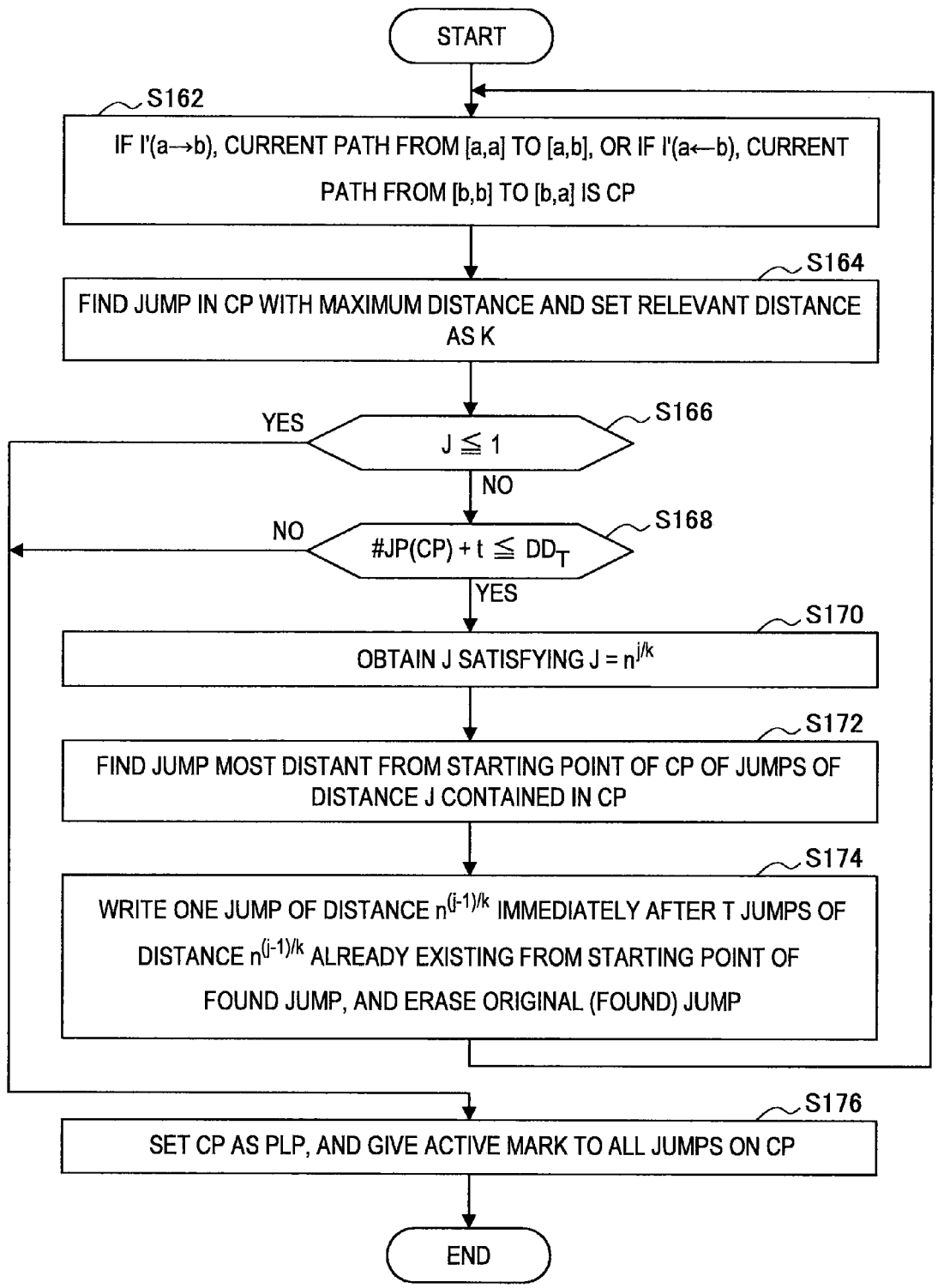
FIG. 33 is an explanatory view showing a flow of graph generation method according to the embodiment.
Figure 34:
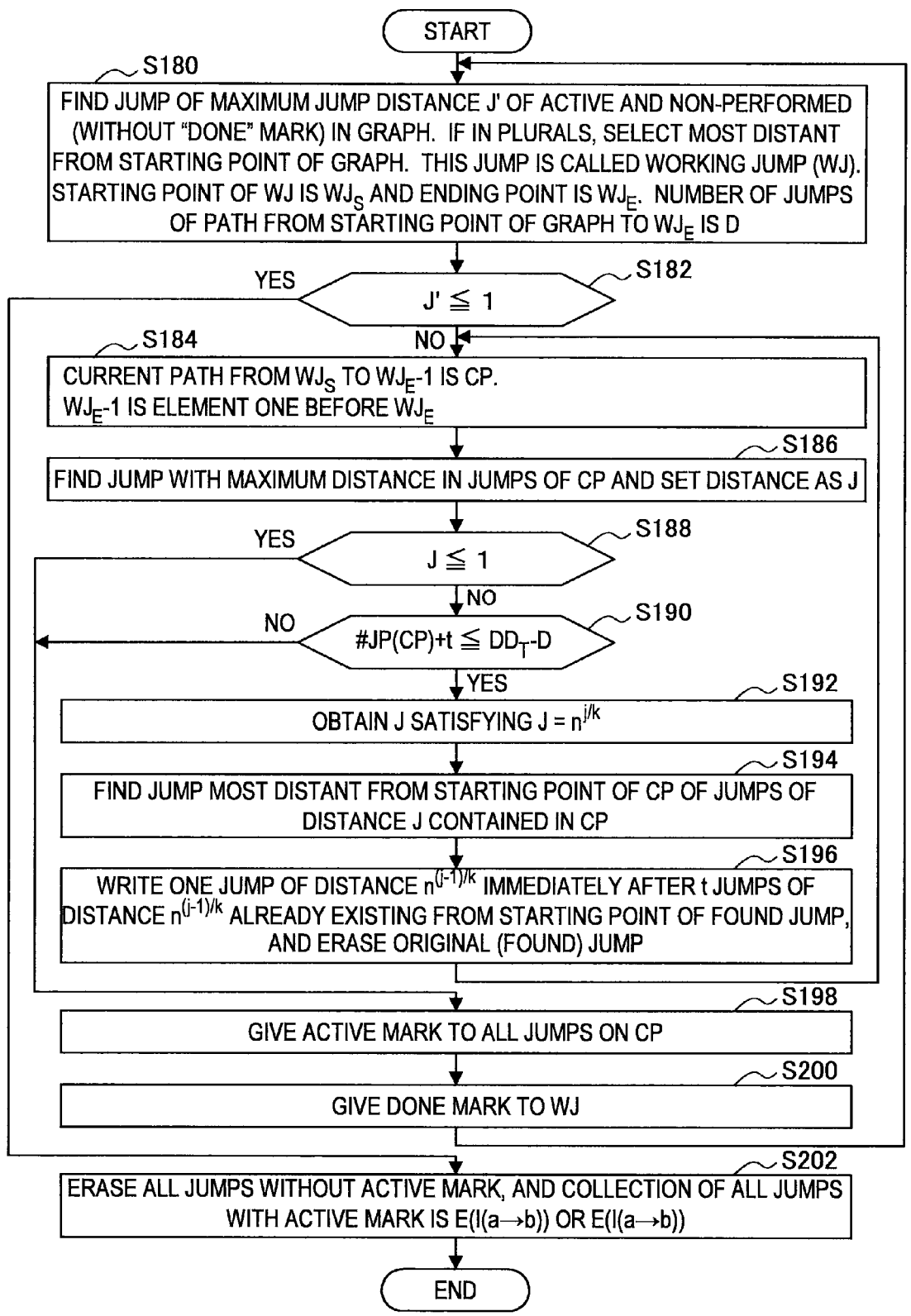
FIG. 34 is an explanatory view showing a flow of graph generation method according to the embodiment.

The generation method of the digraph I will be described with reference to FIGS. 30 to 34. FIG. 30 is an explanatory view showing an overall flow of process for generating the digraph I. FIG. 31 is an explanatory view showing a generation process of the temporary digraph I'. FIG. 32 is an explanatory view showing a flow of process for extracting the longest directional path LP. FIG. 33 is an explanatory view showing a flow of process for extracting the directional path PLP of longest length (Partially Longest Path) from the directional paths other than the longest directional path LP. FIG. 34 is an explanatory view showing a process of replacing the directional path of the temporary digraph I' with the directional path configured by a set of shorter directional branches.

As shown in FIG. 30, the temporary digraph I' is first generated by the temporary digraph generation unit 308 (S140). The longest directional path LP is then extracted from the directional paths forming the digraph I' (S142). The directional path PLP of longest length is extracted from the directional paths other than the longest directional path LP of the temporary digraph I' (S144). The directional path PLP of longest length may be extracted for the temporary digraph I' corresponding to each subset. The directional branches configuring the directional path of the temporary digraph I' is then replaced with shorter directional branches (S146). In this case, the directional branches are replaced such that the number of directional branches of all directional paths does not exceed the number of directional branches of the longest directional path LP. That is, the worst value of the amount of calculation for generating the key does not increase than the AI05 system even if such replacement process is executed.

Each step shown in FIG. 30 will be more specifically described below.

(Details of S140)

First, the generation process of the temporary digraph I' will be described with reference to FIG. 31. FIG. 31 is an explanatory view showing the flow of generation process of the temporary digraph I'($1_v \rightarrow r_v - 1$).

First, the elements of the set ($1_v \rightarrow r_v - 1$) are lined such that the inclusion relation becomes larger from left to right on the horizontal line. One temporary coordinate point (Start, End) is then arranged each on the right side and the left side of the rightmost coordinate point. The length from the leftmost temporary coordinate point Start to the rightmost temporary coordinate point End becomes $L_v = r_v - 1_v + 1$. Furthermore, the integer x ($1 \leq x \leq k$) satisfying $n^{(x-1)/k} < L_v \leq n^{x/k}$ is calculated (S150). This process is mainly executed by the coordinate axis setting unit 106.

The following operation is performed while moving the counter i from 0 to x−1. Starting from the temporary starting point Start, jump is continuously made from such coordinate point to the coordinate point spaced apart by $n^{i/k}$ until reaching the temporary coordinate point End or when the next jump exceeds the temporary coordinate point End. The directional branch corresponding to each jump is thereafter generated (S152). All the directional branches reaching the temporary coordinate points are then erased (S154). If a plurality of directional branches reaches a certain coordinate point T, the directional branches other than the directional branch having the longest jump distance are erased (S156). This process is mainly executed by the temporary digraph generation unit 308.

(Details of S142)

First, the step (S160) of extracting the longest directional path LP will be described in detail with reference to FIG. 32. The following two notations are introduced.

DD$_T$: Number of directional branches of the longest directional path LP

J(a,b): a directional branches of length b exist continuously

First, $t = n^{1/k} - 1$. The directional path P([1,1], [1,n]) from the coordinate point [1,1] to the coordinate point [1,n] of the temporary digraph I' (1→n) is then considered. The directional path P([1,1], [1,n]) is expressed as J(t,1), J(t,$n^{1/k}$), ..., J(t,$n^{(k-2)/k}$), J(t−1,$n^{(k-1)/k}$), J(t,$n^{(k-2)/k}$), ..., J(t,$n^{1/k}$), J(t+1,1). This directional path is referred to as longest directional path LP. The number of directional branches DD$_T$ of the longest directional path LP becomes DD$_T$=(2k−1)*($n^{1/k}$−1). An active mark is set on all the directional branches configuring the longest directional path LP (S160).

(Details of S144)

The processes (S162 to S176) of extracting the directional path PLP of longest length for the temporary digraph I' corresponding to all the subsets other than the temporary digraph I' containing the longest directional path LP will be described below with reference to FIG. 33. The following two notations are introduced.

CP (Current Path): Directional path in reference (current path)

JP(CP): number of directional branches of current path

A current path CP from the starting point to the ending point of the digraph I' is first determined. If the current path is contained in the digraph I' (a→b) in this case, the directional path P([a,a], [a,b]) is the current path CP, and if contained in the digraph I' (a←b), the directional path P([b,b], [b,a]) is the current path CP (S162). The directional branch of longest length of the directional branches configuring the current path CP is selected, and the length thereof is set as J (S164). Whether or not J≦1 is judged (S166).

If J≦1, the current path CP is determined as the directional path PLP of longest length, and the active mark is set to all the directional branches contained in the current path CP (S176). If J>1, whether or not #JP(CP)+t≦DD$_T$ is judged (S168). If not #JP(CP)+t≦DD$_T$, the current path CP is determined as the directional path PLP, and the active mark is set to all the directional branches contained in the current path (S176). If #JP(CP)+t≦DD$_T$, a natural number j satisfying J=$n^{j/k}$ is calculated (S170).

The directional branch most distant from the stating point of the current path CP in the directional branches having length J contained in the current path CP is extracted (S172). One directional branch having a length of $n^{(j-1)/k}$ is added immediately after the t directional branches having length $n^{(j-1)/k}$ extending from the starting point of the directional branch extracted in step S172, the directional branch extracted in step S172 is removed (S174), and the process is returned to step S162 to repeatedly execute the above processes.

A loop process between step S162 and step S174 is terminated when all the directional paths from the starting point to the ending point of the digraph I' are configured by directional branches having length of one, or when the number of directional branches configuring the directional path exceeds DD$_T$ through execution of the replacement of greater number of directional branches.

(Details of S146)

The processes (S180 to S202) of replacing the directional branch contained in the temporary digraph I' with the short directional branch will be described in detail below with reference to FIG. 34.

First, the directional branch in which the length J' is the longest is extracted from the active and non-performed (without done mark) directional branches in the graph. If the maximum directional branch exists in plurals, the directional branch most distant from the starting point of the temporary digraph I' is selected (S180). The selected directional branch is referred to as WJ (Working Jump). The starting point of the directional branch WJ is WJ$_S$ and the ending point is WJ$_E$. The number of directional branches contained in the directional path from the starting point of the temporary digraph I' to the WJ$_S$ is noted as D.

Whether the length J' of the directional branch is J'≦1 is judged (S182). If J'≦1, all the directional branches without the active mark are erased, and a collection of all the directional branches with the active mark are set as E(I(a→b)) or E(I(a←b)) (S202). On the other hand, if not J'≦1, the directional path from WJ$_S$ to WJ$_E$−1 is set as the current path CP (S184). Here, WJ$_E$−1 represents the element one before WJ$_E$.

The directional branch of longest length is selected from the directional branches contained in the current path CP, and the length thereof is set as J (S186). Whether or not the length J of the directional branch is J≦1 is judged (S188). If J≦1, the active mark is given to all the directional branches contained in the current path CP (S198). The done mark is given to the WJ (S200), and the process is returned to the process of step S180. If not J≦1, whether or not #JP(CP)+t≦DD$_T$−D is judged (S 190). If not #JP(CP)+t≦DD$_T$−D, the process is returned to step S180 after the processes of steps S198 and S200. If #JP(CP)+t≦DD$_T$–D, j satisfying J=n$^{j/k}$ is calculated (S192).

If the directional branch having length J contained in the current path CP exists in plural, the directional branch at a position most distant from the starting point of the current path CP is extracted (S194). One directional branch having a length of n$^{(j-1)/k}$ is added immediately after the n$^{1/k}$–1 directional branches having length of n$^{(j-1)/k}$ extending from the starting point of the directional branch extracted in step S194, and the directional branch extracted in step S194 is erased (S196). The process then returns to the process of step S184.

A loop process between step S184 and step S196 is terminated when all the directional paths from the WJ$_S$ to the WJ$_E$–1 are configured by directional branches having length of one, or when the number of directional branches contained in the directional path from the WJ$_S$ to the WJ$_E$–1 exceeds DD$_T$ through replacement of greater number of directional branches. The loop process between steps S180 and S200 is terminated at the point the directional branches not set with done and having a length of greater than or equal to two are all eliminated from the directional branches contained in the temporary digraph I'.

The generation method of the digraph I according to the present embodiment has been described above.

[Function Configuration of Terminal Device 322]

Figure 35:
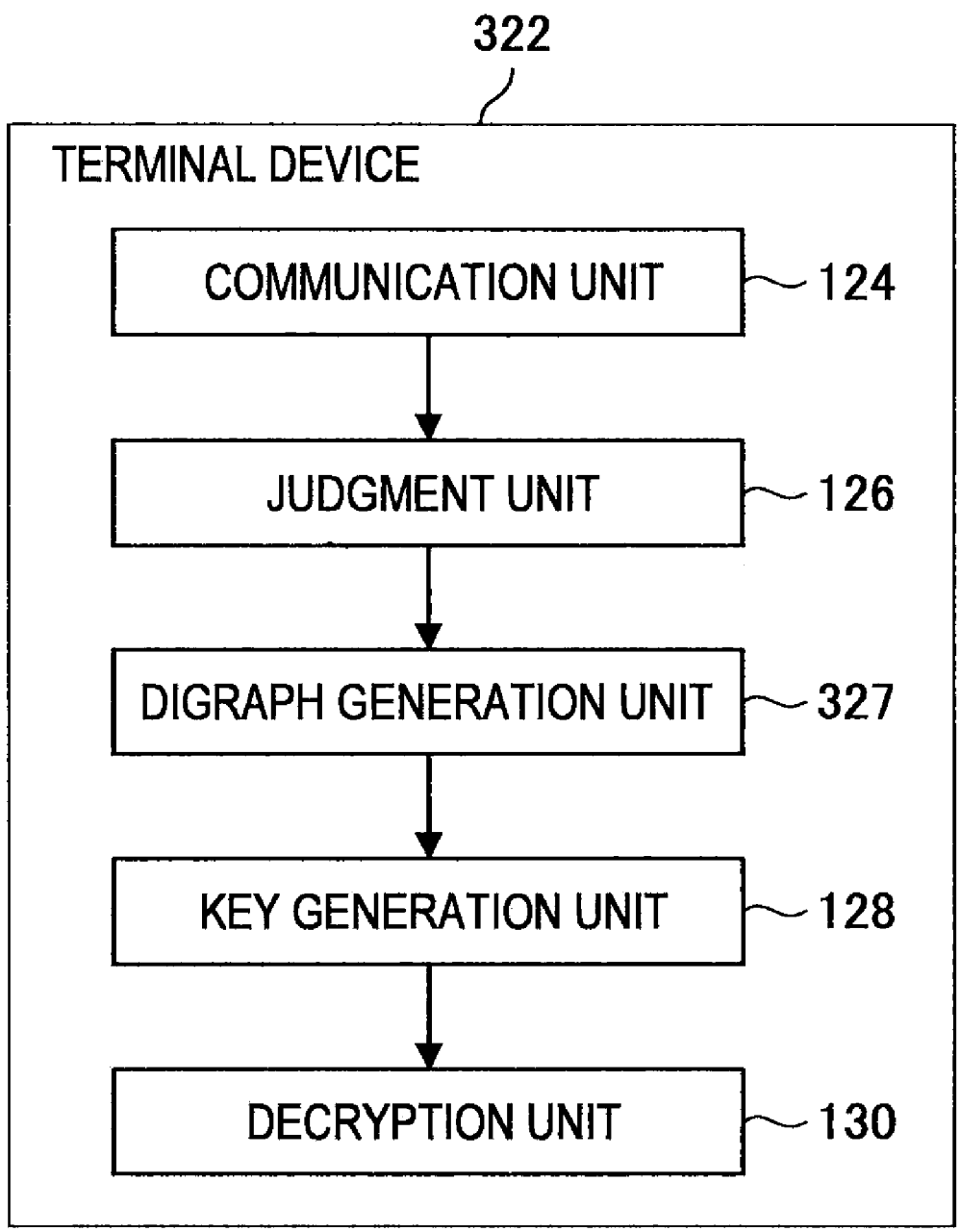
FIG. 35 is an explanatory view showing a function configuration of a terminal device according to the embodiment.

The function configuration of the terminal device 322 according to the present embodiment will now be described with reference to FIG. 35. FIG. 35 is an explanatory view showing the function configuration of the terminal device 322.

As shown in FIG. 35, the terminal device 322 is mainly configured by the communication unit 124, the judgment unit 126, a digraph generation unit 327, the key generation unit 128, and the decryption unit 130. The characteristic configuration of the present embodiment mainly lies on the digraph generation unit 327, and other components are substantially the same as the components of the terminal device 122 according to the first embodiment. Therefore, only the function configuration of the digraph generation unit 327 will be described in detail.

(Digraph Generation Unit 327)

The function configuration of the digraph generation unit 327 will be described first. The digraph generation unit 327 has a function of generating only the directional path for deriving the set key of the subset to which it belongs in the digraphs I used by the key distribution server 302 to derive the set key. That is, the digraph generation unit 327 can generate the digraph G configured only by the directional path enabling the necessary set key to be derived.

(Generation Method of Digraph G)

Figure 38:
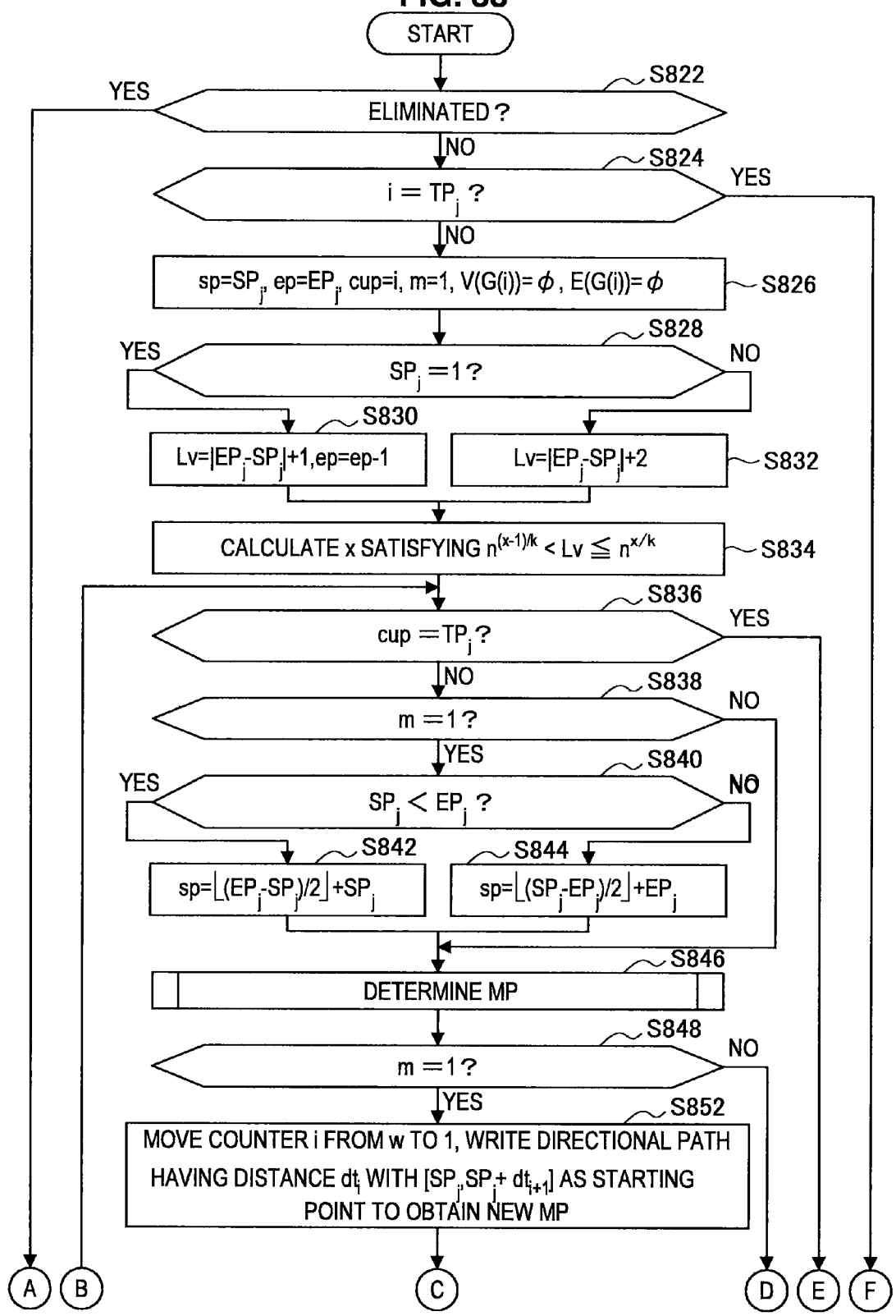
FIG. 38 is an explanatory view showing a flow of graph generation method according to the embodiment.
Figure 39:
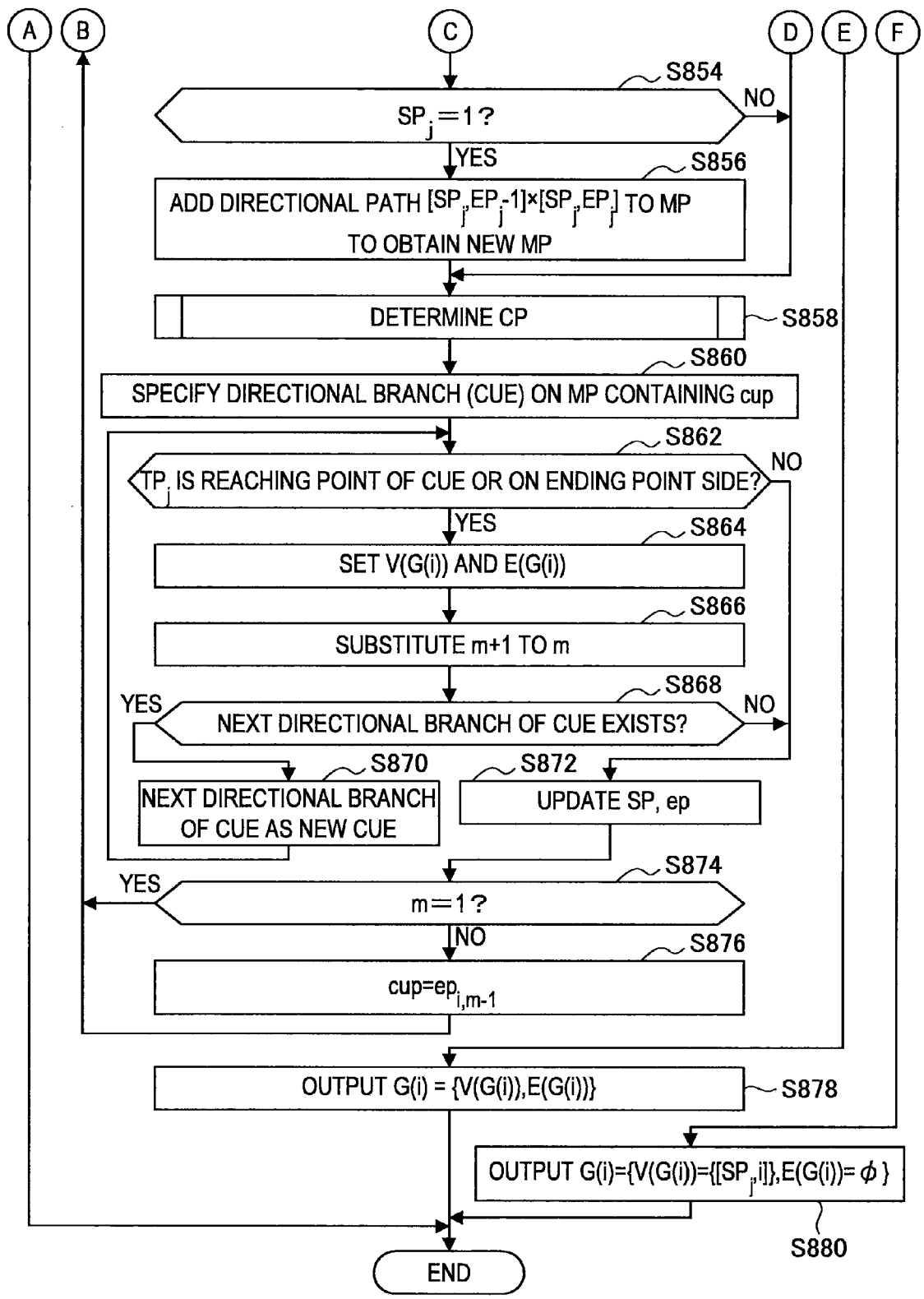
FIG. 39 is an explanatory view showing a flow of graph generation method according to the embodiment.

The generation method of the digraph G will be described in detail with reference to FIG. 38 and FIG. 39. FIG. 38 and FIG. 39 are explanatory views showing a flow of process for generating the digraph G for the contractor i to derive the set key k(S$_j$) of the subset S$_j$ to which the contractor belongs.

Each symbol of A, B, C, D, E, F described at the lowermost stage of FIG. 38 and the uppermost stage of FIG. 39 is a symbol for clearly indicating the moving destination in the transition of processes of FIG. 38 and FIG. 39. For instance, the steps to reach A of FIG. 38 are assumed to have reached A of FIG. 39.

The terminal device 322 holds, in advance, the information of the number of contractor n and the parameter k. The digraph G is configured by the set V(G(i)) of coordinate points and the set E(G(i)) of directional branches, and is expressed as G(i)={V(G(i),E(G(i))}. If the coordinate point contained in the digraph G(i) is one, the set E(G(i)) of directional branches is expressed as E(G(i))=ϕ (symbol ϕ is empty set). [a,b]×[a,c] represents the directional branch in which the coordinate point of the starting end is [a,b] and the coordinate point of the terminating end is [a,c]. For the sake of convenience of the explanation, the information of equation (22) is assumed to be acquired from the key distribution server 102.

[Equation 19]

$$sgi=\{\{S_1=[SP_1,TP_1],EP_1\},\ldots,\{S_y=[SP_y,TP_y],EP_y\}\},$$

$$h=\{E_{k(S_1)}(s),\ldots,E_{k(S_y)}(s)\}$$

$$E_s(M) \qquad (22)$$

As shown in FIG. 38, whether or not the subset S$_j$(j∈S$_j$) in which it (contractor i) is included exists in the information sgi related to the subset of the permitted contractor acquired by the communication unit 124 is judged (S822). If the subset S$_j$ exists, the process proceeds to step S824. If the subset S$_j$ does not exist, the generation process of the digraph G is terminated assuming that the contractor is eliminated (no authority to acquire content). The process of step S822 is mainly executed by the judgment unit 126.

The digraph generation unit 327 then judges whether or not the number i of the contractor matches TP$_j$ (S824). If i=TP$_j$, the digraph G(i)={V(G(i),E(G(i))} to be generated when the contractor i derives the set key is output as V(G(i))= {[SP$_j$,i]},E(G(i))=ϕ (S880), and the generation process of the digraph G is terminated. If not i=TP$_j$, the process proceeds to step S826.

The digraph generation unit 327 initializes the coordinate cup of the current position of the contractor i, the coordinate sp of the starting point and the coordinate ep of the ending point of the range currently being considered, the counter m, the counter z, the number dd$_T$ of directional branches in the current path, the set V(G(i)) of coordinate points, and the set E(G(i)) of directional branches in the following manner (S826).

sp=SP$_j$, ep=EP$_j$, cup=i, m=1, z=0, dd$_T$=DD$_T$=(2k–1)* (n$^{1/k}$–1), V(G(i))=ϕ, E(G(i))=ϕ. Here, j represents the index j of the subset S$_j$ satisfying i∈S$_j$.

The digraph generation unit 327 then judges whether or not SP$_j$=1 (S828). The process proceeds to step S830 if SP$_j$=1. The digraph generation unit 327 then calculates L$_v$=|EP$_j$–SP$_j$|+1, and substitutes ep–1 to ep (S830), and then proceeds to step S834. If not SP$_j$=1, the process proceeds to step S832. The digraph generation unit 327 calculates L$_v$=|EP$_j$–SP$_j$|+2 (S832), and then proceeds to step S834.

The digraph generation unit 327 calculates x (1≦x≦k) satisfying n$^{(x-1)/k}$<L$_v$≦n$^{x/k}$ (S834). The digraph generation unit 327 judges whether or not cup=TP$_j$ (S836). If cup=TP$_j$, the process proceeds to step S878. The digraph G{V(G(i)),E (G(i))} used by the contractor i to derive the key of the subset is output (S878), and the generation process of the digraph G is terminated.

If not cup=TP$_j$, the process proceeds to step S838. The digraph generation unit 327 then judges whether or not z=0 (S838). If z=0, the process proceeds to step S840. If not z=0, the process proceeds to step S846, and the maximum directional path (MP; MaxPath) in which the number of jumps reaching ep from sp becomes a minimum is determined (S846). This process will be hereinafter described.

The digraph generation unit 327 then judges whether or not SP$_j$<EP$_j$ (S840). If SP$_j$<EP$_j$, the process proceeds to step S842. Here, sp is set as in equation (23) (S842), and the process proceeds to step S846. If not SP$_j$<EP$_j$, the process proceeds to step S844. Here, sp is set as in equation (24) (S844), and the process proceeds to step S846.

[Equation 20]

$$sp = \left\lfloor \frac{EP_j - SP_j}{2} \right\rfloor + SP_j \quad (23)$$

$$sp = \left\lfloor \frac{SP_j - EP_j}{2} \right\rfloor + EP_j \quad (24)$$

The digraph generation unit 327 then determines the directional path in which the number of jumps becomes a minimum as the MP (MaxPath) of the directional paths from sp to ep so as to match one part of the digraph I in the AI06(A) system (S846). The process for determining the MP will be hereinafter described.

The digraph generation unit 327 then judges whether or not z=0 (S848). If not z=0, the process proceeds to step S858. If z=0, the process proceeds to step S852. With the number of directional branches on the MP as w, and the directional branch having [$SP_j$,sp] as the starting end as the first directional branch, the distance of the $i^{th}$ directional branch on the MP is defined as $dt_i$. Here, $dt_{w+1}$=0. With [$SP_j$,$SP_j$] as the starting point, the jump of distance $dt_i$ is executed while moving the counter i from w to 1, and the directional branch corresponding thereto is generated. In this case, it is to be noted that the reaching point in the $i^{th}$ jump is the departure point of the i–$1^{th}$ jump. Furthermore, the MP determined in step S846 and the directional branch generated here (S852) are set as the new MP, and z=1, sp=$SP_j$, ep=$EP_j$ (S852).

The digraph generation unit 327 then judges whether or not $SP_j$=1 (S854). If not $SP_j$=1, the process proceeds to step S858. If $SP_j$=1, the process proceeds to step S856. The digraph generation unit 327 then adds the directional branch [$SP_j$, $EP_j$–1]×[$SP_j$,$EP_j$] on the MP to obtain a new MP (S856).

The digraph generation unit 327 determines the CP in which the directional branch on the MP that matches part of the digraph I of the A06(A) system is replaced with the directional branch of as short as possible distance in a range not exceeding the $dd_T$ (S858). The determination process of the CP will be hereinafter described.

The digraph generation unit 327 specifies the directional branch in which the coordinate point [$SP_j$,cup] is contained between the starting end and the terminating end of each directional branch existing on the CP (S860). However, a case where the coordinate point of the starting end or the terminating end and the coordinate point [$SP_j$,cup] match is also included. The specified directional branch is called the CUE (Current User's Edge). If the coordinate point [$SP_j$,cup] exists on the CP and the coordinate point [$SP_j$,cup] matches the starting end and the terminating end of the two adjacent directional branches, the directional branch having the coordinate point [$SP_j$,cup] as the starting point is assumed as CUE. On the CP, the number of directional branches existing from [$SP_j$,cup] to the starting point of the CUE is d, and $dd_T$–d is substituted to $dd_T$.

The digraph generation unit 327 proceeds to step S872 if the coordinate point [$SP_j$,$TP_j$] does not match the terminating end of the CUE and is not closer to the ending point side of the digraph I than the terminating end of the CUE. The process proceeds to step S864 if the coordinate point [$SP_j$,$TP_j$] matches the terminating end of the CUE or is closer to the ending point side of the digraph I than the terminating end of the CUE (S862).

The digraph generation unit 327 then sets V(G(i)) and E(G(i)) as below (S864).

If V(G(i))=φ, V(G(i))=[$SP_j$,$sp_{i,m}$]∪[$SP_j$,$ep_{i,m}$]. If not V(G(i))=φ, V(G(i))=V(G(i))∪[$SP_j$,$ep_{i,m}$]. Furthermore, E(G(i))= E(G(i))∪{[$SP_j$,$sp_{i,m}$]×[$SP_j$,$ep_{i,m}$]}.

Here, $sp_{i,m}$, $ep_{i,m}$ represent the coordinates of the starting end and the terminating end of the current CUE. The process differs for when V(G(i))=φ and when not V(G(i))=φ for the following reasons. If V(G(i))=φ, both the starting end and the terminating end of the directional branch are to be added as the coordinate points, but if not V(G(i))=φ, the starting end of the directional branch to be added is already added as the coordinate point of the V(G(i)) and thus only the coordinate point for the terminating end is added to V(G(i)) to avoid redundancy.

The digraph generation unit 327 substitutes m+1 to m (S866). The digraph generation unit 327 judges whether or not the next directional branch (directional branch having the terminating end of the CUE as the starting end) of the CUE exists on the CP (S868). If the next directional branch of the CUE exists, the process proceeds to step S870, the next directional branch of the CUE existing on the CP is set as the new CUE, and the process is returned to the process of step S862. If the next directional branch of the CUE does not exist, the process proceeds to step S872.

The digraph generation unit 327 then sets the coordinate of the starting end of the CUE to the sp, and sets the coordinate of the coordinate point positioned one before the terminating end of the CUE to the ep, where the number of directional branches existing from the starting point of the CP to the starting end of the CUE is d, and $dd_T$–d is substituted to $dd_T$ (S872). The digraph generation unit 327 then judges whether or not m=1 (S874). If m=1, the process returns to the process of step S862. If not m=1, the process proceeds to step S876.

The digraph generation unit 327 sets cup=$ep_{i,(m-1)}$ (S876), and returns to the process of step S836.

The generation method of the digraph G according to the present embodiment has been described. In the above-described generation method, assumption is made that the information $EP_j$ related to the ending point of the digraph I is contained in the sgi, but the contractor may specify the $EP_j$ as the $EP_j$ can be uniquely specified by the logical binary tree BT once $SP_j$ is determined. Such configuration is realized by adding the step of deriving the $EP_j$ to the process of step S826.

(Determination Method of Maximum Directional Path MP)

Figure 40:
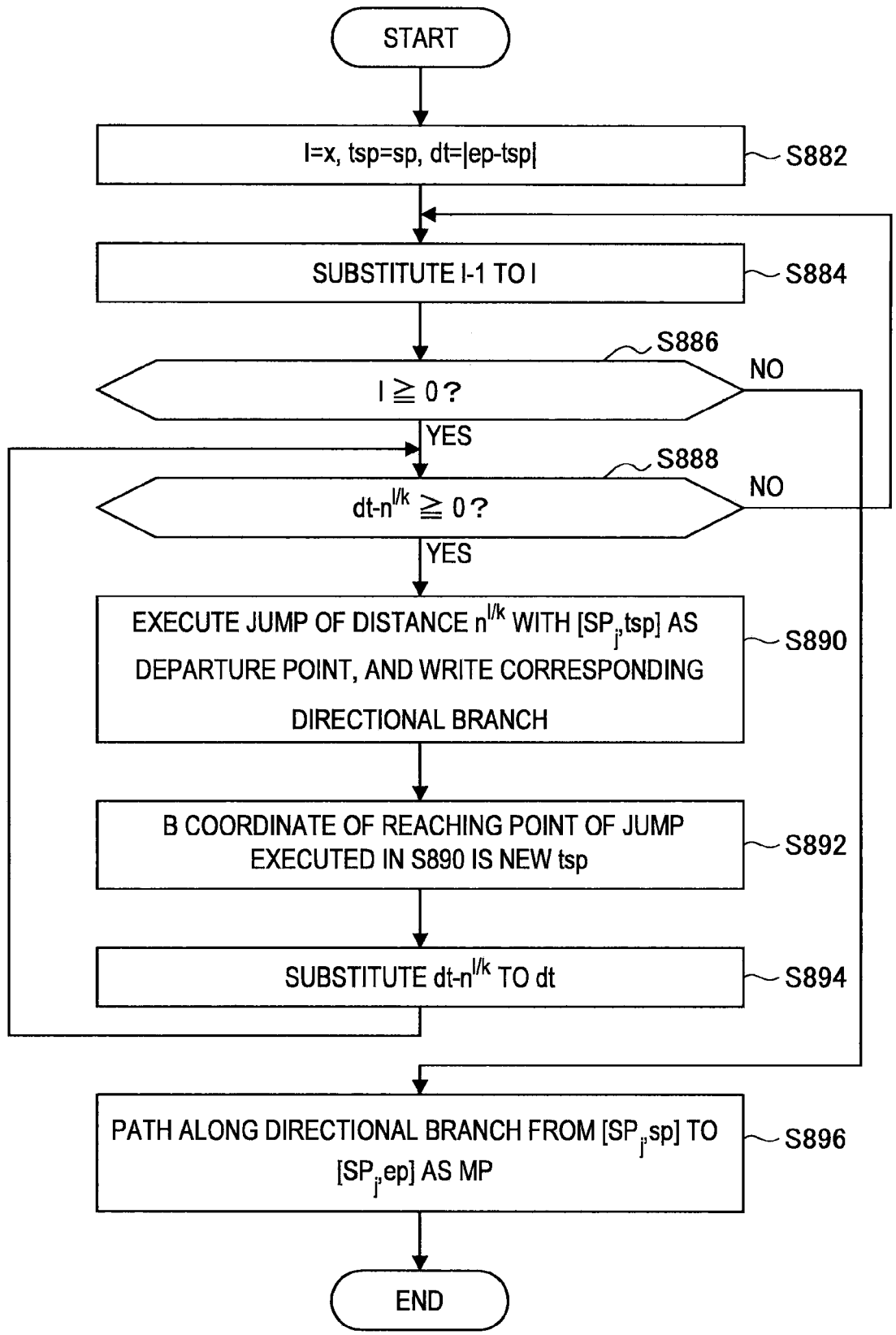
FIG. 40 is an explanatory view showing a flow of graph generation method according to the embodiment.

The determination method of the maximum directional path MP in step S846 of FIG. 38 will now be described with reference to FIG. 40. FIG. 40 is an explanatory view showing a flow of determination process of the maximum directional path MP.

As shown in FIG. 40, the digraph generation unit 327 first initializes the counter 1, the coordinate tsp of the reaching point of the jump currently being considered, and the distance dt currently being considered as below (S882). l=x, tsp=sp, dt=|ep−tsp|.

The digraph generation unit 327 then substitutes l−1 to l (S884). The digraph generation unit 327 judges whether or not l≧0 (S886). If not l≧0, the process proceeds to step S896, sets the directional path formed by a chain of at least one directional branch from the coordinate point [$SP_j$,sp] to the [$SP_j$,ep] as MP (S896), and terminates the determination process of the MP. If l≧0, the process proceeds to step S888.

The digraph generation unit 327 then judges whether or not dt−$n^{1/k}$≧0 (S888). If not dt−$n^{1/k}$≧0 the process returns to the process of step S884. If dt−$n^{1/k}$≧0, the process proceeds to step S890.

The digraph generation unit 327 executes a jump of distance $n^{1/k}$ with [$SP_j$,tsp] as the departure point, and generates the corresponding directional branch (S890). The digraph generation unit 327 then newly sets the coordinate of the terminating end of the directional branch generated in step S890 as tsp (S892). The digraph generation unit 327 then substitutes dt−$n^{1/k}$ to dt (S894), and returns to the process of step S888.

The determination method of the maximum directional path MP has been described above.

(Determination Method of Current Path CP)

Figure 41:
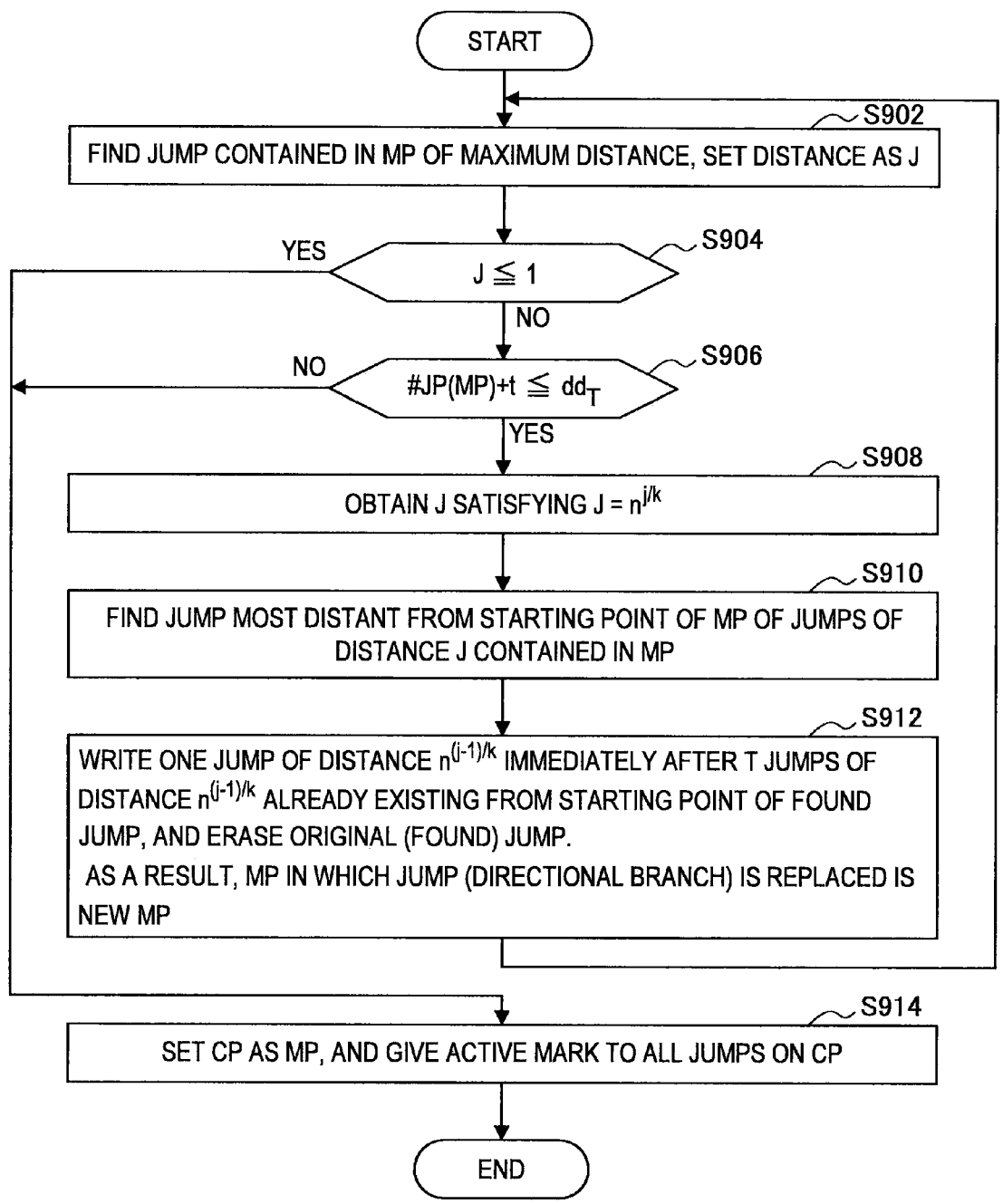
FIG. 41 is an explanatory view showing a flow of graph generation method according to the embodiment.

The determination method of the current path CP will now be described with reference to FIG. 41. FIG. 41 is an explanatory view showing a flow of determination process of the CP.

As shown in FIG. 41, the digraph generation unit 327 extracts the directional branch in which the distance is a maximum of the directional branches contained in the MP, and sets the distance as J (S902). The digraph generation unit 327 then judges whether or not J≦1 (S904). If J≦1, the process proceeds to step S914, the directional path from the coordinate point [$SP_j$,sp] to [$SP_j$,ep] is determined as the CP (S914), and the determination process of the CP is terminated. If not J≦1, the process proceeds to step S906.

The digraph generation unit 327 then judges whether or not #JP(MP)+t≧$dd_T$ (S906). If #JP(MP)+t≧$dd_T$, the process proceeds to step S908. If not #JP(MP)+t≧$dd_T$, the process proceeds to step S914, and the directional path from the coordinate point [$SP_j$,sp] to [$SP_j$,ep] is determined as the CP (S914), and the determination process of the CP is terminated.

The digraph generation unit 327 then obtains j satisfying J=$n^{j/k}$ (S908). The digraph generation unit 327 extracts the directional branch at a position most distant from the stating point of the MP of the directional branches having distance J contained in the MP (S910). The directional branch having a distance of $n^{(j-1)/k}$ is generated immediately after the t existing directional branches having distance $n^{(j-1)/k}$ from the starting point of the directional branch extracted in step S910, and the directional branch extracted in step S910 is erased. The MP in which the directional branch is replaced is set as the new MP (S912), and the process is returned to the process of step S902.

The determination method of the current path CP has been described above. The generation process of the digraph G can be carried out according to the determination process described above.

(Specific Example)

Figure 36:
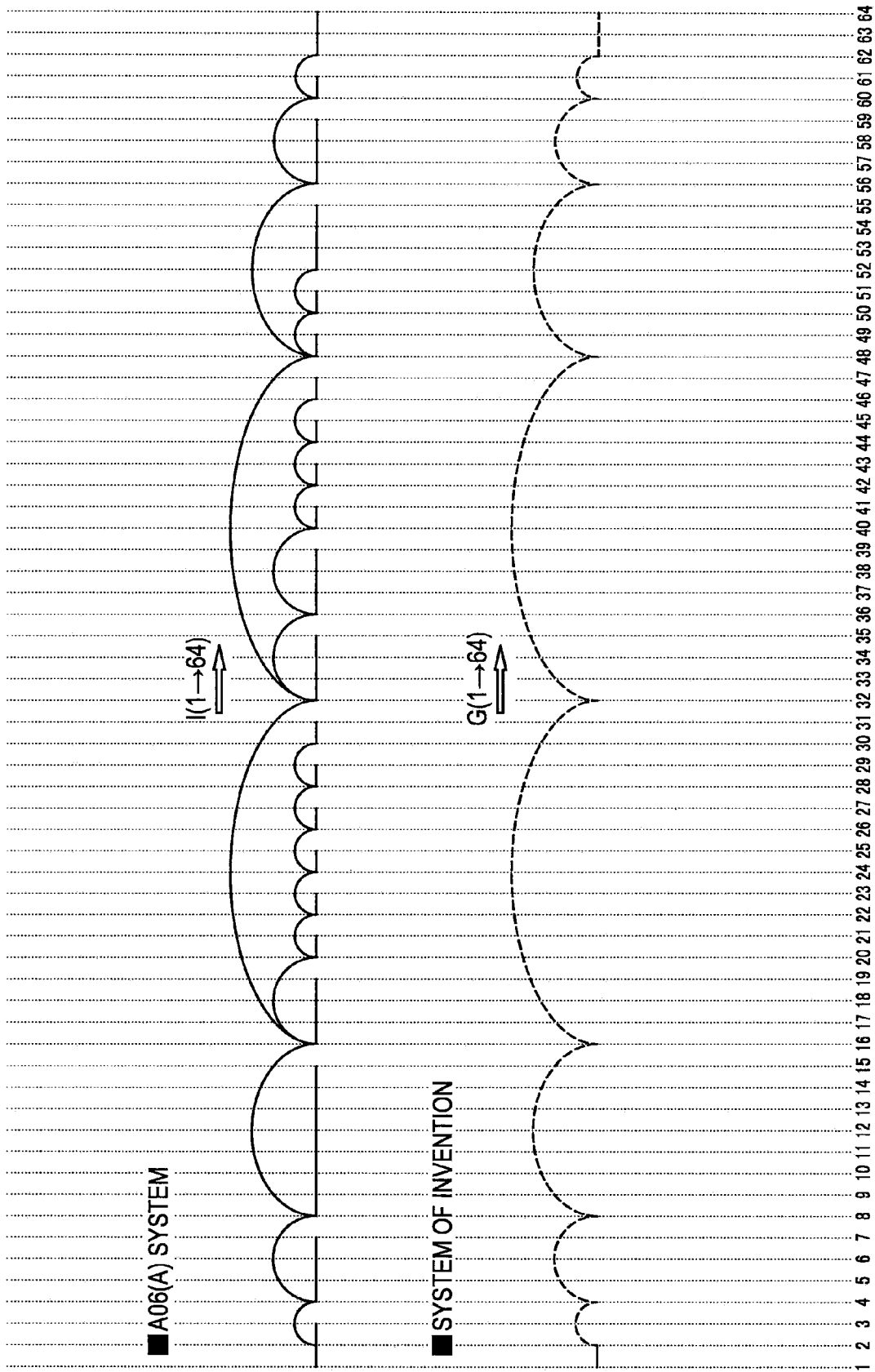
FIG. 36 is an explanatory view showing a digraph G according to the embodiment.
Figure 37:
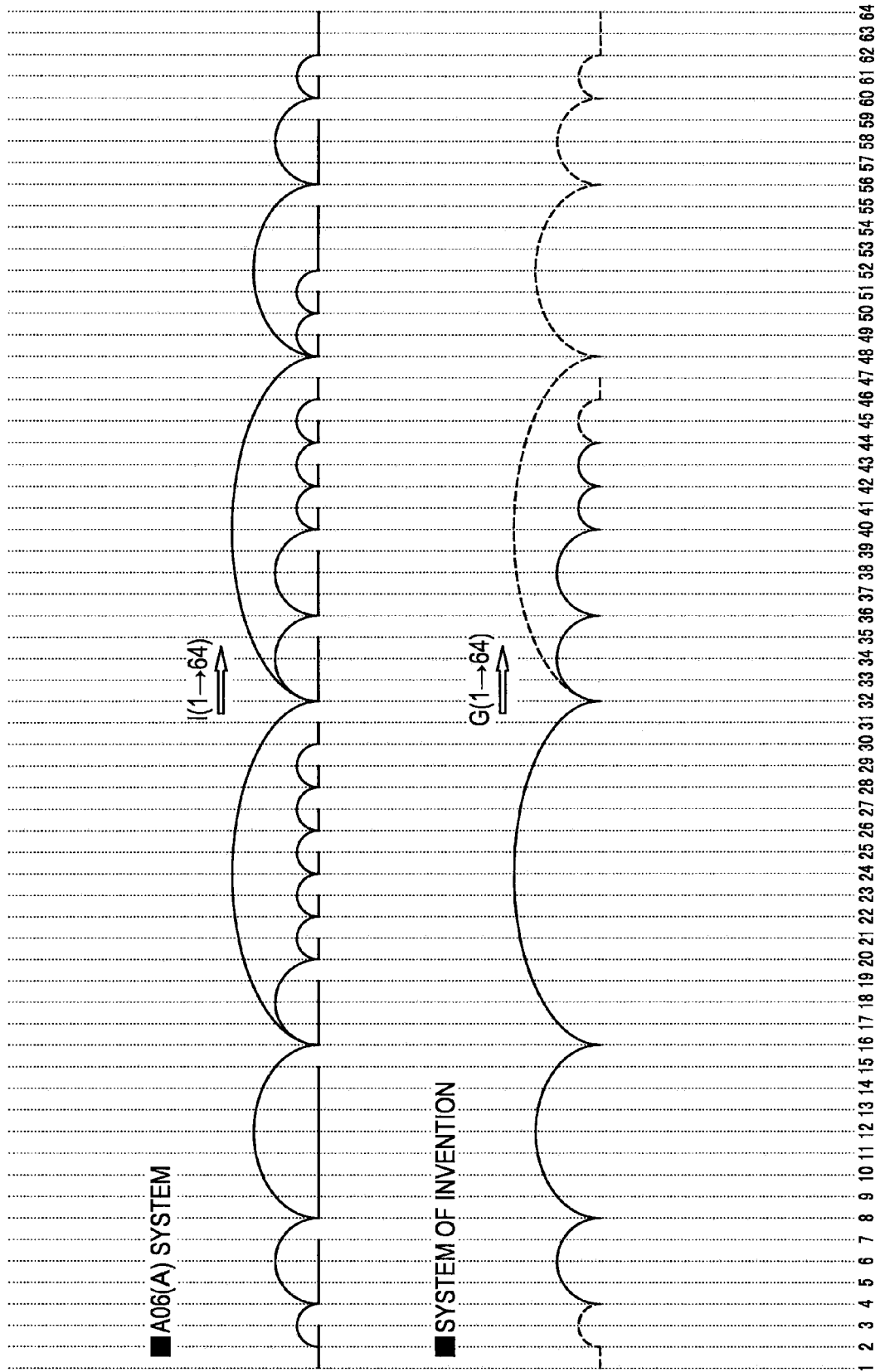
FIG. 37 is an explanatory view showing a digraph G according to the embodiment.

The specific example of the digraph G generated by the digraph generation unit 327 based on the above-described generation method will be described with reference to FIG. 36 and FIG. 37. FIG. 36 and FIG. 37 are explanatory views showing a digraph G generated when the number of contractor is n=64, and the parameter is k=6. In particular, only the digraph corresponding to the set (1→64) is shown. The diagrams drawn on the upper side of FIG. 36 and FIG. 37 are the digraph I derived by the contractor when the algorithm of the AI06(A) system is used. The diagrams drawn on the lower side are the digraph G derived by the contractor when the algorithm of the present embodiment is used.

(Specific Example 1)

First, the digraph G generated for the contractor 1 to derive the set key of the subset [1,2] is shown with reference to FIG. 36. The solid line in the figure shows the directional branch to be eventually derived when the contractor 1 derives the set key. That is, when deriving the set key of the subset [1,2], the contractor 1 inputs the intermediate key t([1,1]) corresponding to the starting end of the directional branch shown with a solid line to the PRSG, and derives the t([1,2]) corresponding to the terminating end thereof. Furthermore, the digraph G configured by the solid line and the broken line represents the maximum directional path CP to be derived by the contractor 1.

(Specific Example 2)

The digraph G generated for the contractor 7 to generate the set key of the subset [1,44] is shown with reference to FIG. 37. The solid line in the figure shows the directional branch corresponding to the jump to be eventually derived when the contractor 7 derives the set key. That is, when deriving the set key of the subset [1,44], the contractor 7 uses the intermediate key t([1,8]) it holds in advance and repeatedly executes the PRSG along the directional branch shown with a solid line to derive the intermediate key t([1,44]). Furthermore, the digraph G configured by the solid line and the broken line represents the maximum directional path CP to be derived by the contractor 7.

[Effect]

In the related art, each contractor holds all digraphs I corresponding to the subset to which it belongs or derives all digraphs I on its own. However, the present embodiment provides a means in which each contractor derives the digraph G configured only with the directional branch necessary when deriving the key of the digraphs I corresponding to the subset to which it belongs. Therefore, compared to the key distribution system of the related art, the number of directional branches to be calculated by each contractor greatly reduces, and each contractor can generate the digraph G and derive the desired set key at high speed. As a result, the time for decrypting the content can be greatly reduced.

<Fourth Embodiment>

The configuration of the key providing system 100 and the specific system related to the key distribution according to the fourth embodiment of the present invention will be described in detail below. The same reference numerals are denoted for the components substantially the same as the key providing system 100 according to the first embodiment to omit redundant description, and the differing components will be described in detail. The present embodiment has characteristics in that a terminal device includes a means for efficiently generating the digraph in the key providing system 100 of the A06(A+B) system.

[Characteristics of Fourth Embodiment]

The difference between the fourth embodiment and the first embodiment of the present invention will be briefly described. First, the greatest difference of the first embodiment and the present embodiment is the difference of the key distribution system to which the technique of the present invention is applied. The first embodiment is applicable to the AI05 system, whereas the present embodiment is applicable to the A06(A+B) system. Similar to the A06(B) system, the A06(A+B) system has characteristics in the configuration of generating the temporary digraph using longer directional branch, and then replacing the length of the directional branches configuring the digraph so as to become shorter under the condition of not exceeding the number of directional branches of the longest directional path in which the number of directional branches configuring the directional path becomes a maximum in the temporary digraph. That is, the A06(A+B) system reduces the amount of calculation for key generation and the number of keys to be held by each contractor compared to the AI05 system. However, similar to the AI05 system, the A06(B) system, and the A06(A) system, the information of the digraph to be held or calculated by each contractor is enormous, where a common issue arises in that it is difficult to realize in a general terminal device.

(Object of the Present Embodiment)

The object of the present embodiment is to provide a means for greatly reducing the calculation load on each contractor by generating only the information of the digraph required by each contractor in the key providing system 100 based on the digraph I of the A06(A+B) system.

[Configuration of Key Providing System 100]

A configuration of the key providing system 100 according to the present embodiment will be described. The basic system configuration is substantially the same as the configuration of the first embodiment shown in FIG. 1, and thus the detailed description will be omitted. The hardware configuration of a key distribution server 402 and a terminal device 422 arranged in the key providing system 100 according to the present embodiment is also substantially the same as the hardware configuration of the key distribution server 102 and the terminal device 122 shown in FIG. 2, and thus the detailed description thereof will be omitted.

[Function Configuration of Key Distribution Server 402]

Figure 42:
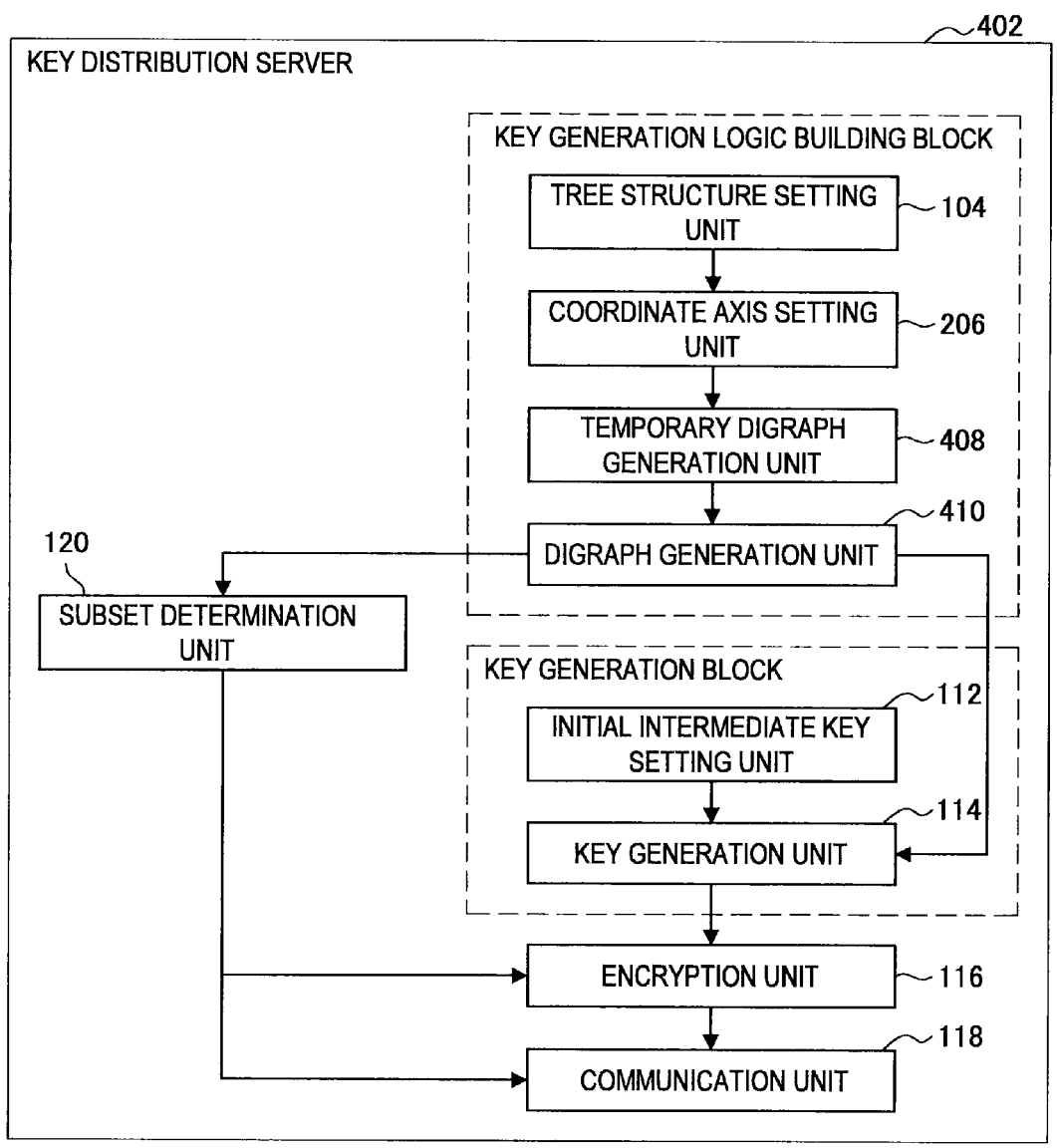
FIG. 42 is an explanatory view showing a configuration of a key distribution server according to a fourth embodiment of the present invention.
Figure 43:
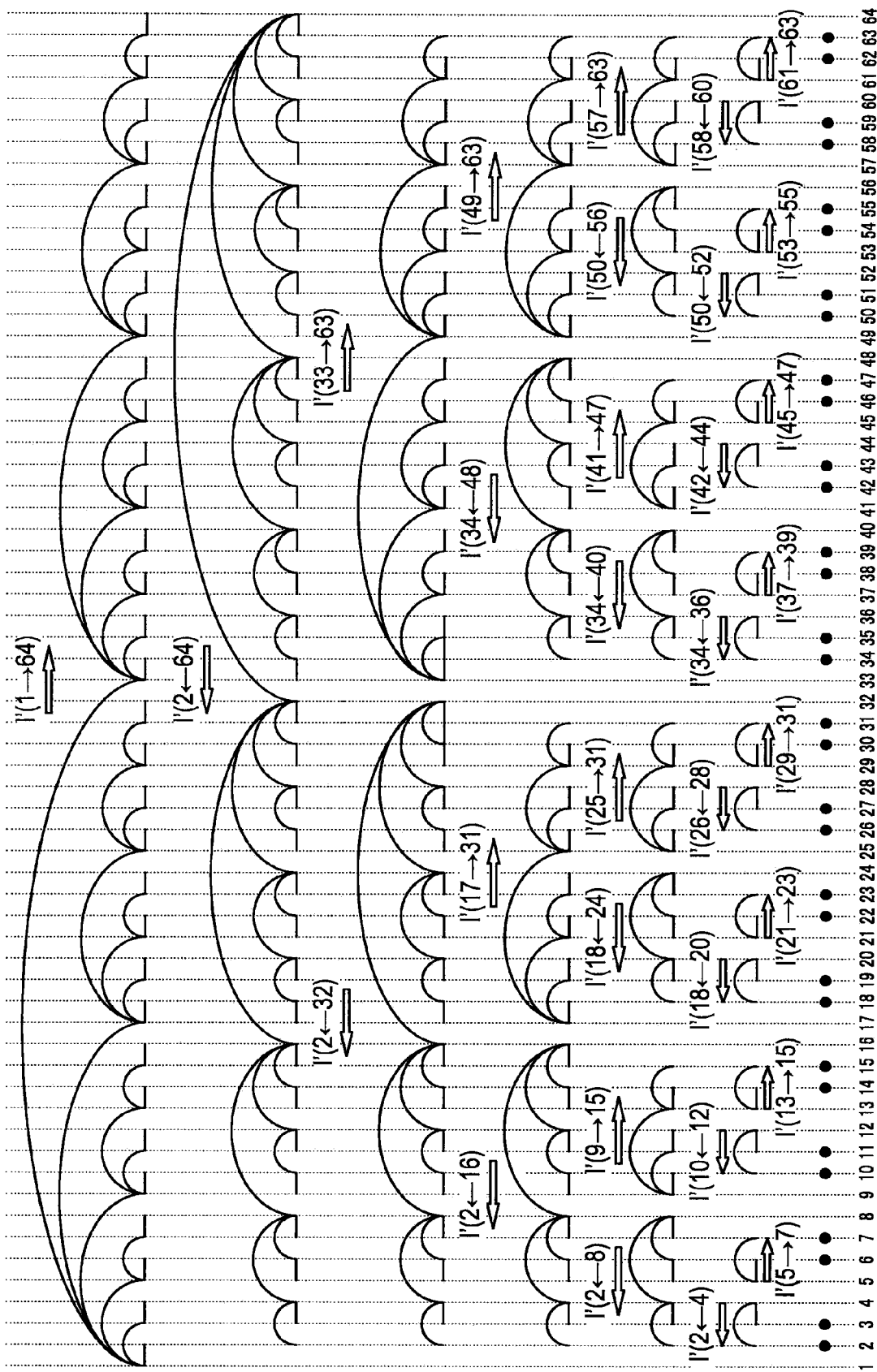
FIG. 43 is an explanatory view showing a temporary digraph I' according to the embodiment.

The function configuration of the key distribution server 402 according to the present embodiment will be described with reference to FIG. 42. FIG. 42 is an explanatory view showing a function configuration of the key distribution server 402.

As shown in FIG. 42, the key distribution server 402 is mainly configured by the tree structure setting unit 104, the coordinate axis setting unit 206, a temporary digraph generation unit 408, a digraph generation unit 410, the initial intermediate key setting unit 112, the key generation unit 114, the encryption unit 116, the communication unit 118, and the subset determination unit 120. The characteristic configuration of the present embodiment mainly lies in the temporary digraph generation unit 408 and the digraph generation unit 410, and other components are substantially the same as the components of the key distribution server 102 according to the first or the second embodiment. Therefore, only the function configuration of the temporary digraph generation unit 408 and the digraph generation unit 410 will be described in detail.

(Temporary Digraph Generation Unit 408)

Figure 44:
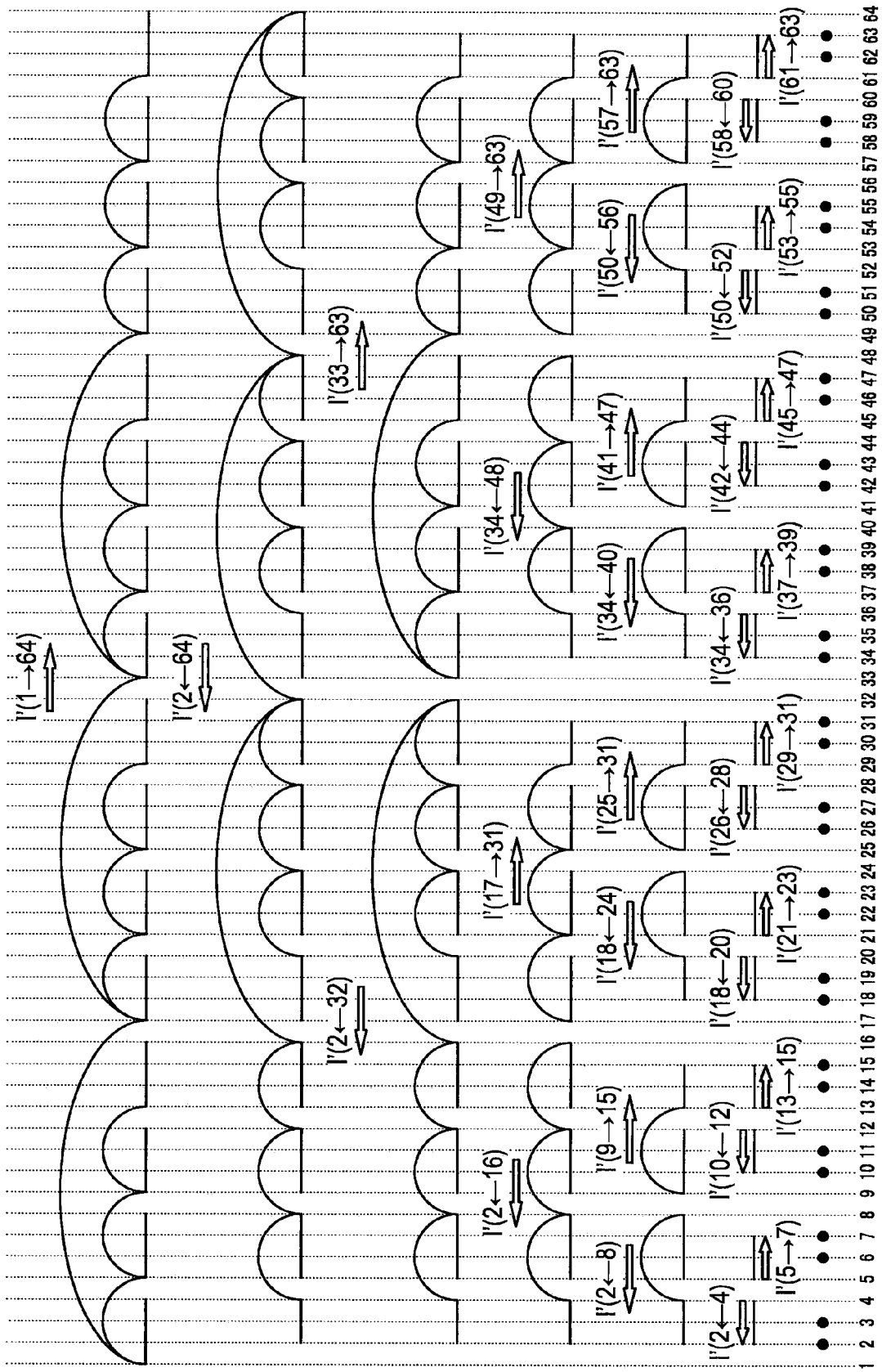
FIG. 44 is an explanatory view showing a temporary digraph I' according to the embodiment.

First, the function configuration of the temporary generation unit 408 will be described. The temporary generation unit 408 has substantially the same function configuration as the digraph generation unit 210 according to the second embodiment, and has a function of generating a temporary digraph I' having the same shape as the digraph I of the A06(B) system. For instance, in the case of n=64 and parameter k=6, the temporary digraph I' shown in FIG. 32 matches the digraph I shown in FIG. 20. Similarly, in the case of n=64 and parameter k=3, the temporary digraph I' shown in FIG. 44 matches the digraph I shown in FIG. 21.

(Digraph Generation Unit 410)

The function configuration of the digraph generation unit 410 will now be described. The digraph generation unit 410 has a function of generating the digraph I by replacing some of a plurality of directional branches configuring the temporary digraph I'. First, the digraph generation unit 410 selects the directional path in which the number of directional branches configuring the same is the maximum of the directional paths contained in the temporary digraph I'. Such directional path is referred to as the longest directional path LP (Longest Path). The digraph generation unit 310 generates the digraph I by replacing some of the directional paths contained in the temporary digraph I' with the directional paths configured by a chain of a plurality of shorter directional branches under the condition that the number of directional branches of all directional paths does not exceed the number of directional branches of the longest directional path LP.

(Generation Method of Digraph I)

Figure 45:
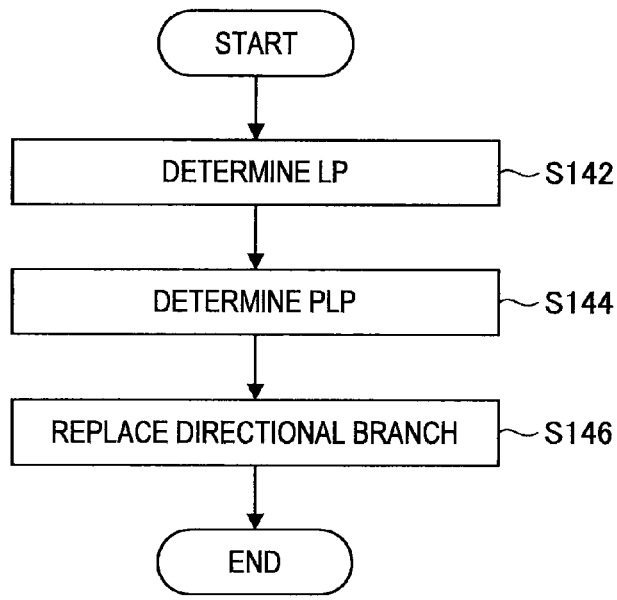
FIG. 45 is an explanatory view showing a flow of graph generation method according to the embodiment.
Figure 46:
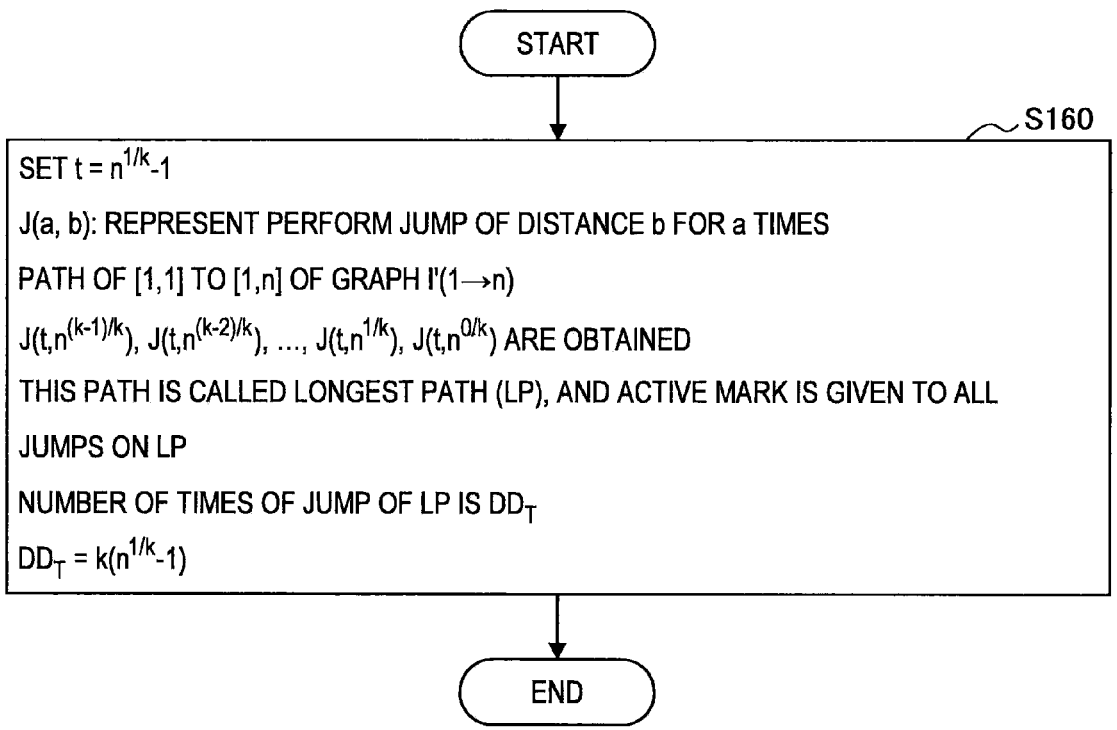
FIG. 46 is an explanatory view showing a flow of graph generation method according to the embodiment.
Figure 47:
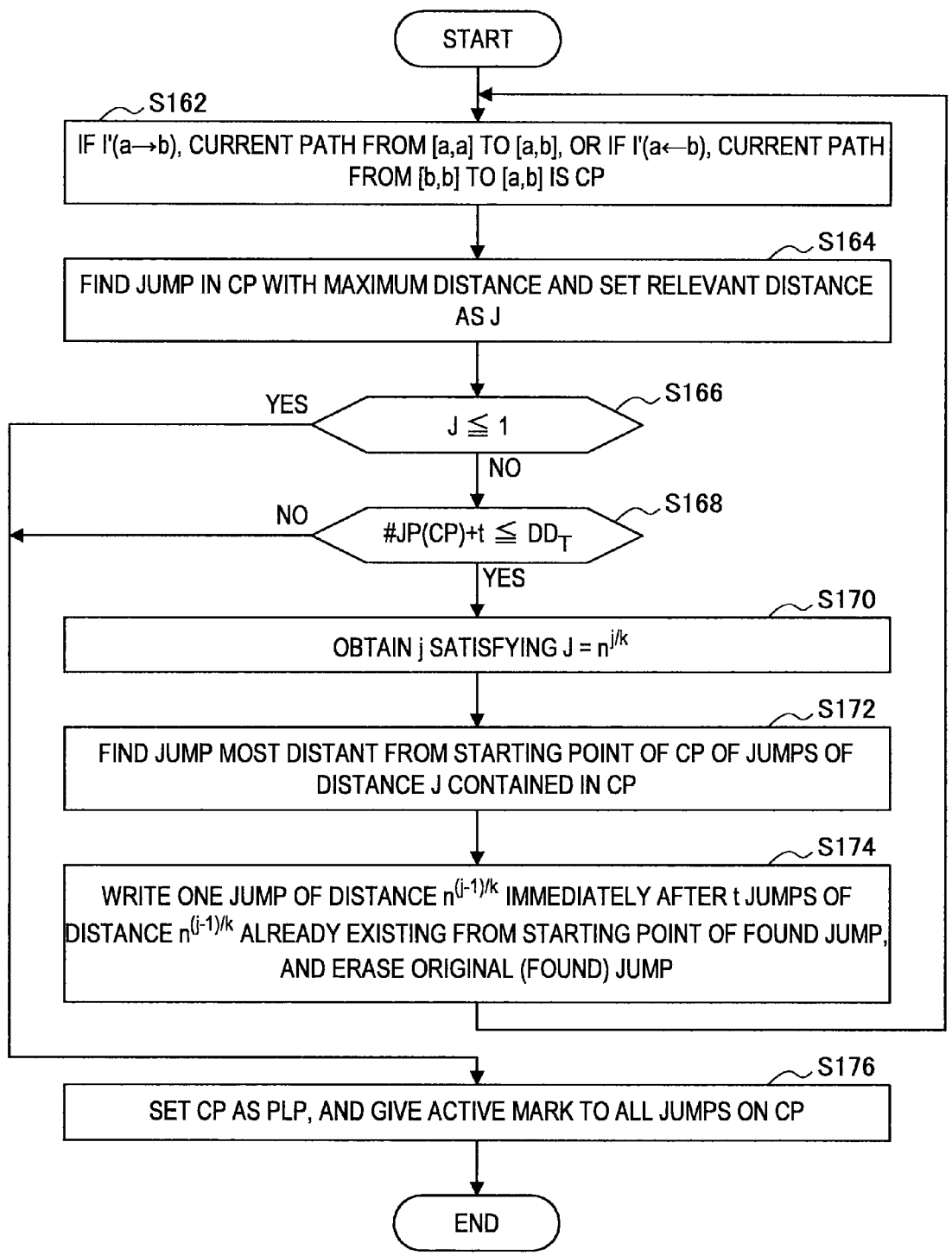
FIG. 47 is an explanatory view showing a flow of graph generation method according to the embodiment.
Figure 48:
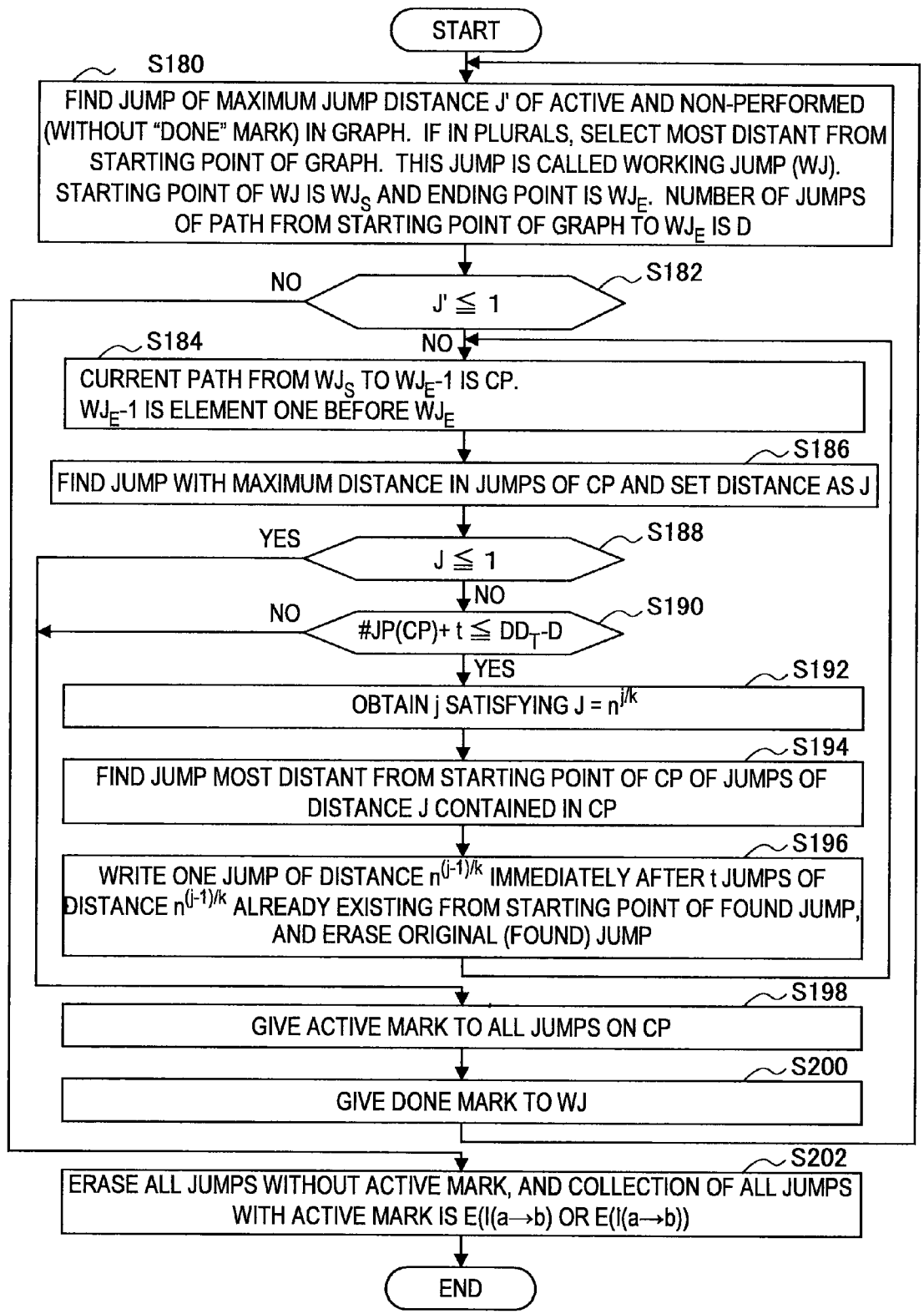
FIG. 48 is an explanatory view showing a flow of graph generation method according to the embodiment.

The generation method of the digraph I will be described with reference to FIGS. 45 to 48. FIG. 45 is an explanatory view showing an overall flow of process for generating the digraph I. FIG. 46 is an explanatory view showing a flow of process for extracting the longest directional path LP. FIG. 47 is an explanatory view showing a flow of process for extracting the directional path PLP of longest length (Partially Longest Path) from the directional paths other than the longest directional path LP. FIG. 48 is an explanatory view showing a process of replacing the directional path of the temporary digraph I' with the directional path configured by a set of shorter directional branches.

As shown in FIG. 45, the longest directional path LP is extracted from the directional paths forming the digraph I' (S142). The directional path PLP of longest length is extracted from the directional paths other than the longest directional path LP of the temporary digraph I' (S144). The directional path PLP of longest length may be extracted for the temporary digraph I' corresponding to each subset. The directional branches configuring the directional path of the temporary digraph I' is then replaced with shorter directional branches (S146). In this case, the directional branches are replaced such that the number of directional branches of all directional paths does not exceed the number of directional branches of the longest directional path LP. That is, the worst value of the amount of calculation for generating the key does not increase than the A06(B) system even if such replacement process is executed.

Each step shown in FIG. 45 will be more specifically described below.

(Details of S142)

First, the step (S160) of extracting the longest directional path LP will be described in detail with reference to FIG. 46. The following two notations are introduced.

$DD_T$: Number of directional branches of the longest directional path LP $J(a, b)$: a directional branches of length b exist continuously First, $t=n^{1/k}-1$. The directional path $P([1,1], [1,n])$ from the coordinate point [1,1] to the coordinate point [1,n] of the temporary digraph I' (1→n) is then considered. The directional path $P([1,1], [1,n])$ is expressed as $J(t,n^{(k-1)/k})$, $J(t,n^{(k-2)/k})$, ..., $J(t,n^{1/k})$, $J(t,n^{0/k})$. This directional path is referred to as longest directional path LP. The number of directional branches $DD_T$ of the longest directional path LP becomes $DD_T=k*(n^{1/k}-1)$. An active mark is set on all the directional branches configuring the longest directional path LP (S160).

(Details of S144)

The processes (S162 to S176) of extracting the directional path PLP of longest length for the temporary digraph I' corresponding to all the subsets other than the temporary digraph I' containing the longest directional path LP will be described below with reference to FIG. 47. The following two notations are introduced.

CP (Current Path): Directional path in reference (current path)

JP(CP): number of directional branches of current path

A current path CP from the starting point to the ending point of the digraph I' is first determined. If the current path is contained in the digraph I' (a→b) in this case, the directional path $P([a,a], [a,b])$ is the current path CP, and if contained in the digraph I' (a←b), the directional path $P([b,b], [b,a])$ is the current path CP (S162). The directional branch of longest length of the directional branches configuring the current path CP is selected, and the length thereof is set as J (S164). Whether or not J≦1 is judged (S166).

If J≦1, the current path CP is determined as the directional path PLP of longest length, and the active mark is set to all the directional branches contained in the current path CP (S176). If J>1, whether or not #JP(CP)+t≦$DD_T$ is judged (S168). If not #JP(CP)+t≦$DD_T$, the current path CP is determined as the directional path PLP, and the active mark is set to all the directional branches contained in the current path (S176). If #JP(CP)+t≦$DD_T$, a natural number j satisfying J=$n^{j/k}$ is calculated (S170).

The directional branch most distant from the stating point of the current path CP in the directional branches having length J contained in the current path CP is extracted (S172). One directional branch having a length of $n^{(j-1)/k}$ is added immediately after the t directional branches having length $n^{(j-1)/k}$ extending from the starting point of the directional branch extracted in step S172, the directional branch extracted in step S172 is removed (S174), and the process is returned to step S162 to repeatedly execute the above processes.

A loop process between step S162 and step S174 is terminated when all the directional paths from the starting point to the ending point of the digraph I' are configured by directional branches having length of one, or when the number of directional branches configuring the directional path exceeds $DD_T$ through execution of the replacement of greater number of directional branches.

(Details of S146)

The processes (S180 to S202) of replacing the directional branch contained in the temporary digraph I' with the short directional branch will be described in detail below with reference to FIG. 48.

First, the directional branch in which the length J' is the longest is extracted from the active and non-performed (without done mark) directional branches in the graph. If the maximum directional branch exists in plurals, the directional branch most distant from the starting point of the temporary digraph I' is selected (S180). The selected directional branch is referred to as WJ (Working Jump). The starting point of the directional branch WJ is $WJ_S$ and the ending point is $WJ_E$. The number of directional branches contained in the directional path from the starting point of the temporary digraph I' to the $WJ_S$ is noted as D.

Whether the length J' of the directional branch is J'≦1 is judged (S182). If J'≦1, all the directional branches without the active mark are erased, and a collection of all the directional branches with the active mark are set as E(I(a→b)) or E(I(a←b)) (S202). On the other hand, if not J'≦1, the directional path from $WJ_S$ to $WJ_E$-1 is set as the current path CP (S184). Here, $WJ_E$-1 represents the element one before $WJ_E$.

The directional branch of longest length is selected from the directional branches contained in the current path CP, and the length thereof is set as J (S186). Whether or not the length J of the directional branch is J≦1 is judged (S188). If J≦1, the active mark is given to all the directional branches contained in the current path CP (S198). The done mark is given to the WJ (S200), and the process is returned to the process of step S180. If not J≦1, whether or not #JP(CP)+t≦$DD_T$-D is judged (S190). If not #JP(CP)+t≦$DD_T$-D, the process returns to step S180 after the processes of steps S198 and S200. If #JP(CP)+t≦$DD_T$-D, j satisfying J=$n^{j/k}$ is calculated (S192).

If the directional branch having length J contained in the current path CP exists in plural, the directional branch at a position most distant from the starting point of the current path CP is extracted (S194). One directional branch having a length of $n^{(j-1)/k}$ is added immediately after the $n^{1/k}$-1 directional branches having length of $n^{(j-1)/k}$ extending from the starting point of the directional branch extracted in step S194, and the directional branch extracted in step S194 is erased (S196). The process then returns to the process of step S184.

A loop process between step S184 and step S196 is terminated when all the directional paths from the $WJ_S$ to the $WJ_E$-1 are configured by directional branches having length of one, or when the number of directional branches contained in the directional path from the $WJ_S$ to the $WJ_E$-1 exceeds $DD_T$ through replacement of greater number of directional branches. The loop process between steps S180 and S200 is terminated at the point the directional branches not set with done and having a length of greater than or equal to two are all eliminated from the directional branches contained in the temporary digraph I'.

The generation method of the digraph I according to the present embodiment has been described above. In the case of number of contractor n=64 and parameter k=6, the digraph I according to the present embodiment is expressed as in FIG. 49.

[Function Configuration of Terminal Device 422]

Figure 50:
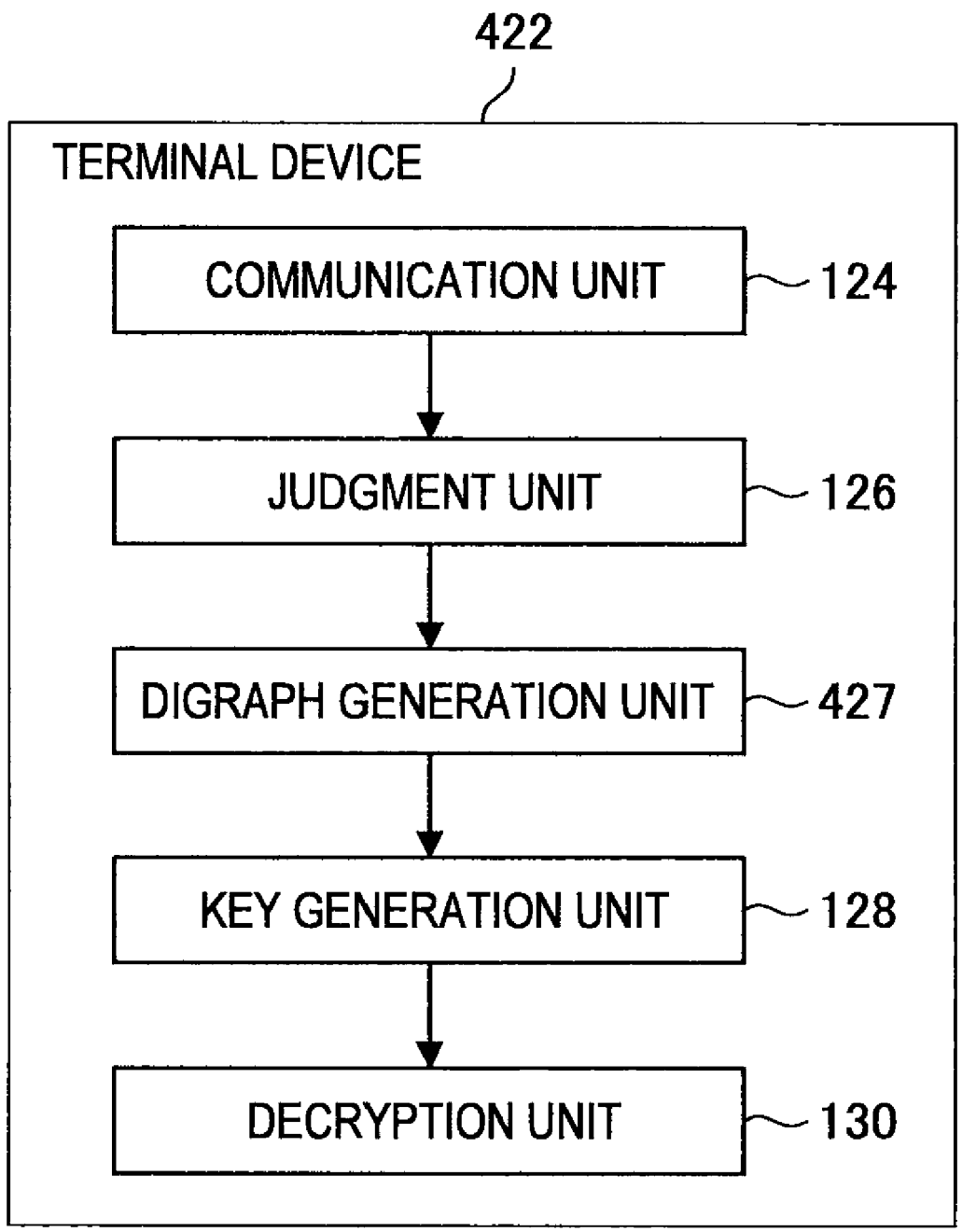
FIG. 50 is an explanatory view showing a function configuration of a terminal device according to the embodiment.

The function configuration of the terminal device 422 according to the present embodiment will now be described with reference to FIG. 50. FIG. 50 is an explanatory view showing the function configuration of the terminal device 422.

As shown in FIG. 50, the terminal device 422 is mainly configured by the communication unit 124, the judgment unit 126, a digraph generation unit 427, the key generation unit 128, and the decryption unit 130. The characteristic configuration of the present embodiment mainly lies on the digraph generation unit 427, and other components are substantially the same as the components of the terminal device 122 according to the first embodiment. Therefore, only the function configuration of the digraph generation unit 427 will be described in detail.

(Digraph Generation Unit 427)

The function configuration of the digraph generation unit 427 will be described first. The digraph generation unit 427 has a function of generating only the directional path for deriving the set key of the subset to which it belongs in the digraphs I used by the key distribution server 402 to derive the set key. That is, the digraph generation unit 427 can generate the digraph G configured only by the directional path enabling the necessary set key to be derived.

(Generation Method of Digraph G)

Figure 53:
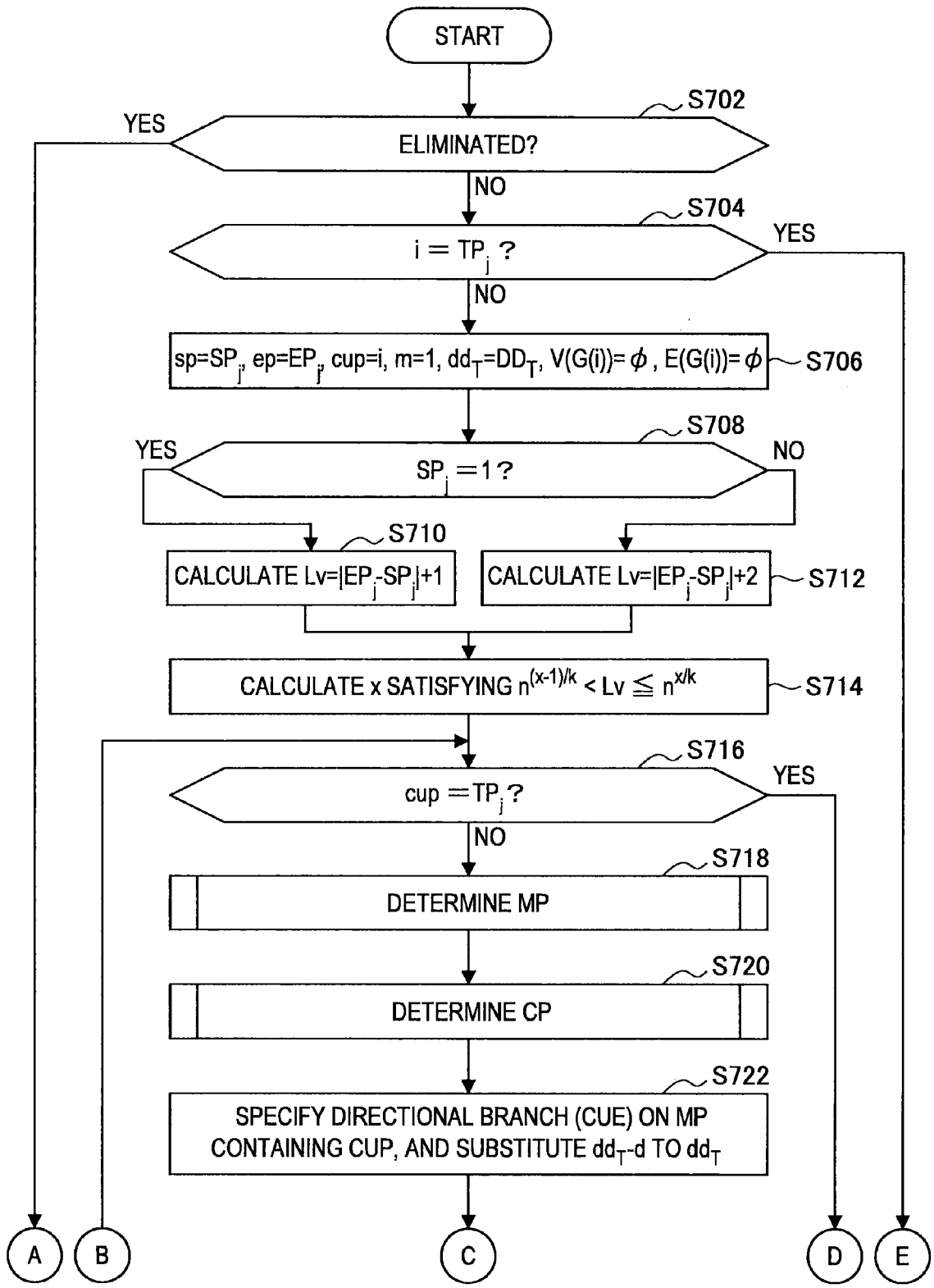
FIG. 53 is an explanatory view showing a flow of graph generation method according to the embodiment.
Figure 54:
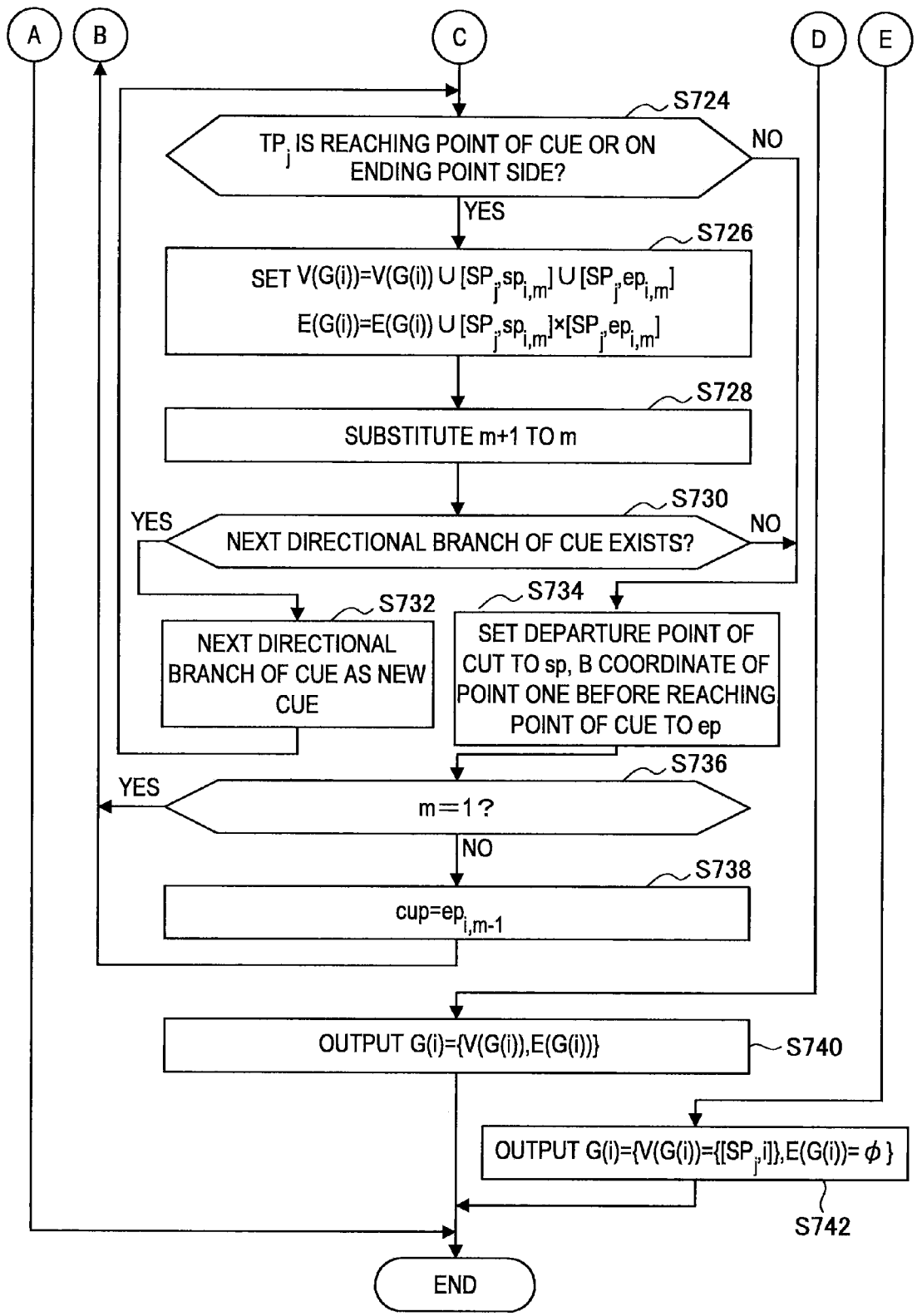
FIG. 54 is an explanatory view showing a flow of graph generation method according to the embodiment.

The generation method of the digraph G will be described in detail with reference to FIG. 53 and FIG. 54. FIG. 53 and FIG. 54 are explanatory views showing a flow of process for generating the digraph G for the contractor i to derive the set key k($S_j$) of the subset $S_j$ to which the contractor belongs.

Each symbol of A, B, C, D, E, F described at the lowermost stage of FIG. 53 and the uppermost stage of FIG. 54 is a symbol for clearly indicating the moving destination in the transition of processes of FIG. 53 and FIG. 54. For instance, the steps to reach A of FIG. 53 are assumed to have reached A of FIG. 54.

The terminal device 422 holds, in advance, the information of the number of contractor n and the parameter k. The digraph G is configured by the set V(G(i)) of coordinate points and the set E(G(i)) of directional branches, and is expressed as G(i)={V(G(i)),E(G(i))}. If the coordinate point contained in the digraph G(i) is one, the set E(G(i)) of directional branches is expressed as E(G(i))=φ (symbol φ is empty set). [a,b]×[a,c] represents the directional branch in which the coordinate point of the starting end is [a,b] and the coordinate point of the terminating end is [a,c]. For the sake of convenience of the explanation, the information of equation (25) is assumed to be acquired from the key distribution server 402.
[Equation 21]

$$sgi = \{\{S_1 = [SP_1, TP_1], EP_1\}, \ldots, \{S_y = [SP_y, TP_y], EP_y\}\}, h = \{E_{k(S_1)}(s), \ldots, E_{k(S_y)}(s)\}, E_s(M) \quad (25)$$

As shown in FIG. 53, whether or not the subset $S_j (j \in S_j)$ in which it (contractor i) is included exists in the information sgi related to the subset of the permitted contractor acquired by the communication unit 124 is judged (S702). If the subset $S_j$ exists, the process proceeds to step S704. If the subset $S_j$ does not exist, the generation process of the digraph G is terminated assuming that the contractor is eliminated (no authority to acquire content). The process of step S702 is mainly executed by the judgment unit 126.

The digraph generation unit 427 then judges whether or not the number i of the contractor matches $TP_j$ (S704). If $i = TP_j$, the digraph $G(i) = \{V(G(i)), E(G(i))\}$ to be generated when the contractor i derives the set key is output as $V(G(i)) = \{[SP_j, i]\}, E(G(i)) = \phi$ (S742), and the generation process of the digraph G is terminated. If not $i = TP_j$, the process proceeds to step S706.

The digraph generation unit 427 initializes the coordinate cup of the current position of the contractor i, the coordinate sp of the starting point and the coordinate ep of the ending point of the range currently being considered, the counter m, the number $dd_T$ of directional branches in the current path, the set $V(G(i))$ of coordinate points, and the set $E(G(i))$ of directional branches in the following manner (S706).

sp=SPj, ep=EPj, cup=i, m=1, $dd_T = DD_T = k*(n^{1/k} - 1)$, $V(G(i)) = \phi$, $E(G(i)) = \phi$. Here, j represents the index j of the subset $S_j$ satisfying $i \in S_j$.

The digraph generation unit 427 then judges whether or not $SP_j = 1$ (S708). The process proceeds to step S710 if $SP_j = 1$. The digraph generation unit 427 then calculates $L_v = |EP_j - SP_j| + 1$ (S710), and then proceeds to step S714. If not $SP_j = 1$, the process proceeds to step S712. The digraph generation unit 427 calculates $L_v = |EP_j - SP_j| + 2$ (S712), and then proceeds to step S714.

The digraph generation unit 427 calculates x ($1 \leq x \leq k$) satisfying $n^{(x-1)/k} < Lv \leq n^{x/k}$ (S714). The digraph generation unit 427 judges whether or not cup=$TP_j$ (S716). If cup=$TP_j$, the process proceeds to step S740. The digraph $G\{V(G(i)), E(G(i))\}$ used by the contractor i to derive the key of the subset is output (S740), and the generation process of the digraph G is terminated.

If not cup=$TP_j$, the process proceeds to step S718. The digraph generation unit 427 then determines the directional path in which the number of jumps becomes a minimum of the directional paths from sp to ep as MP (MaxPath) so as to match part of the digraph I in the A06(A+B) system (S718). The process of determining the MP will be hereinafter described.

The digraph generation unit 427 determines the CP in which the directional branch on the MP that matches part of the digraph I of the A06(A+B) system is replaced with the directional branch of as short as possible distance in a range not exceeding the $dd_T$ (S720). The determination process of the CP will be hereinafter described.

The digraph generation unit 427 specifies the directional branch in which the coordinate point [$SP_j$,cup] is contained between the starting end and the terminating end of each directional branch existing on the CP (S722). However, a case where the coordinate point of the starting end or the terminating end and the coordinate point [$SP_j$,cup] match is also included. The specified directional branch is called the CUE (Current User's Edge). If the coordinate point [$SP_j$,cup] exists on the CP and the coordinate point [$SP_j$,cup] matches the starting end and the terminating end of the two adjacent directional branches, the directional branch having the coordinate point [$SP_j$,cup] as the starting point is assumed as CUE.

The digraph generation unit 427 proceeds to step S734 if the coordinate point [$SP_j$,$TP_j$] does not match the terminating end of the CUE and is not on the ending point side of the digraph H than the terminating end of the CUE. The process proceeds to step S726 if the coordinate point [$SP_j$,$TP_j$] matches the terminating end of the CUE or is on the ending point side of the digraph I than the terminating end of the CUE (S724).

The digraph generation unit 427 then sets V(G(i)) and E(G(i)) as below (S726).

If $V(G(i)) = \phi$, $V(G(i)) = [SP_j, sp_{i,m}] \cup [SP_j, ep_{i,m}]$. If not $V(G(i)) = \phi$, $V(G(i)) = V(G(i)) \cup [SP_j, ep_{i,m}]$. Furthermore, $E(G(i)) = E(G(i)) \cup \{[SP_j, sp_{i,m}] \times [SP_j, ep_{i,m}]\}$.

Here, $sp_{i,m}$, $ep_{i,m}$ represent the coordinates of the starting end and the terminating end of the current CUE. The process differs for when $V(G(i)) = \phi$ and when not $V(G(i)) = \phi$ for the following reasons. If $V(G(i)) = \phi$, both the starting end and the terminating end of the directional branch are to be added as the coordinate points, but if not $V(G(i)) = \phi$, the starting end of the directional branch to be added is already added as the coordinate point of the V(G(i)) and thus only the coordinate point for the terminating end is added to V(G(i)) to avoid redundancy.

The digraph generation unit 427 substitutes m+1 to m (S728). The digraph generation unit 427 judges whether or not the next directional branch (directional branch having the terminating end of the CUE as the starting end) of the CUE exists on the CP (S730). If the next directional branch of the CUE exists, the process proceeds to step S732, the next directional branch of the CUE existing on the CP is set as the new CUE, and the process is returned to the process of step S724. If the next directional branch of the CUE does not exist, the process proceeds to step S734.

The digraph generation unit 427 then sets the coordinate of the starting end of the CUE to the sp, and sets the coordinate of the coordinate point positioned one before the terminating end of the CUE to the ep, where the number of directional branches existing from the starting point of the CP to the starting end of the CUE is d, and $dd_T - d$ is substituted to $dd_T$ (S734). The digraph generation unit 427 then judges whether or not m=1 (S736). If m=1, the process returns to the process of step S716. If not m=1, the process proceeds to step S738.

The digraph generation unit 427 sets cup=$ep_{i,(m-1)}$ (S738), and returns to the process of step S716.

The generation method of the digraph G according to the present embodiment has been described. In the above-described generation method, assumption is made that the information $EP_j$ related to the ending point of the digraph I is contained in the sgi, but the contractor may specify the $EP_j$ as the $EP_j$ can be uniquely specified by the logical binary tree BT once $SP_j$ is determined. Such configuration is realized by adding the step of deriving the $EP_j$ to the process of step S706.

(Determination Method of Maximum Directional Path MP)

Figure 55:
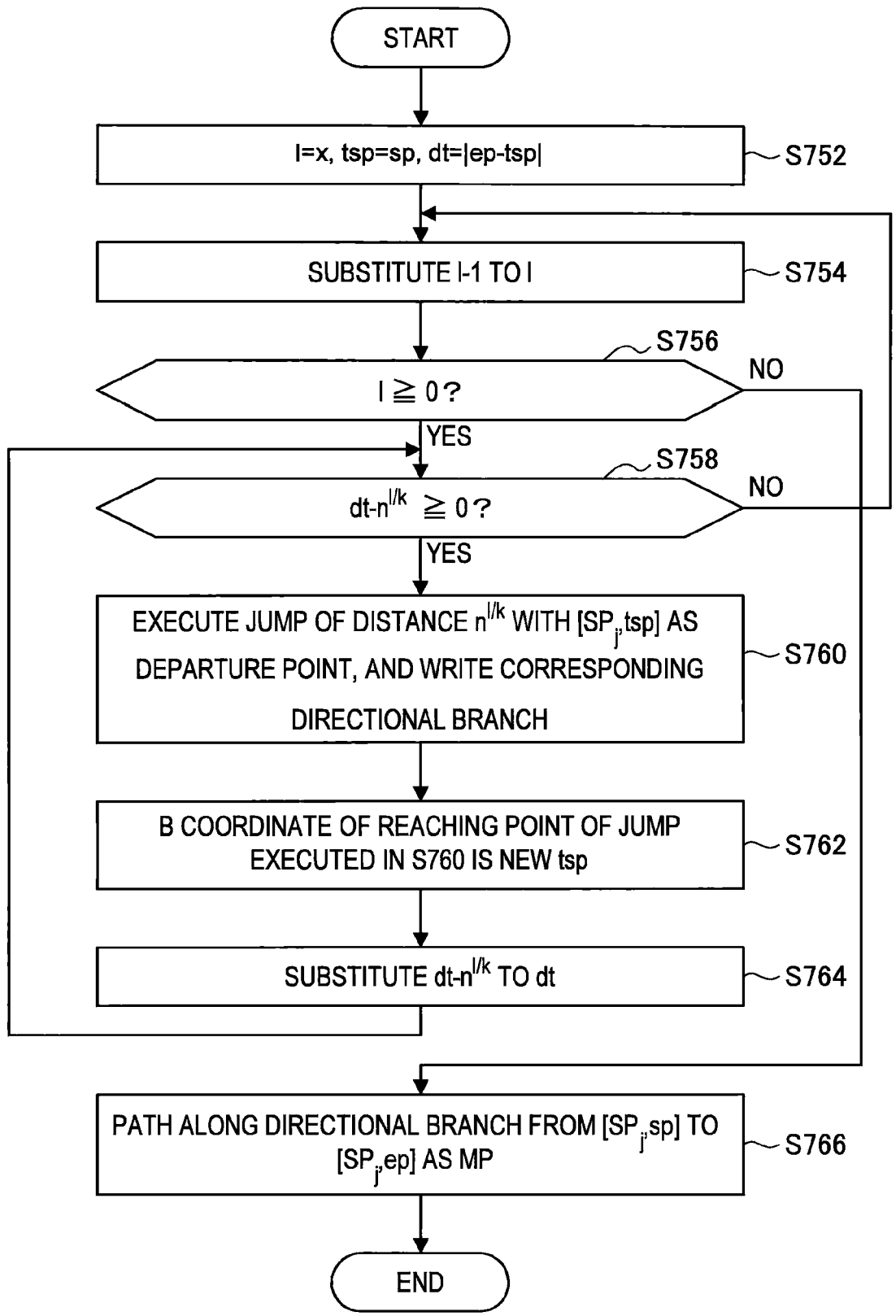
FIG. 55 is an explanatory view showing a flow of graph generation method according to the embodiment.

The determination method of the maximum directional path MP in step S718 of FIG. 53 will now be described with reference to FIG. 55. FIG. 55 is an explanatory view showing a flow of determination process of the maximum directional path MP.

As shown in FIG. 55, the digraph generation unit 427 first initializes the counter 1, the coordinate tsp of the reaching point of the jump currently being considered, and the distance dt currently being considered as below (S752). l=x, tsp=sp, dt=|ep−tsp|.

The digraph generation unit 427 then substitutes l−1 to 1 (S754). The digraph generation unit 527 judges whether or not l≧0 (S756). If not l≧0, the process proceeds to step S766, sets the directional path formed by a chain of at least one directional branch from the coordinate point [$SP_j$,sp] to the [$SP_j$,ep] as MP (S766), and terminates the determination process of the MP. If l≧0 the process proceeds to step S758.

The digraph generation unit 427 then judges whether or not dt−$n^{1/k}$≧0 (S758). If not dt−$n^{1/k}$≧0, the process returns to the process of step S754. If dt−$n^{1/k}$≧0, the process proceeds to step S760.

The digraph generation unit 427 executes a jump of distance $n^{1/k}$ with [$SP_j$,tsp] as the departure point, and generates the corresponding directional branch (S760). The digraph generation unit 427 then newly sets the coordinate of the terminating end of the directional branch generated in step S760 as tsp (S762). The digraph generation unit 427 then substitutes dt−$n^{1/k}$ to dt (S764), and returns to the process of step S758.

The determination method of the maximum directional path MP has been described above.

(Determination Method of Current Path CP)

Figure 56:
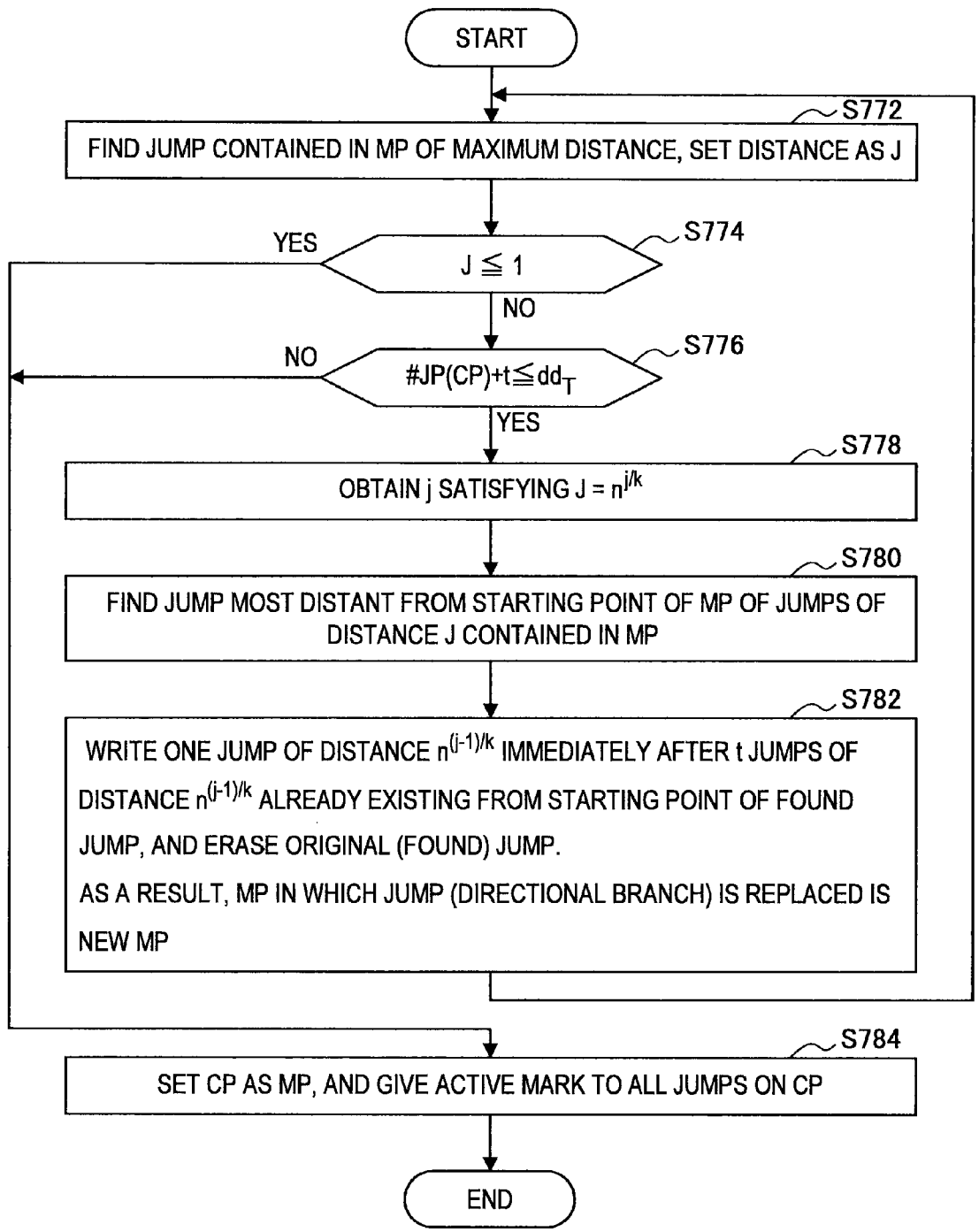
FIG. 56 is an explanatory view showing a flow of graph generation method according to the embodiment.

The determination method of the current path CP will now be described with reference to FIG. 56. FIG. 56 is an explanatory view showing a flow of determination process of the CP.

As shown in FIG. 56, the digraph generation unit 427 extracts the directional branch in which the distance is a maximum of the directional branches contained in the MP, and sets the distance as J (S772). The digraph generation unit 427 then judges whether or not J≦1 (S774). If J≦1, the process proceeds to step S784, the directional path from the coordinate point [$SP_j$,sp] to [$SP_j$,ep] is determined as the CP (S784), and the determination process of the CP is terminated. If not J≦1, the process proceeds to step S776.

The digraph generation unit 427 then judges whether or not #JP(MP)+t≧$dd_T$ (S776). If #JP(MP)+t≧$dd_T$, the process proceeds to step S778. If not #JP(MP)+t≧$dd_T$, the process proceeds to step S784, and the directional path from the coordinate point [$SP_j$,sp] to [$SP_j$,ep] is determined as the CP (S784), and the determination process of the CP is terminated.

The digraph generation unit 427 then obtains j satisfying J=$n^{j/k}$ (S778). The digraph generation unit 427 extracts the directional branch at a position most distant from the stating point of the MP of the directional branches having distance J contained in the MP (S780). The directional branch having a distance of $n^{(j-1)/k}$ is generated immediately after the t existing directional branches having distance $n^{(j-1)/k}$ from the starting point of the directional branch extracted in step S780, and the directional branch extracted in step S780 is erased. The MP in which the directional branch is replaced is set as the new MP (S782), and the process is returned to the process of step S772.

The determination method of the current path CP has been described above. The generation process of the digraph G can be carried out according to the determination process described above.

(Specific Example)

Figure 51:
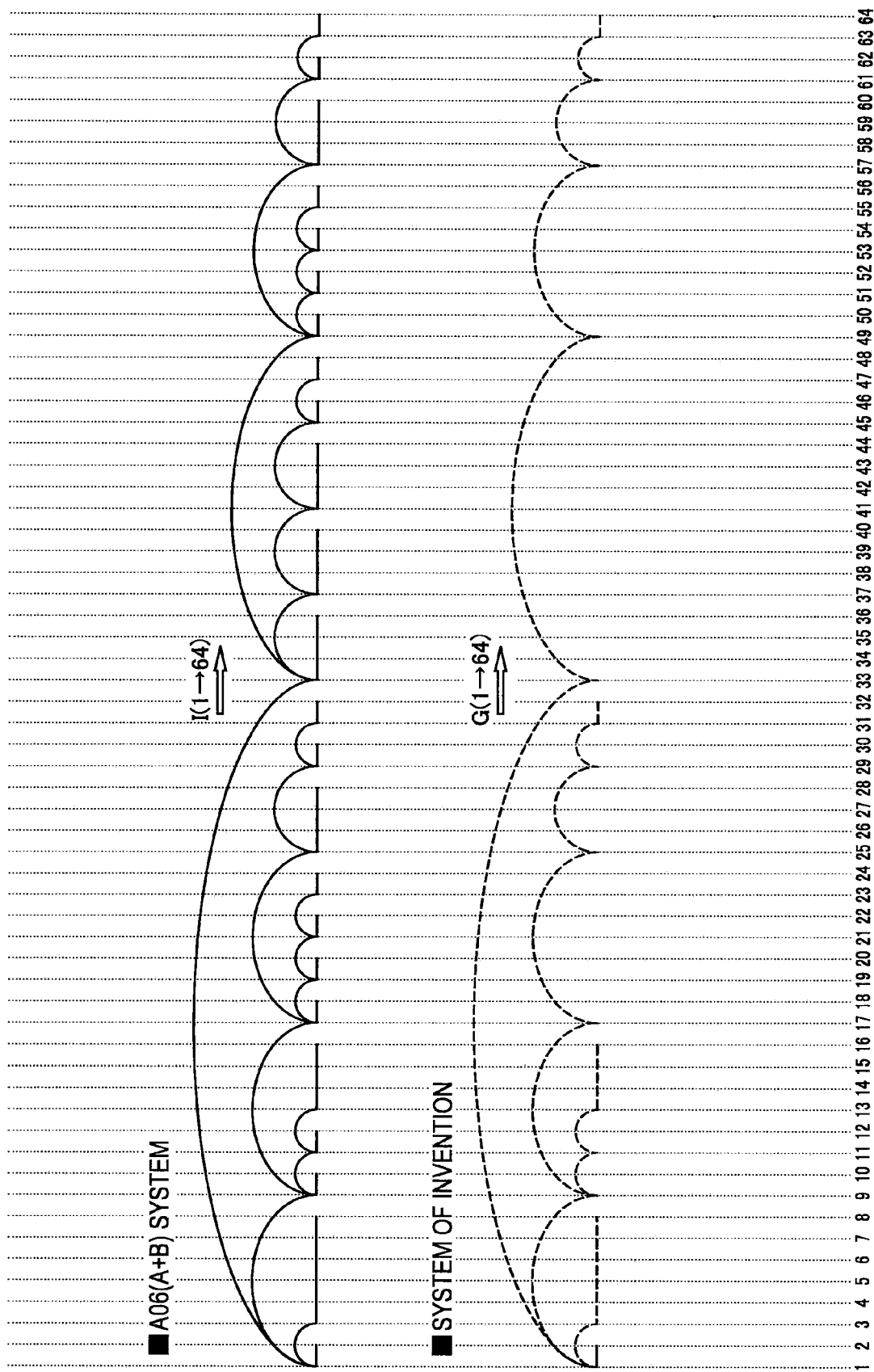
FIG. 51 is an explanatory view showing a digraph G according to the embodiment.
Figure 52:
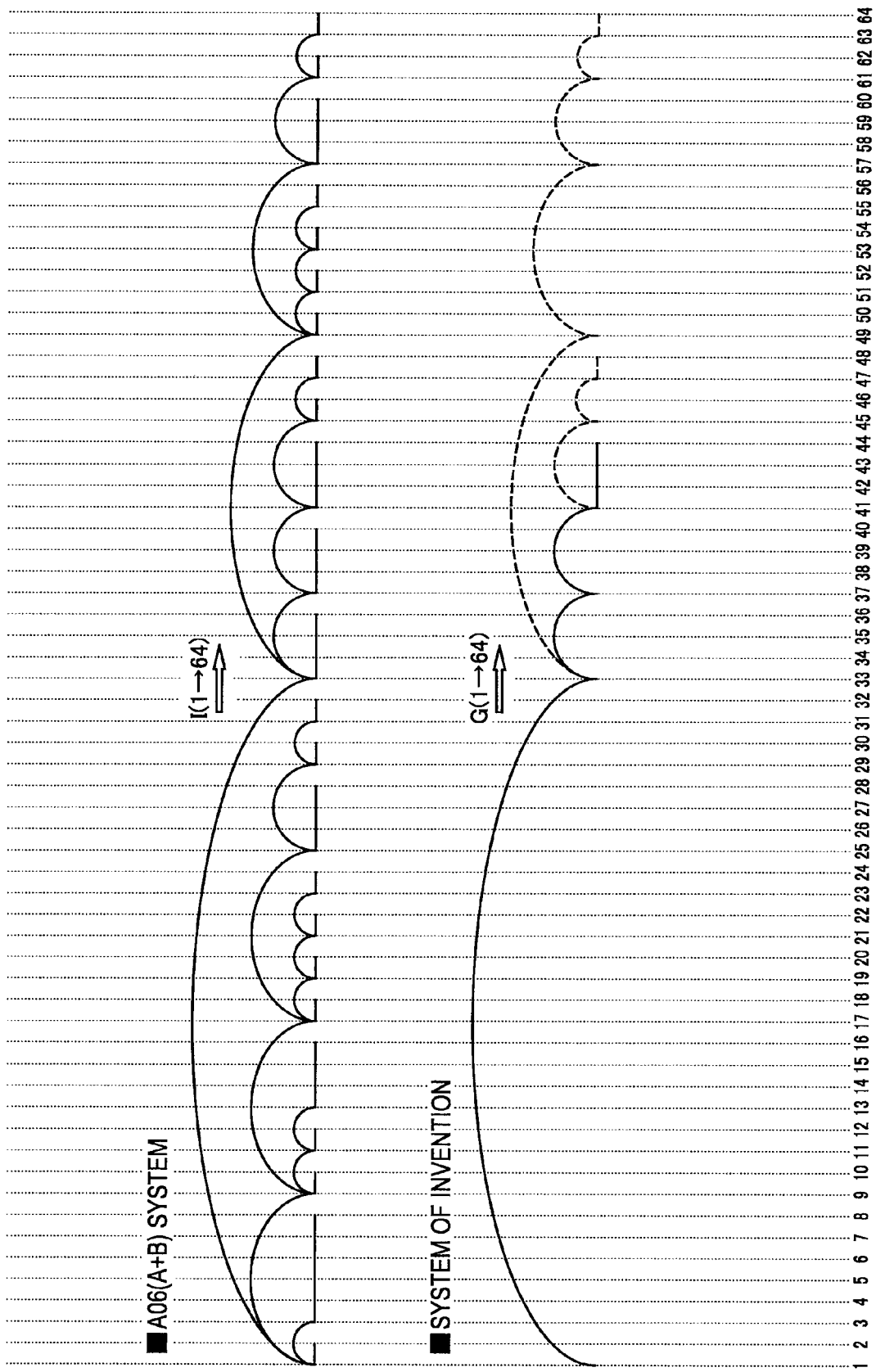
FIG. 52 is an explanatory view showing a digraph G according to the embodiment.

The specific example of the digraph G generated by the digraph generation unit 427 based on the above-described generation method will be described with reference to FIG. 51 and FIG. 52. FIG. 51 and FIG. 52 are explanatory views showing a digraph G generated when the number of contractor is n=64, and the parameter is k=6. In particular, only the digraph corresponding to the set (1→64) is shown. The diagrams drawn on the upper side of FIG. 51 and FIG. 52 are the digraph I derived by the contractor when the algorithm of the AI06(A+B) system is used. The diagrams drawn on the lower side are the digraph G derived by the contractor when the algorithm of the present embodiment is used.

(Specific Example 1)

First, the digraph G generated for the contractor 1 to derive the set key of the subset [1,2] is shown with reference to FIG. 51. The solid line in the figure shows the directional branch corresponding to the jump to be executed when the contractor 1 derives the set key. That is, when deriving the set key of the subset [1,2], the contractor 1 inputs the intermediate key t([1,1]) corresponding to the starting end of the directional branch shown with a solid line to the PRSG, and derives the t([1,2]) corresponding to the terminating end thereof. Furthermore, the digraph G configured by the solid line and the broken line represents the maximum directional path CP to be derived by the contractor 1.

(Specific Example 2)

The digraph G generated for the contractor 7 to generate the set key of the subset [1,44] is shown with reference to FIG. 52. The solid line in the figure shows the directional branch corresponding to the jump to be executed when the contractor 7 derives the set key. That is, when deriving the set key of the subset [1,44], the contractor 7 uses the intermediate key t([1, 33]) it holds in advance and repeatedly executes the PRSG along the directional branch shown with a solid line to derive the intermediate key t([1,44]). Furthermore, the digraph G configured by the solid line and the broken line represents the maximum directional path CP to be derived by the contractor 7.

(Key Generation Method)

The flow of key generation method according to the present embodiment will be described using a specific example with reference to FIG. 16. The function configuration of the key generation unit 128 according to the present embodiment is substantially the same as the key generation unit 128 according to the first embodiment, but differs in the shape of the digraph to be referenced in the key generation.

Figure 49:
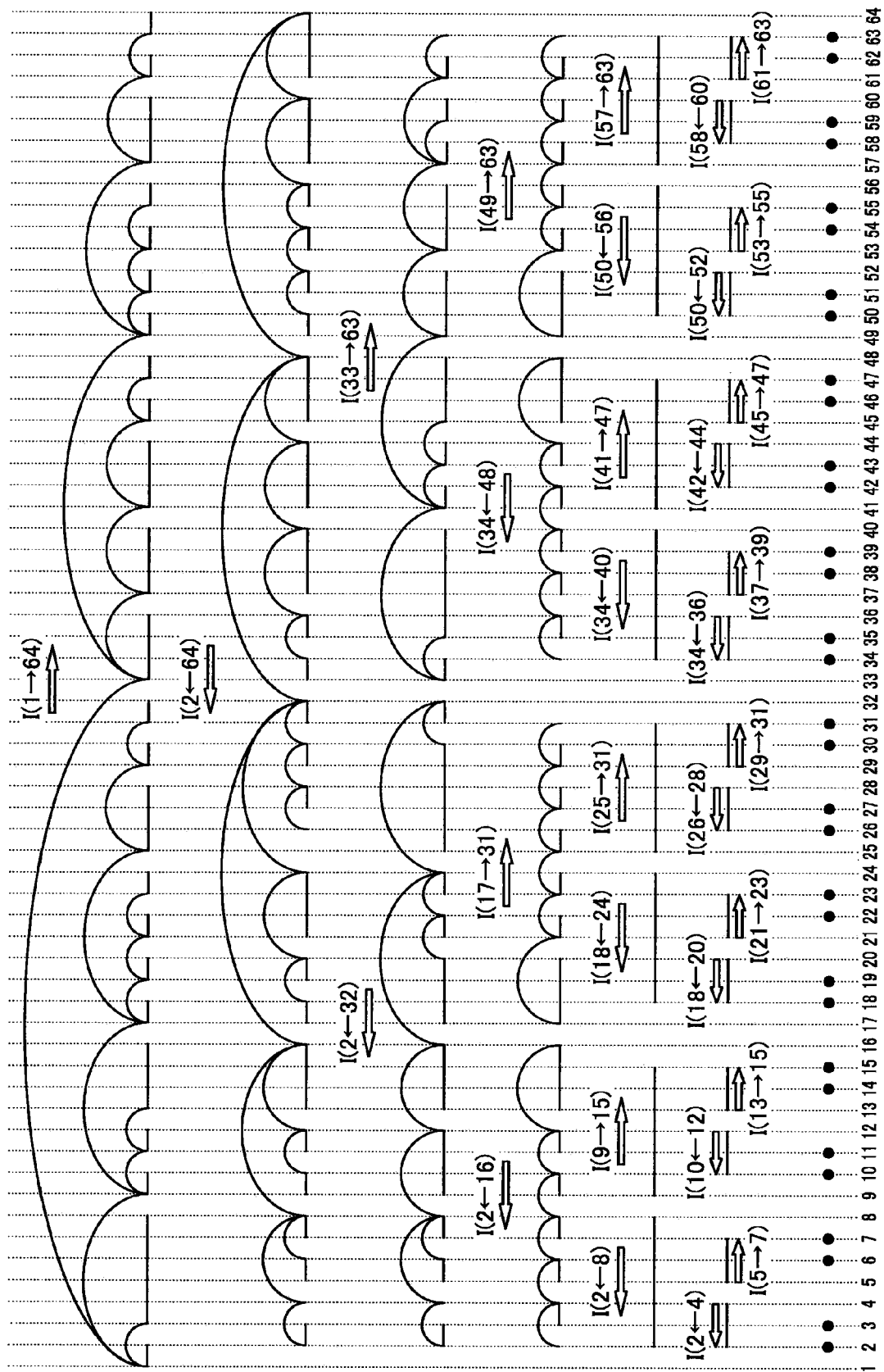
FIG. 49 is an explanatory view showing a digraph I according to the embodiment.

First, a step in which the contractor 7 derives the set key of the subset [1,44] will be described with reference to FIG. 49 and FIG. 52. With reference to FIG. 49, it is apparent that the contractor 7 belongs to the subsets corresponding to the elements of seven digraphs I(1→64), I(2←64), I(2←32), I(2←16), I(2←8), I(6→7), I(7→7). Among them, a subset to which the contractor 7 belongs, the subset being the three subsets [1,7], [1,9], [1,33] where the contractor 7 does not belong to the subset corresponding to the parent of such subset exists in the digraph I(1→64). Therefore, with respect to the digraph I(1→64), the intermediate keys t([1,7]), t([1, 9]), t([1,33]) are provided to the contractor 7 in time of system setup. Similar predetermined intermediate keys are also provided for other digraphs I(2←64), I(2←32), I(2←16), I(2←8), I(6→7), I(7→7).

First, the contractor 7 generates the digraph G shown in the lower diagram (system of invention) of FIG. 52 with the function of the digraph generation unit 427. Thereafter, the contractor 7 acquires the set key k([1,44]) of the subset [1,44] through the following procedures (see FIG. 16).

First, check is made that $TP_j$ that is not i=$TP_j$ does not exist, and the counter 1 is initialized to one. Thereafter, the intermediate key t([1,33]) corresponding to the subset [1,33] that matches the coordinate of the terminating end of the first directional branch [1,1]×[1,33]∈E(G(7)) is specified from the intermediate keys t([1,7]), t([1,9]), t([1,33]) the contractor holds in advance, which is then set as CTK.

The presence of the next directional branch is then checked. In this case, as the directional branch $[1,33] \times [1,37] \in E(G(7))$ exists at the current time point, CTK=t([1,33]) is input to the PRSG, and the output of $(k+1)*\lambda$ bits as shown in equation (26) is obtained.

[Equation 22]

$$t([1,34]) \| t(1,35) \| t(1,37) \| t([1,41]) \| t([1,49]) \| t([1,65]) \| k([1,33]) \leftarrow PRSG(t([1,33])) \quad (26)$$

In equation (26), the coordinates of 35, 41, 65 of t([1,35]), t([1,41]), t([1,65]) are calculated as i=1, 3, 5 of $33+n^{i/k}$, but are not the ending point of the directional branch having [1,33] as the starting point in the [1,35], [1,41], [1,65] digraph G, and thus t([1,35]), t([1,41]), t([1,65]) represent the dummy intermediate keys, and are not actually used. After incrementing the counter 1, the intermediate to use is determined from the output intermediate keys. Here, the counter 1 is incremented and becomes l=2, and thus p(p=2) satisfying $|37-33|=4=2^2=n^{p/k}$ is determined with respect to the directional branch $[1,33] \times [1,37] \in E(G(7))$. In response to such result, t([1,37]) is acquired from the output of the equation (0), and the CTK is updated to t([1,37]). Similarly, the existence of the directional branch $[1,37] \times [1,41] \in E(G(7))$ is checked, the CTK is input to the PRSG, and the output of equation (27) is obtained.

[Equation 23]

$$t([1,38]) \| t(1,39) \| t(1,41) \| t([1,45]) \| t([1,53]) \| t([1,69]) \| k([1,37]) \leftarrow PRSG(t([1,37])) \quad (27)$$

The counter 1 is then set to l=3, p=2 is calculated with respect to the directional branch $[1,37] \times [1,41] \in E(G(7))$, and then the CTK is updated to t([1,41]). The above processes are repeatedly executed three more times to obtain a state in which the next directional branch does not exist. In this case, CTK=t([1,44]), and thus from $k*\lambda+1^{th}$ bit to $(k+1)*\lambda^{th}$ bit of the value output by inputting the CTK to the PRSG are extracted as the set key k([1,44]).

As described above, the contractor 7 can acquire the set key k([1,44]) of the subset [1,44] using the intermediate key the contractor holds. Thus, each contractor can calculate the desired set key using the intermediate key the contractor holds.

[Effect]

In the related art, each contractor holds all digraphs I corresponding to the subset to which it belongs or derives all digraphs I on its own. However, the present embodiment provides a means in which each contractor derives the digraph G configured only with the directional branch necessary when deriving the key of the digraphs I corresponding to the subset to which it belongs. Therefore, compared to the key distribution system of the related art, the number of directional branches to be calculated by each contractor greatly reduces, and each contractor can generate the digraph G and derive the desired set key at high speed. As a result, the time for decrypting the content can be greatly reduced.

It should be understood by those skilled in the art that various modifications, combinations, sub-combinations and alterations may occur depending on design requirements and other factors insofar as they are within the scope of the appended claims or the equivalents thereof.

For instance, the logical binary tree Bt described above is assumed to have a structure in which the branches are spread from top to bottom, but is not limited thereto, and may be configured such that the branches are spread from bottom to top, from left to right, or from right to left. The changes related to such arrangement are realized by simply rotating and arranging the logical binary tree, and all configurations related to such changes also fall within substantially the same technical scope. This is the same for the changes for mirror reversing the horizontal coordinate axis forming the temporary digraph and the digraph.

The key distribution server 102 according to each embodiment includes components for generating the digraph on its own, but is not limited thereto. The key distribution server 102 according to the embodiment of the present invention may include an acquiring unit for acquiring information related to a predetermined digraph, in which case some or all of the tree structure setting unit 104, the coordinate axis setting unit 106, the temporary digraph generation unit 108, and the digraph generation unit 110 may not be arranged.

The key distribution server 102 according to each embodiment above includes the communication unit 118 for distributing content, content key, set key, intermediate key, information of a subset corresponding to the permitted contractor, information of a digraph, or the like to the terminal device 122, but the network may not be used at all times to provide such information, as shown in application example 2. The key distribution server 102 may include a recording unit for recording information on a recording medium in place of the communication unit 118. In this case, the terminal device 122 may include a readout unit for reading the recording medium recorded with the information in place of the communication unit 124.

The invention claimed is:

1. A key providing system configured by a plurality of terminal devices, and an information processing device for providing a key used in encryption or decryption of data to a predetermined terminal device, wherein
the information processing device includes,
   a tree setting unit configured to generate a logical binary tree;
   a coordinate axis setting unit configured to generate a plurality of horizontal coordinate axes based on the binary tree for forming a predetermined digraph;
   a digraph generation unit configured to generate the predetermined digraph by arranging directional branches connecting coordinate points on each horizontal coordinate axis including a plurality of coordinate points each corresponding with a set representing a combination of the plurality of terminal devices, the directional branches including arch-shaped curves and horizontally extending lines;
   a selecting unit for selecting the set representing some or all of the plurality of terminal devices,
   a key generation unit for generating the key corresponding to the selected set based on the predetermined digraph, and
   a providing unit for providing the generated key and information related to the selected set to the plurality of terminal devices; and
the terminal device includes,
   an acquiring unit for acquiring the generated key and the information related to the selected set,
   a digraph generation unit for generating the directional branch for generating the key corresponding to the selected set to which it belongs of the directional branches forming the predetermined digraph, and
   a key generation unit for generating the key corresponding to the selected set to which it belongs based on a digraph formed by the generated directional branch.

2. A terminal device comprising: an acquiring unit for acquiring information related to a set, which is selected from a plurality of sets representing a combination of a plurality of terminal devices, and which represents some or all of the plurality of terminal devices;

an extracting unit for extracting the set contained in the information and to which it belongs; and a digraph generation unit for generating a directional branch for generating a key corresponding to the extracted set in a predetermined digraph formed by a plurality of directional branches, the directional branches including arch-shaped curves and horizontally extending lines.

3. The terminal device according to claim 2, wherein the predetermined digraph is a second digraph generated by replacing some or all of the plurality of directional branches forming a first digraph with shorter directional branches based on the predetermined first digraph.

4. The terminal device according to claim 2, wherein the predetermined digraph is a third digraph generated by replacing some or all of the plurality of directional branches forming a first digraph with longer directional branches based on the predetermined first digraph.

5. The terminal device according to claim 2, wherein the predetermined digraph is a fourth digraph generated by replacing some or all of the plurality of directional branches forming a third digraph with shorter directional branches with respect to the third digraph generated by replacing some or all of the plurality of directional branches forming a first digraph with longer directional branches based on the predetermined first digraph.

6. The terminal device according to claim 2, further comprising a key generation unit for generating the key based on the directional branch generated by the digraph generation unit.

7. The terminal device according to claim 6, wherein the acquiring unit acquires content or content key encrypted with the key corresponding to the set along with the information related to the set, and the terminal device further includes a decryption unit for decrypting the encrypted content or the content key using the key generated by the key generation unit.

8. The terminal device according to claim 2, wherein the acquiring unit receives the information related to the set through a network.

9. The terminal device according to claim 2, wherein the acquiring unit reads out the information related to the set recorded on a predetermined recording medium.

10. The terminal device according to claim 6, wherein the key generation unit generates the key $k(S_1)$ corresponding to a coordinate point $S_1$ of a terminating end of the directional branch according to an input of the key $k(S_0)$ corresponding to a starting end $S_0$ of the directional branch.

11. The terminal device according to claim 6, wherein the key is configured by a set key k for encrypting or decrypting the content or the content key, and an intermediate key t for generating the set key k, and the key generation unit generates the set key $k(S_0)$ corresponding to a starting end $S_0$ of the directional branch, and the intermediate key $t(S_1)$ corresponding to a terminating end $S_1$ of the directional branch according to an input of the intermediate key $t(S_0)$ corresponding to the starting end $S_0$ of the directional branch.

12. An information processing method in a terminal device, the information processing method comprising the steps of:

acquiring information related to a set, which is selected from a plurality of sets representing a combination of a plurality of terminal devices, and which represents some or all of the plurality of terminal devices;

extracting the set contained in the information and to which it belongs; and generating a directional branch for generating a key corresponding to the extracted set in a predetermined digraph formed by a plurality of directional branches, the plurality of directional branches including arch-shaped curves and horizontally extending lines.

* * * * *